US012561578B2

(12) United States Patent
Alizadeh et al.

(10) Patent No.: US 12,561,578 B2
(45) Date of Patent: Feb. 24, 2026

(54) SYSTEM AND METHOD FOR MACHINE LEARNING BASED PREDICTION OF SOCIAL MEDIA INFLUENCE OPERATIONS

(71) Applicant: The Trustees of Princeton University, Princeton, NJ (US)

(72) Inventors: Meysam Alizadeh, Lawrenceville, NJ (US); Jacob Shapiro, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 1034 days.

(21) Appl. No.: 17/639,052

(22) PCT Filed: Aug. 28, 2020

(86) PCT No.: PCT/US2020/048436
§ 371 (c)(1),
(2) Date: Feb. 28, 2022

(87) PCT Pub. No.: WO2021/041830
PCT Pub. Date: Mar. 4, 2021

(65) Prior Publication Data
US 2022/0383142 A1     Dec. 1, 2022

Related U.S. Application Data

(60) Provisional application No. 62/992,551, filed on Mar. 20, 2020, provisional application No. 62/893,005, filed on Aug. 28, 2019.

(51) Int. Cl.
*G06N 5/022*     (2023.01)
*G06Q 10/40*     (2026.01)
*G06Q 30/0242*     (2023.01)

(52) U.S. Cl.
CPC ............. *G06N 5/022* (2013.01); *G06Q 10/40* (2026.01); *G06Q 30/0242* (2013.01)

(58) Field of Classification Search
None
See application file for complete search history.

(56) References Cited

U.S. PATENT DOCUMENTS

2017/0154314 A1     6/2017  Mones et al.
2018/0365562 A1     12/2018  Volkova

OTHER PUBLICATIONS

Im et al., Still Out There: Modeling and Identifying Russian Troll Accounts on Twitter; arXiv:1901.11162v1 [cs.SI] Jan. 31, 2019; Total pp. 10 (Year: 2019).*

(Continued)

*Primary Examiner* — Alan Chen
(74) *Attorney, Agent, or Firm* — Meagher Emanuel Laks Goldberg & Liao, LLP

(57)     ABSTRACT

According to various embodiments, a machine learning based method, system, and non-transitory computer-readable medium for identifying content on social media related to one or more coordinated influence efforts are disclosed. The method includes generating one or more datasets of post-uniform resource locator (URL) pairs produced from one or more known coordinated influence efforts on one or more social media platforms. The method further includes generating one or more datasets of post-URL pairs produced from one or more random users on one or more social media platforms. The method additionally includes extracting a plurality of content-based features from the post-URL pairs from known coordinated influence efforts and random users. The method also includes iteratively training a classifier over a predetermined period of time to distinguish between a post-URL pair produced from a coordinated influence effort and a post-URL pair produced from a random user using the extracted plurality of content-based features.

33 Claims, 55 Drawing Sheets

(56) References Cited

OTHER PUBLICATIONS

Apruzzese et al., Addressing Adversarial Attacks Against Security Systems Based on Machine Learning; 11th international conference on cyber conflict (CyCon) May 28, 2019 (vol. 900, pp. 1-18) (Year: 2019).*

Bahnsen et al., Classifying Phishing URLs Using Recurrent Neural Networks, 2017 APWG Symposium on Electronic Crime Research (eCrime), Scottsdale, AZ, USA, 2017, pp. 1-8, doi: 10.1109/ECRIME. 2017.7945048 (Year: 2017).*

Cable et al., Bots in the Net: Applying Machine Learning to Identify Social Media Trolls, Stanford University, Jun. 12, 2019; https://cs229.stanford.edu/proj2019spr/report/74.pdf; Total pp. 6 (Year: 2019).*

International Search Report and Written Opinion for corresponding PCT Application No. PCT/US2020/048436, dated Nov. 24, 2020.

Stukal et al., "For Whom the Bot Tolls: A Neural Networks Approach to Measuring Political Orientation of Twitter Bots in Russia", SAGE Open, https://journals.sagepub.com/doi/pdf/10.1177/2158244019827715, pp. 1-16, Apr.-Jun. 2019.

Stukal et al., "Supplementai_Appendix", Supplementai_Appendix. pdf, https:f/smappnyu.wpcomstaging.com/wp-content/uploads/2019/03, pp. 1 to 52, Jan.-Mar. 2019.

"List of Political Subreddits", Retrieved via: https://www.reddit.com/r/redditlists/comments/osdrlist_of_political_subreddits/, Accessed on Feb. 27, 2020, 9 pages.

Aral et al., "Protecting Elections from Social Media Manipulation: Rigorous Causal Analysis Could Help Harden Democracy Against Future Attacks", Science, vol. 365, Issue 6456, Aug. 30, 2019, 858-861.

Arif et al., "Acting the Part: Examining Information Operations Within #BlackLivesMatter Discourse", Proceedings of the ACM on Human-Computer Interaction, vol. 2, No. CSCW, Article 20, Nov. 2018, 26 pages.

Badawy et al., "Analyzing the Digital Traces of Political Manipulation: The 2016 Russian Interference Twitter Campaign", arXiv:1802. 04291v1, Feb. 12, 2018, 8 pages.

Badawy et al., "Who Falls for Online Political Manipulation? The case of the Russian Interference Campaign in the 2016 US Presidential Election", arXiv:1808.03281v1, Aug. 9, 2018, 17 pages.

Bail et al., "Assessing the Russian Internet Research Agency's Impact on the Political Attitudes and Behaviors of American Twitter Users in Late 2017", PNAS, vol. 117, No. 1, Jan. 7, 2020, 243-250.

Barbera et al., "Who Leads? Who Follows? Measuring Issue Attention and Agenda Setting by Legislators and the Mass Public Using Social Media Data", American Political Science Review, vol. 113, No. 4, 2019, 883-901.

Boyd et al., "Characterizing the Internet Research Agency's Social Media Operations During the 2016 U.S. Presidential Election using Linguistic Analyses", PsyArXiv, 2018, 9 pages.

Broniatowski et al., "Weaponized Health Communication: Twitter Bots and Russian Trolls Amplify the Vaccine Debate", American Journal of Public Health, vol. 108, No. 10, Oct. 2018, 8 pages.

Cataldi et al., "Emerging Topic Detection on Twitter based on Temporal and Social Terms Evaluation", MDMKDD 10: Proceedings of the Tenth International Workshop on Multimedia Data Mining, Article No. 4, Jul. 2010, 1-10.

Cheng et al., "Can Cascades Be Predicted?", WWW '14: Proceedings of the 23rd International Conference on World Wide Web, Apr. 2014, 11 pages.

Freelon et al., "Black Trolls Matter: Racial and Ideological Asymmetries in Social Media Disinformation" Social Science Computer Review, vol. 40, Issue 3, Apr. 7, 2020, 42 pages.

Ghanem et al., "TexTrolls: Identifying Russian Trolls on Twitter from a Textual Perspective", arXiv:1910.01340, 2019, 15 pages.

Gleicher, Nathaniel "Adversarial Design", 360/OS London, Retrieved via: https://www.youtube.com/watch?time_continue=20&v=EGIxgxvzPqg, Jun. 20, 2019, 1 page.

Golovchenko et al., "Cross-Platform State Propaganda: Russian Trolls on Twitter and YouTube during the 2016 U.S. Presidential Election" The International Journal of Press/Politics, 2020, vol. 25, No. 3, 357-389.

Hosseinmardi et al., "Analyzing Labeled Cyberbullying Incidents on the Instagram Social Network" Social Informatics, LNCS, vol. 9471, 2015, 49-66.

Im et al., "Still Out There: Modeling and Identifying Russian Troll Accounts on Twitter", Conference: WebSci '20: 12th ACM Conference on Web Science, Jul. 2020, 10 pages.

Keller et al., "Political Astroturfing on Twitter: How to Coordinate a Disinformation Campaign", Political Communication, vol. 37, 2020, 256-280.

Kim et al., "The Stealth Media? Groups and Targets behind Divisive Issue Campaigns on Facebook", Political Communication, vol. 35, 2018, 515-541.

Linvill et al., "Troll Factories: Manufacturing Specialized Disinformation on Twitter", Political Communication, vol. 37, Issue 4, 2020, 23 pages.

Lukito, Josephine "Coordinating a Multi-Platform Disinformation Campaign: Internet Research Agency Activity on Three U.S. Social Media Platforms, 2015 to 2017", Political Communication, vol. 37, No. 2, 2020, 238-255.

Martin et al., "Trends in Online Foreign Influence Efforts", Version 1.2, Jul. 8, 2019, 64 pages.

Massanari, Adrienne "#Gamergate and the Fappening: How Reddit's Algorithm, Governance, and Culture Support Toxic Technocultures" New Media & Society, vol. 19, No. 3, 2017, 329-346.

Pacheco et al., "Uncovering Coordinated Networks on Social Media: Methods and Case Studies", Proceedings of the International AAAI Conference on Web and Social Media, vol. 15, No. 1, 2020, 12 pages.

Papacharissi, Zizi "Affective Publics and Structures of Storytelling: Sentiment, Events and Mediality", Information, Communication & Society, vol. 19, No. 3, 2016, 307-324.

Pedregosa et al., "Scikit-learn: Machine Learning in Python", Journal of Machine Learning Research, vol. 12, 2011, 2825-2830.

Senate Select Committee on Intelligence "Open Hearing: Social Media Influence in the 2016 U.S. Elections", One Hundred Fifteenth Congress, First Session, Nov. 1, 2017, 456 pages.

Senate Select Committee on Intelligence "Questions for the Record", Hearing on Social Media Influence in the 2016 U.S. Elections, Nov. 29, 2017, 43 pages.

Senate Select Committee on Intelligence "Russian Active Measures Campaigns and Interference in the 2016 U.S. Election, vol. 2: Russia's Use of Social Media, with Additional Views", 116th Congress 1st Session Senate, Report 116-XX, 2019, 85 pages.

Stukal et al., "Detecting Bots on Russian Political Twitter", Big Data, vol. 5, No. 4, 2017, 310-324.

Tsur et al., "What's in a Hashtag? Content Based Prediction of the Spread of Ideas in Microblogging Communities" WSDM '12: Proceedings of the Fifth ACM International Conference on Web Search and Data Mining, Feb. 8-12, 2012, 643-652.

Twitter "About Twitter | Civic Integrity Positions and Policies", Retrieved via: https://about.twitter.com/en/our-priorities/civic-integrity, Jun. 29, 2022, 12 pages.

Twitter "Retrospective Review: Twitter, Inc. and the 2018 Midterm Elections in the United States", Jan. 31, 2019, 26 pages.

Twitter Public Policy "Update on Twitter's Review of the 2016 US Election", Retrieved via: https://blog.twitter.com/en_us/topics/company/2018/2016-election-update, Jan. 19, 2018, 7 pages.

Varol et al., "Early Detection of Promoted Campaigns on Social Media", EPJ Data Science, vol. 6, No. 13, 2017, 19 pages.

Varol et al., "Online Human-Bot Interactions: Detection, Estimation, and Characterization", Proceedings of the Eleventh International AAAI Conference on Web and Social Media (ICWSM 2017), 2017, 280-289.

Walker, Edward T., "Grassroots for Hire: Public Affairs Consultants in American Democracy", Cambridge University Press, Jun. 2014, 4 pages.

Welles et al., "The Battle for #Baltimore: Networked Counterpublics and the Contested Framing of Urban Unrest", International Journal of Communication, vol. 13, 2019, 1699-1719.

(56)          References Cited

OTHER PUBLICATIONS

Xia et al., "Disinformation, Performed: Self-Presentation of a Russian IRA Account on Twitter", Information, Communication & Society, vol. 22, No. 11, 2019, 1646-1664.
Yin et al., "Your Friendly Neighborhood Troll: The Internet Research Agency's Use of Local and Fake News in the 2016 US Presidential Campaign" SMaPP Data Report, Social Media and Political Participation Lab, New York University, 2018, 33 pages.
Zannettou et al., "Characterizing the Use of Images in State-Sponsored Information Warfare Operations by Russian Trolls on Twitter", arXiv:1901.05997v2, Nov. 21, 2019, 13 pages.

* cited by examiner

**Summary of Twitter and Reddit Data and
for Troll and Control Accounts**

| Platform | Type | Category | No. of Accounts | No. of Posts |
|---|---|---|---|---|
| Twitter | Troll | China | 2,660 | 1,940,180 |
| | Troll | Russia | 3,722 | 3,738,750 |
| | Troll | Venezuela | 594 | 1,488,142 |
| | Control | U.S. Political | 5,000 | 22,977,929 |
| | Control | U.S. Random | 5,000 | 20,935,038 |
| Reddit | Troll | Russia | 944 | 14,471 |
| | Control | Political Subreddits | 107,052 | 713,236 |
| | Control | Top 30 Russian-Targeted Subreddits | 784,711 | 5,475,687 |

Mean and SD of Monthly Macro-averaged F1 Scores

| Country | Platform | Task 1: Within-Month Train/Test* | Task 2: Train on $t-1$, Test on $t$ † | Task 3: Train on $t-1$, Test on New Users in $t$ ‡ | Task 4: Within-Month Cross-Release | Task 5: Within-Month Cross-Platform |
|---|---|---|---|---|---|---|
| China | Twitter | 0.89 | 0.93 | 0.89 | NA§ | NA‖ |
| | | (0.08) | (0.04) | (0.12) | - | - |
| Russia | Twitter | 0.85 | 0.81 | 0.81 | 0.75 | 0.60‡ |
| | | (0.13) | (0.07) | (0.13) | (0.11) | (0.03) |
| Russia | Reddit | 0.82 | 0.82 | 0.74 | NA§ | 0.37 |
| | | (0.07) | (0.09) | (0.15) | - | (0.03) |
| Venezuela | Twitter | 0.99 | 0.99 | 0.92 | 0.49 | NA‖ |
| | | (0.03) | (0.002) | (0.15) | (0.07) | - |

*FIG. 3*

Venezuela in Twitter

*FIG. 4(c)*

China in Twitter

| Prediction Performance with Various Control Users | | | |
|---|---|---|---|
| Country | Train/Test Against Random Users | Train/Test Against Political Users | Train/Test Against Both |
| *Task 1* | | | |
| China | 0.89 (0.07) | 0.90 (0.08) | 0.88 (0.08) |
| Russia | 0.90 (0.10) | 0.85 (0.13) | 0.85 (0.13) |
| *Task 2* | | | |
| China | 0.93 (0.04) | 0.94 (0.03) | 0.93 (0.04) |
| Russia | 0.88 (0.11) | 0.81 (0.13) | 0.81 (0.13) |
| *Task 3* | | | |
| China | 0.91 (0.09) | 0.89 (0.12) | 0.89 (0.12) |
| Russia | 0.88 (0.11) | 0.82 (0.13) | 0.81 (0.13) |
| *Task 4* | | | |
| Russia | 0.88 (0.06) | 0.77 (0.12) | 0.75 (0.11) |
| *Task 5* | | | |
| Russia (Train on Twitter) | 0.70 (0.02) | 0.63 (0.02) | 0.68 (0.03) |
| Russia (Train on Reddit) | 0.36 (0.05) | 0.29 (0.04) | 0.37 (0.03) |

*FIG. 10*

Comparing Estimated Coefficients and Standard Errors Between Various Regression Models Explaining F1 Score of Prediction

| | Baseline[a] | (1)+ Temporal Controls[b] | (2)+ Restrict to Twitter[c] | (3)+ Control for Activity | (4)+ Control for Imbalance[d] | (5)+ Control for Events[e] |
|---|---|---|---|---|---|---|
| Column Number | (1) | (2) | (3) | (4) | (5) | (6) |
| Variables | b/se | b/se | b/se | b/se | b/se | b/se |
| Russia Twitter | 0.087*** (0.02) | 0.095*** (0.02) | | | | |
| China Twitter | 0.126*** (0.02) | 0.143*** (0.02) | 0.045*** (0.02) | 0.062** (0.03) | 0.009 (0.02) | 0.007 (0.02) |
| Venezuela Twitter | 0.148*** (0.02) | 0.171*** (0.03) | 0.075*** (0.02) | -0.016 (0.05) | -0.075 (0.05) | -0.078* (0.05) |
| Prediction Task 2 | 0.002 (0.01) | 0.008 (0.01) | -0.001 (0.01) | -0.007 (0.01) | -0.038*** (0.01) | -0.037*** (0.01) |
| Prediction Task 3 | -0.081*** (0.02) | -0.077*** (0.02) | -0.075*** (0.02) | -0.089*** (0.02) | -0.094*** (0.02) | -0.094*** (0.02) |
| Prediction Task 4 | -0.232*** (0.03) | -0.226*** (0.03) | -0.230*** (0.03) | -0.245*** (0.03) | -0.274*** (0.03) | -0.275*** (0.03) |
| RT Share | | | | 0.023 (0.07) | -0.084 (0.06) | -0.082 (0.06) |
| Reply Share | | | | 0.061 (0.15) | 0.278** (0.12) | 0.277** (0.12) |
| Share w/Hashtag | | | | 0.010 (0.08) | -0.001 (0.07) | -0.016 (0.07) |
| Share w/Mention | | | | -0.524*** (0.11) | -0.446*** (0.08) | -0.444*** (0.08) |
| Share w/Local News URL | | | | -0.050 (0.17) | -0.174 (0.16) | -0.171 (0.16) |
| Log (Positives in Test) | | | | | 0.045*** (0.01) | 0.046*** (0.01) |
| Log (Positives in Train) | | | | | 0.040*** (0.01) | 0.040*** (0.01) |
| Class Imbalance in Test | | | | | 0.267*** (0.03) | 0.272*** (0.03) |
| Count of Major Events | | | | | | 0.000 (0.00) |
| Average Rating of Events | | | | | | -0.039* (0.02) |
| Mean of Dependent Variable | 0.82 | 0.82 | 0.84 | 0.84 | 0.84 | 0.84 |
| # Observations | 415 | 415 | 364 | 364 | 364 | 364 |
| R-Squared | 0.36 | 0.41 | 0.41 | 0.49 | 0.60 | 0.60 |

Baseline campaign for columns 1 and 2 is Russian activity on Reddit. Baseline campaign for columns 3-6 is Russian activity on Twitter. Baseline task is cross-sectional prediction. Robust standard errors in parentheses: *.1, .05, *.01.

*FIG. 12*

| Operation | Top 10 Most Frequent Top Monthly Important Features (In Frequency Order) |
|---|---|
| China (Twitter) | Top users mentioned by trolls, Days since creation, Top users mentioned by trolls in tweets with a political URL, Top usesrs mentioned by trolls in tweets with a local news URL, Top words used by trolls, Whether account created before 2013, Ratio of stop words, Top bigrams used by trolls, Whether account created before 2016, Readability score. |
| Russia (Twitter) | Days since creation, Top users mentioned by troll, Account creation date before 2013, Being retweet, Number of mentioned users in a tweet, Top hashtags used by trolls, Account creation date in first half of 2015, Top users mentioned by trolls in tweets with a political URL, Top users mentioned by trolls in tweets with a far-right URL, top users mentioned by trolls in Tweets with a fake news URL. |
| Russia (Reddit) | Top bigrams used by trolls, Top words used by troll, Account creation years, Days since creation, Top URL domains shared by trolls, Length of URL, Top alt-media subreddits targeted by trolls, Top subreddits targeted by trolls, Whether domain is *imgur.com*, Top conspiracy websites shared by troll. |
| Venezuala (Twitter) | Top users mentioned by trolls in tweets with a political URL, Top users mentioned by trolls, Top URL domains shared by trolls, Days since creation, Account creation date before 2015, Top users mentioned by trolls in tweets with a fake news URL. Top users mentioned by trolls in tweets with a far-right URL, Account creation date in second half of 2017, Length of URL, Whether domain is *trumpservativenews.club*. |

*FIG. 13*

| Category | Feature Description | Count |
|---|---|---|
| Content | Word count/average word density of a tweet/URL | 4 |
| | Character count of a tweet/URL/domain | 3 |
| | Topic of a tweet (training LDA on whole training data) | 100 |
| | Upper case count of a tweet/URL | 2 |
| | Number of hashtag/URL/sentence/syllable/punctuation | 5 |
| | Count and Proportion of Part of Speech (POS) count | 10 |
| | Readability Scores of a tweet | 7 |
| | Number of sub-directories of a URL | 1 |
| | Positive and Negative emotion scores of a tweet/URL | 4 |
| | Anxiety and Anger score of a tweet/URL | 4 |
| | Certainty/Differentiation/Subjectivity scores of a tweet/URL | 6 |
| | Informal/swear/netspeak/nonfluent score of a tweet/URL | 8 |
| | Personal pronouns/55st pers singular/55st pers plural scores of a tweet/URL | 6 |
| | Total number of emoticons in a tweet | 1 |
| | Time orientations/past focus/present focus/future focus of a tweet/URL | 8 |
| | Polarity score of a tweet/URL | 8 |
| | Risk/reward/power scores of a tweet/URL | 6 |
| Meta-Content | Number and ratio of top 25/50 words written by trolls | 4 |
| | Top 100 words used by trolls | 100 |
| | Number and ratio of top 3/5/550/25 hashtags written by trolls | 8 |
| | Top 100 hashtags used by trolls | 100 |
| | Number and ratio of 3/5/550/25 bigrams written by trolls | 8 |
| | Top 100 bigrams written by trolls | 100 |
| | Number and ratio of top 3/5/550/25 far-left, left, left-center, center, right-center, right, far-righ, local, national, political, and opensource words written by trolls | 88 |
| | Number and ratio of top 3/5/550/25 far-left, left, left-center, center, right-centere, right, far-right, local, national, policical, and opensource hashtags written by trolls | 88 |

FIG. 14(a)

| | |
|---|---|
| Number and ratio of top 3/5/550/25 far-left, left, left-center, center, right-center, right, far-right, local, national, political, and opensource bigrams written by trolls | 88 |
| Top 25 users mentioned by trolls | 25 |
| Is it a news, political, link-aggregator, contact-page, commercial, adult, sport, or non-US audience website? (For definition and methodology of creating these categories of website see: https://www.pewresearch.org/internet/2018/04/09/ bots-in-the-twittersphere-methodology/) | 8 |
| Is it a local or national news website? (See Table 2-3 in [41] for a full list of national and local news websites respectively) | 2 |
| Is it a left, right, far-left, far-right, or centrist website? (We obtained list of websites in each category by consulting https://mediabiasfactcheck.com/) | 5 |
| Is it an opensource.com (fake news) website? (See https://github.com/several27/FakeNewsCorpus) | 1 |
| Is it a socal media or youtube link? | 2 |
| Is it an image-sharing or video-hosting website? (For a list of image sharing websites see: https://en.wikipedia.org/wiki/ List_of_image-sharing_websites. For a list of video hosting services see: https://en.wikipeidia.org/wiki/ List_of_video_hosting_services) | 2 |
| Number of unique URLs/URL domains in a tweet | 2 |
| Is the URL shortened? | 1 |
| Is it a news website? | 1 |
| Is it among the top 25/50 domains shared by trolls? | 2 |
| Top 25 domains shared by trolls | 25 |
| Is it among the top 5/550/25/50 political/local/national websites shared by trolls? | 12 |
| Top 25 political/local/national news websites used by trolls | 75 |
| Is it among the top 5/550/25/50 opensource.co websites shared by trolls? | 4 |
| Is it among the top 3/5/550/25 left/far-left/center/right/far-right websites shared by trolls? | 20 |
| Top 25 left/far-left/center/right/far-right websites shared by trolls | 125 |
| Is it among the top 3/5 URL-shortener websites shared by trolls? | 2 |
| Is it among the top 3/5/550/20 local news websites in swing states shared by trolls? | 4 |
| Is it among the local news in swing states websites? | 1 |
| Is it among the top 3/5/550 contact-page/link-aggregator websites used by trolls? | 6 |

FIG. 14(b)

| | Top 10 contact-page/link-aggregator websites used by troll | 20 |
|---|---|---|
| User Timing | Days since the creation of account | 1 |
| | Days since the creation of account power by 2 | 1 |
| | Whether days since creation of account is less than 7/30/90 days | 3 |
| | Whether account creation date is in 2009-2018 | 10 |
| | Whether account creation date is before 2013-2017 | 5 |
| | Whether account creation date is in first/second half of 2013-2017 | 10 |
| Content Timing | Whether tweet time in within US/Russia working hour | 2 |
| | Whether tweet published on Sunday through Saturday in US/Russia time | 14 |
| | Whether tweet published on US/Russia weekend | 2 |
| | Time of day during which a tweet is posted | 7 |
| Network | Weighted degree of hashtags contained in a tweet in the co-occurring and co-shared hashtags networks of trolls (For each feature, we compute and use the following statistics: min, max, mean, median, std, kurtosis, skewness, entropy, pagerank, eigenvector and betweenness.) | 22 |
| | Weighted degree of URLs contained in a tweet in the co-occurring and co-shared URL networks of trolls (For each feature, we compute and use the following statistics: min, max, mean, median, std, kurtosis, skewness, entropy, pagerank, eigenvector and betweenness.) | 22 |
| | Weighted degree of mentioned users in a tweet in the co-occurring and co-shared mentions networks of trolls (For each feature, we compute and use the following statistics: min, max, mean, median, std, kurtosis, skewness, entropy, pagerank, eigenvector and betweenness.) | 22 |
| | Weights between hashtags contained in a tweet in the co-occurring and co-shared hashtag networks of trolls (For each feature, we compute and use the following statistics: min, max, mean, median, std, kurtosis, skewness, and entropy) | 16 |
| | Weights between URL contained in a tweet in the co-occurring and co-shared URL domain networks of trolls (For each feature, we compute and use the following statistics: min, max, mean, median, std, kurtosis, skewness, and entropy) | 16 |
| | Weights between mentioned users contained in a tweet in the co-occurring and co-shared mentions networks of trolls (For each feature, we compute and use the following statistics: min, max, mean, median, std, kurtosis, skewness, and entropy) | 16 |
| Total | | 1,300 |

*FIG. 14(c)*

Monthly Mean of Macro-averaged F1 Scores for Detection of Russian Troll Tweets, with Varying Predictor Sets

| Model Number | Only Content | (1)+ Meta-Content | (2)+ Content Timing | (3)+ User Timing | (4)+ Network Features |
|---|---|---|---|---|---|
| | (1) | (2) | (3) | (4) | (5) |
| Experiments | | | | | |
| Within-Month Train/Test (Task 1) | 0.76 | 0.81 | 0.82 | 0.85 | 0.84 |
| Train on $t-1$ Test on $t$ (Task 2) | 0.74 | 0.82 | 0.82 | NA | 0.85 |
| Train on $t-1$ Test on New Users in $t$ (Task 3) | 0.66 | 0.75 | 0.75 | 0.81 | 0.82 |
| Within-Month Cross-Release (Task 4) | 0.66 | 0.70 | 0.70 | 0.74 | 0.75 |

User-timing features were removed for Task 3. Task 5 is excluded because on a reduced set of features and therefore not comparable to other tasks.

*FIG. 15*

Prediction Performance with Varying Predictor Sets

| Model Number | Only Content | (1)+ Meta-Content | (2)+ Content Timing | (3)+ User Timing | (4)+ Network Features |
|---|---|---|---|---|---|
| | (1) | (2) | (3) | (4) | (5) |
| Experiments | | | | | |
| *China* | | | | | |
| Within-Month Train/Test | 0.69 | 0.88 | 0.88 | 0.89 | 0.88 |
| Train on $t$ - 1 Test on $t$ [a] | 0.83 | 0.93 | 0.93 | NA[b] | 0.94 |
| Train on $t$ - 1 Test on New Users in $t$ | 0.67 | 0.88 | 0.88 | 0.89 | 0.89 |
| *Russia* | | | | | |
| Within-Month Train/Test | 0.68 | 0.80 | 0.80 | 0.82 | 0.82 |
| Train on $t$ - 1 Test on $t$ [a] | 0.63 | 0.82 | 0.82 | NA[b] | 0.81 |
| Train on $t$ - 1 Test on New Users in $t$ | 0.67 | 0.71 | 0.71 | 0.74 | 0.74 |
| *Venezuela* | | | | | |
| Within-Month Train/Test | 0.97 | 0.98 | 0.98 | 0.99 | 0.99 |
| Train on $t$ - 1 Test on $t$ [a] | 0.93 | 0.99 | 0.99 | NA[b] | 0.96 |
| Train on $t$ - 1 Test on New Users in $t$ | 0.84 | 0.87 | 0.86 | 0.92 | 0.91 |
| Within-Month Cross-Release | 0.59 | 0.53 | 0.53 | 0.49 | 0.49 |

[a] All user-level identifiers are removed for this test
[b] Not applicable

*FIG. 16*

Timeline of Retweets

FIG. 18(a)

| Type | Feature | Count |
|---|---|---|
| Content | Word/character count, upper case count, average word density of a tweet/URL | 8 |
| | Number of hashtag, URL, sentence, syllable, and punctuation | 5 |
| | Count/Proportion of Part of Speech (POS) count | 10 |
| | Readability Scores of a tweet | 7 |
| | Number of sub-directories of a URL | 1 |
| | LIWC scores of a tweet/URL | 36 |
| | Polarity, risk, and power scores of a tweet/URL | 12 |
| Meta-Content | Number/ratio of top 3/5/550/25 words, hashtags, and bigrams written by trolls | 24 |
| | Top 100 troll word, hashtag, and bigram | 300 |
| | Number/ratio of top 3/5/550/25 far-left, left, left-center, center, right-center, right , far-right, local, national, political, and opensource word, hashtag, and bigram written by trolls | 264 |
| | Top 25 users mentioned by trolls | 25 |
| | Type of website? | 17 |
| | Is it a social media or youtube link? | 4 |
| | No. of unique URL domains in a tweet | 2 |
| | Is the URL shortened? | 1 |
| | Is it among the top 25/50 troll domains? | 2 |
| | Top 25 domains shared by trolls within each type | 245 |
| | Is it among the top 5/550/25/50 political, local, national, fake news, partisan, and contact-page websites shared by trolls? | 46 |
| | Is it among the top 3/5 URL-shortener websites shared by trolls? | 2 |
| | Is it among the local news in swing states websites? | 1 |
| Account Timing | Days since the creation of account | 1 |
| | Days since the creation of account power by 2 | 1 |
| | Whether days since creation of account is less than 7/30/90 days | 3 |
| | Whether account creation date is in 2009-2018 | 10 |
| | Whether account creation date is before 2013-2017 | 5 |
| | Whether account creation date is in first/second half of 2013-2017 | 10 |
| Tweet Timing | Whether tweet time in within US/Russia working hour | 2 |
| | Whether tweet published on Sunday through Saturday in US/Russia time | 14 |
| | Whether tweet published on US/Russia weekend | 2 |
| | Time of day during which a tweet is posted | 7 |
| Total | | 1,067 |

*FIG. 21*

|  | China | Russia | Venezuela |
|---|---|---|---|
| Duration (# Months) | 33 | 42 | 14 |
| Sampling Strategy |  |  |  |
| Baseline | 0.57 (0.01) | 0.70 (0.02) | 0.96 (0.000) |
| Least Confident | 0.86 (0.02) | 0.79 (0.02) | 0.99 (0.000) |
| Entropy | 0.86 (0.01) | 0.78 (0.02) | 0.99 (0.000) |
| Certainty | 0.80 (0.02) | 0.76 (0.03) | 0.99 (0.000) |
| Hybrid | 0.81 (0.02) | 0.76 (0.03) | 0.99 (0.000) |

*FIG. 22*

|  | China | Russia | Venezuela |
|---|---|---|---|
| Duration (# Months) | 33 | 42 | 14 |
| Sampling Strategy |  |  |  |
| Baseline | 0.85 (0.008) | 0.73 (0.01) | 0.98 (0.000) |
| Least Confident | 0.92 (0.002) | 0.88 (0.002) | 0.99 (0.000) |
| Entropy | 0.92 (0.002) | 0.88 (0.002) | 0.99 (0.000) |
| Certainty | 0.83 (0.01) | 0.67 (0.02) | 0.97 (0.003) |
| Hybrid | 0.84 (0.01) | 0.70 (0.02) | 0.97 (0.003) |

*FIG. 23*

|  |  | China | Russia | Venezuela |
|---|---|---|---|---|
| Duration (# Months) |  | 33 | 42 | 14 |
| Sampling Strategy |  |  |  |  |
| Baseline | Tweets | 0 | 0 | 0 |
|  | Users | 0 | 0 | 0 |
| Least Confident | Tweets | 495 | 1,267 | 3 |
|  | Users | 190 | 328 | 2 |
| Entropy | Tweets | 425 | 1,028 | 7 |
|  | Users | 172 | 311 | 4 |
| Certainty | Tweets | 0 | 0 | 0 |
|  | Users | 0 | 0 | 0 |
| Hybrid | Tweets | 495 | 1,267 | 3 |
|  | Users | 190 | 328 | 2 |

FIG. 24

|  |  | China | Russia | Venezuela |
|---|---|---|---|---|
| Duration (# Months) |  | 33 | 42 | 14 |
| Sampling Strategy |  |  |  |  |
| Baseline | Tweets | 0 | 0 | 0 |
|  | Users | 0 | 0 | 0 |
| Least Confident | Tweets | 3,961 | 12,406 | 21 |
|  | Users | 632 | 2,118 | 6 |
| Entropy | Tweets | 3,487 | 10,877 | 28 |
|  | Users | 560 | 1,949 | 6 |
| Certainty | Tweets | 0 | 0 | 0 |
|  | Users | 0 | 0 | 0 |
| Hybrid | Tweets | 3,487 | 12,406 | 28 |
|  | Users | 632 | 2,118 | 6 |

FIG. 25

| | Only Content | (1)+ Meta-Content | (2)+ Content Timing | (3)+ Account Timing | (4)+ Network |
|---|---|---|---|---|---|
| Model Number | (1) | (2) | (3) | (4) | (5) |
| Sampling Strategy | | | | | |
| Baseline | 0.59 | 0.65 | 0.65 | 0.70 | 0.71 |
| Least Confident | 0.68 | 0.76 | 0.76 | 0.79 | 0.78 |
| Entropy | 0.68 | 0.74 | 0.75 | 0.78 | 0.76 |
| Certainty | 0.66 | 0.73 | 0.73 | 0.76 | 0.74 |
| Hybrid | 0.68 | 0.72 | 0.73 | 0.76 | 0.76 |

*FIG. 28*

| | Only Content | (1)+ Meta-Content | (2)+ Content Timing | (3)+ Account Timing | (4)+ Network |
|---|---|---|---|---|---|
| Model Number | (1) | (2) | (3) | (4) | (5) |
| Sampling Strategy | | | | | |
| Baseline | 0.61 | 0.68 | 0.68 | 0.73 | 0.72 |
| Least Confident | 0.74 | 0.83 | 0.84 | 0.88 | 0.86 |
| Entropy | 0.75 | 0.84 | 0.84 | 0.88 | 0.86 |
| Certainty | 0.57 | 0.67 | 0.67 | 0.67 | 0.66 |
| Hybrid | 0.62 | 0.68 | 0.68 | 0.70 | 0.71 |

*FIG. 29*

| Variable | # of Obs. | Mean | Std. Dev. | Min | Max |
|---|---|---|---|---|---|
| Precision | 904 | 0.91 | 0.13 | 0.50 | 1.00 |
| Recall | 904 | 0.83 | 0.14 | 0.46 | 1.00 |
| F1-Score | 904 | 0.83 | 0.16 | 0.42 | 1.00 |
| Retweet Share | 904 | 0.37 | 0.28 | 0.00 | 0.86 |
| Reply Share | 904 | 0.06 | 0.07 | 0.00 | 0.26 |
| With Hashtag | 904 | 0.30 | 0.23 | 0.001 | 0.76 |
| With Mention | 904 | 0.16 | 0.11 | 0.00 | 0.47 |
| With Local New URL | 904 | 0.04 | 0.06 | 0 | 0.28 |
| Log (Positives in Test) | 904 | 8.54 | 2.72 | 0.00 | 12.48 |
| Log (Positives in Train) | 904 | 10.60 | 2.22 | 3.26 | 13.25 |

*FIG. 30*

|  | Precision | Recall | F1 |
|---|---|---|---|
|  | b/se | b/se | b/se |
| Predicting New Trolls Content | -0.001 | -0.015 | -0.038* |
|  | (0.03) | (0.02) | (0.02) |
| Chinese Operation | -0.06 | -0.09** | -0.10*** |
|  | (0.04) | (0.03) | (0.03) |
| Venezuelan Operation | -0.03 | -0.06* | -0.07** |
|  | (0.05) | (0.03) | (0.03) |
| Certainty Sampling | 0.083* | -0.023 | 0.038 |
|  | (0.05) | (0.02) | (0.04) |
| Least Confident Sampling | 0.168*** | 0.018 | 0.136*** |
|  | (0.05) | (0.03) | (0.04) |
| Hybrid Sampling | 0.089* | -0.019 | 0.048 |
|  | (0.04) | (0.02) | (0.04) |
| Entropy Sampling | 0.149*** | 0.021 | 0.126*** |
|  | (0.05) | (0.03) | (0.04) |
| RT Share | -0.067 | -0.35*** | -0.29*** |
|  | (0.05) | (0.04) | (0.04) |
| Reply Share | 0.37*** | -0.008 | 0.32*** |
|  | (0.07) | (0.13) | (0.12) |
| Share with Hashtag | -0.017 | 0.057** | 0.030 |
|  | (0.03) | (0.02) | (0.02) |
| Share with Mention | -0.40*** | -0.21*** | -0.53*** |
|  | (0.07) | (0.07) | (0.07) |
| Share with Local News URL | -0.14** | -0.28*** | -0.34*** |
|  | (0.05) | (0.10) | (0.11) |
| Log (Positives in Test) | 0.017*** | -0.003 | 0.004 |
|  | (0.00) | (0.00) | (0.00) |
| Log (Positives in Train) | -0.03*** | 0.01*** | -0.006 |
|  | (0.01) | (0.00) | (0.01) |
| Mean of dependent variable | 0.91 | 0.83 | 0.83 |
| # Observations | 904 | 904 | 904 |
| R-Squared | 0.52 | 0.55 | 0.57 |

Clustered robust standard error in parentheses:
* p <0.05,  p <0.051, * p <0.001.

*FIG. 31*

SYSTEM AND METHOD FOR MACHINE LEARNING BASED PREDICTION OF SOCIAL MEDIA INFLUENCE OPERATIONS

CROSS-REFERENCE TO RELATED APPLICATIONS

This application claims priority to provisional applications 62/893,005 and 62/992,551, filed Aug. 28, 2019 and Mar. 20, 2020, respectively, which are herein incorporated by reference in their entirety.

FIELD OF THE INVENTION

The present invention relates generally to social media influence operations and, more particularly, to a system and method for machine learning based detection of coordinated influence campaigns on social media.

BACKGROUND OF THE INVENTION

The same features that make social media useful to activists, low barriers to entry, scalability, easy division of labor, and freedom to produce media targeted at any given country from almost anywhere in the world, also render it vulnerable to industrialized manipulation campaigns by well-resourced actors, including but not limited to domestic and foreign governments and private companies. Here, coordinated influence operations are defined as (i) coordinated campaigns by one or more organizations, parties, or states to affect one or more specific aspects of politics, commerce, or life generally in domestic or other states, and (ii) through social media, by (iii) producing content designed to appear indigenous to the target audience or state. South Korea conducted the first documented coordinated influence operation on social media in 2012. Since then, what some term political astroturfing has spread widely, particularly in U.S. domestic politics. There were at least 96 such influence efforts targeting 30 countries around the world from 2013 to 2019.

One well-covered example of these campaigns is the alleged effort by Russia's Internet Research Agency (IRA) to shape American politics, for which it was indicted by the U.S. government in February 2018. Social media platforms have worked to limit coordinated influence operations and published reports on campaigns on Facebook [from Egypt, United Arab Emirates (UAE), and Saudi Arabia], Reddit (from Russia), and Twitter (from Bangladesh, China, Ecuador, Iran, Russia, Saudi Arabia, Spain, UAE, and Venezuela). Previous academic work on the topic has focused on characterizing influence campaigns, including describing the methods used on social media by IRA operatives to affect public opinion, inferring influence effort strategies and tactics based on observed behaviors, assessing their political influence, showing how other Twitter users interacted with IRA-run accounts, exploring the co-occurrence of images shared by the IRA operatives and real-world users, and identifying which kinds of users were likely to spread IRA content. IRA operatives are often referred to as "trolls" in the literature and that term is adopted herein to refer to the persons and parties that are part of an online influence campaign, not just someone behaving as a provocateur.

One key open scientific and policy question is the difficulty of distinguishing content which is part of industrialized information campaigns from organic social media activity. This issue is different in critical respects from the well-studied issue of bot detection (i.e. finding accounts whose activity is being automated). First, influence operations typically involve a mix of manual and automated activity (i.e., not all participating accounts are bots), and automation is widely used for other purposes (i.e., not all bots are part of influence campaigns, many are used for legitimate purposes such as providing responses to common customer service questions). Second, the key feature of an influence operation is the coordinated behavior across multiple accounts, as opposed to the behavior of individual accounts.

A small body of work has shown that it is possible to find coordinated influence efforts on social media using unsupervised or supervised machine learning. Unsupervised approaches usually involve leveraging some external intelligence to narrow down tracking, constructing networks, cluster analysis of accounts (also known as community detection) to identify coordination, and manually inspecting each cluster. Unsupervised approaches have two main drawbacks: (i) they can only identify coordination after it has happened, and (ii) they are not scalable. Further, current supervised models do not answer whether such activity generally leaves a discernible signature, how the detectability of influence operations varies over time and across campaigns, or why it might do so.

As such, there is a need for a machine learning based approach for detecting coordinated influence efforts that addresses the above deficiencies in the current state of the art.

SUMMARY OF THE INVENTION

According to various embodiments, a machine learning based method, system, and non-transitory computer-readable medium for identifying content on social media related to one or more coordinated influence efforts are disclosed.

According to various embodiments, the method includes generating one or more datasets of post-uniform resource locator (URL) pairs produced from one or more known coordinated influence efforts on one or more social media platforms. The method further includes generating one or more datasets of post-URL pairs produced from one or more random users on one or more social media platforms. The method additionally includes extracting a plurality of content-based features from the post-URL pairs from known coordinated influence efforts and random users. The method also includes iteratively training a classifier over a predetermined period of time to distinguish between a post-URL pair produced from a coordinated influence effort and a post-URL pair produced from a random user using the extracted plurality of content-based features.

According to various embodiments, the method further includes improving the identification of content on social media related to one or more coordinated influence efforts. The improvement includes predicting with the trained classifier a probability that a post-URL pair of a sample of post-URL pairs is produced from a coordinated influence effort. The improvement further includes setting a review threshold based on the probability for manual investigation of whether the post-URL pair is produced from a coordinated influence effort. The improvement additionally includes adding a resulting label from the manual investigation of the post-URL pair to one of the generated one or more datasets produced from one or more known coordinated influence efforts and the generated one or more datasets produced from one or more random users. The improvement also includes retraining the classifier to distinguish between a post-URL pair produced from a coordinated influence effort and a post-URL pair produced from a random user using the extracted plurality of content-based features based on the additional resulting label.

According to various embodiments, the system includes one or more processors configured to generate one or more datasets of post-uniform resource locator (URL) pairs produced from one or more known coordinated influence efforts on one or more social media platforms. The processors are further configured to generate one or more datasets of post-URL pairs produced from one or more random users on one or more social media platforms. The processors are additionally configured to extract a plurality of content-based features from the post-URL pairs from known coordinated influence efforts and random users. The processors are also configured to iteratively train a classifier over a predetermined period of time to distinguish between a post-URL pair produced from a coordinated influence effort and a post-URL pair produced from a random user using the extracted plurality of content-based features.

According to various embodiments, the processors are further configured to improve the identification of content on social media related to one or more coordinated influence efforts. The improvement includes predicting with the trained classifier a probability that a post-URL pair of a sample of post-URL pairs is produced from a coordinated influence effort. The improvement further includes setting a review threshold based on the probability for manual investigation of whether the post-URL pair is produced from a coordinated influence effort. The improvement additionally includes adding a resulting label from the manual investigation of the post-URL pair to one of the generated one or more datasets produced from one or more known coordinated influence efforts and the generated one or more datasets produced from one or more random users. The improvement also includes retraining the classifier to distinguish between a post-URL pair produced from a coordinated influence effort and a post-URL pair produced from a random user using the extracted plurality of content-based features based on the additional resulting label.

According to various embodiments, the non-transitory computer-readable medium has stored thereon a computer program for execution by a processor configured to perform the machine learning based method for identifying content on social media related to one or more coordinated influence efforts. The method includes generating one or more datasets of post-uniform resource locator (URL) pairs produced from one or more known coordinated influence efforts on one or more social media platforms. The method further includes generating one or more datasets of post-URL pairs produced from one or more random users on one or more social media platforms. The method additionally includes extracting a plurality of content-based features from the post-URL pairs from known coordinated influence efforts and random users. The method also includes iteratively training a classifier over a predetermined period of time to distinguish between a post-URL pair produced from a coordinated influence effort and a post-URL pair produced from a random user using the extracted plurality of content-based features.

According to various embodiments, the non-transitory computer-readable medium has stored thereon a computer program for execution by a processor configured to perform the machine learning based method further including improving the identification of content on social media related to one or more coordinated influence efforts. The improvement includes predicting with the trained classifier a probability that a post-URL pair of a sample of post-URL pairs is produced from a coordinated influence effort. The improvement further includes setting a review threshold based on the probability for manual investigation of whether the post-URL pair is produced from a coordinated influence effort. The improvement additionally includes adding a resulting label from the manual investigation of the post-URL pair to one of the generated one or more datasets produced from one or more known coordinated influence efforts and the generated one or more datasets produced from one or more random users. The improvement also includes retraining the classifier to distinguish between a post-URL pair produced from a coordinated influence effort and a post-URL pair produced from a random user using the extracted plurality of content-based features based on the additional resulting label.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 3 depicts a table of mean and standard deviation of monthly macro-averaged F1 scores according to an embodiment of the present invention;

Figure 4C:
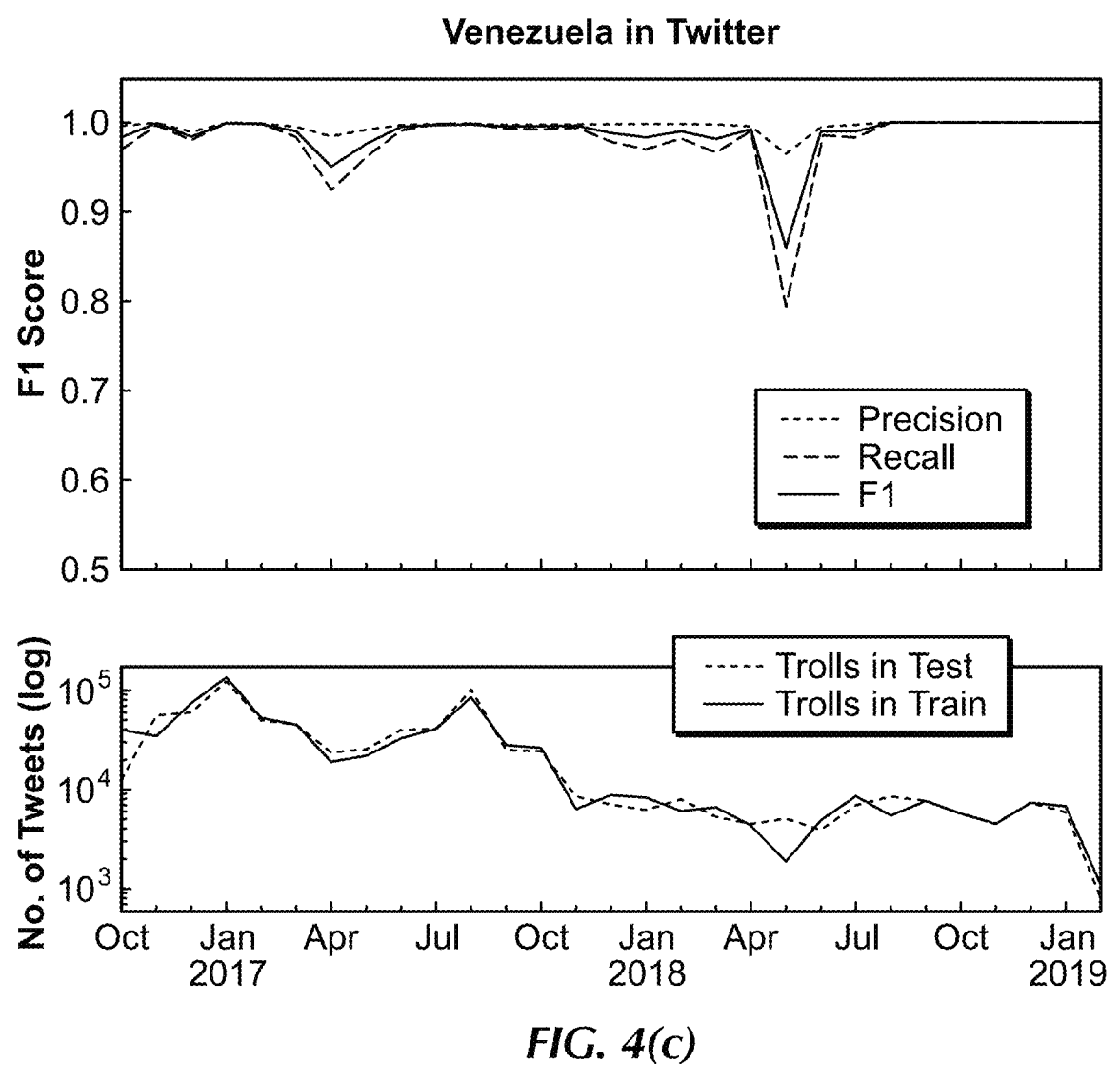
Figure 4D:
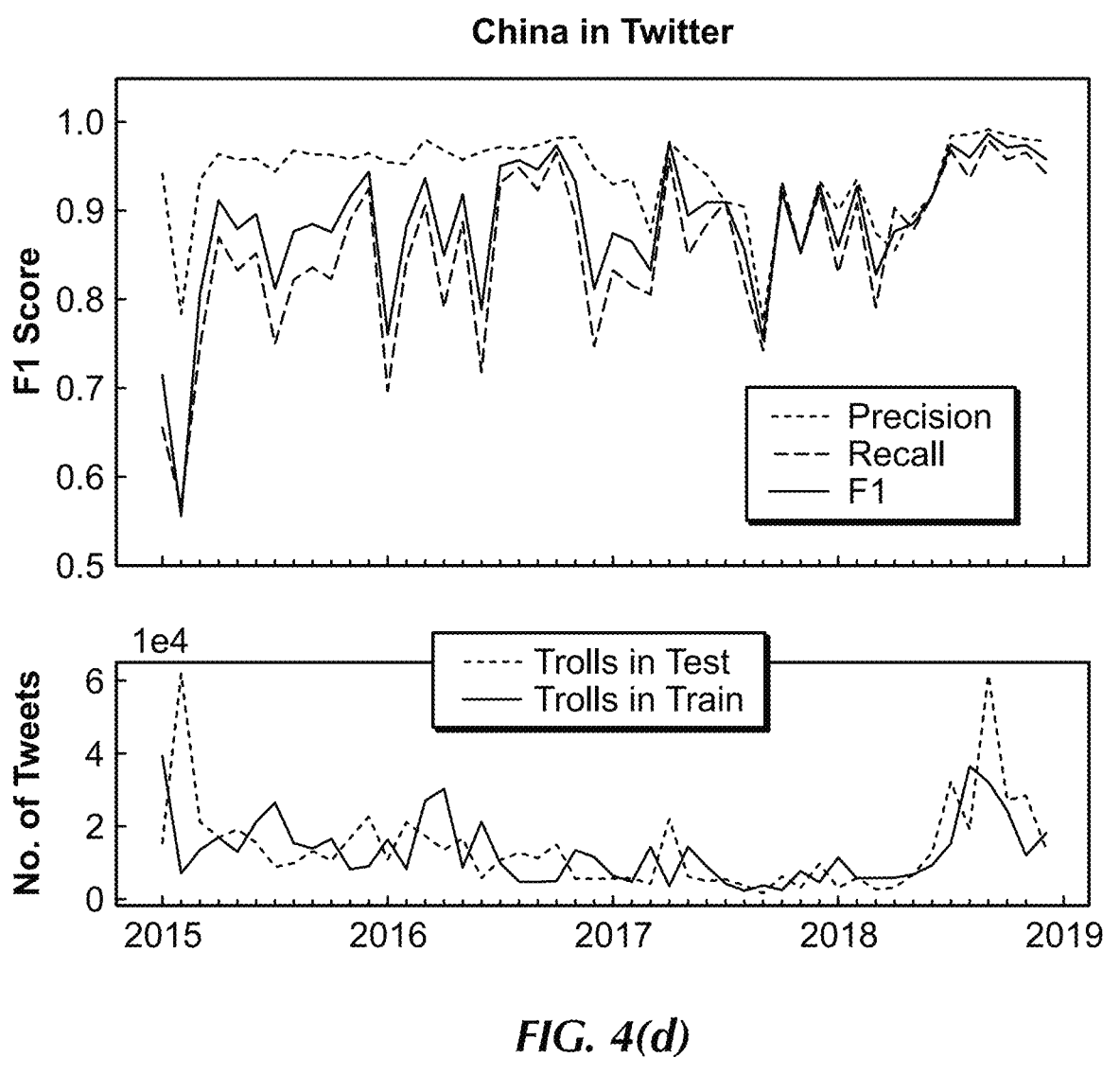

FIG. 4(c) depicts a graph of predictive performance across campaigns and platforms for a 50/50 train/test split on a current month for the Venezuela Twitter dataset according to an embodiment of the present invention;

FIG. 4(d) depicts a graph of predictive performance across campaigns and platforms for a 50/50 train/test split on a current month for the China Twitter dataset according to an embodiment of the present invention;

Figure 5D:
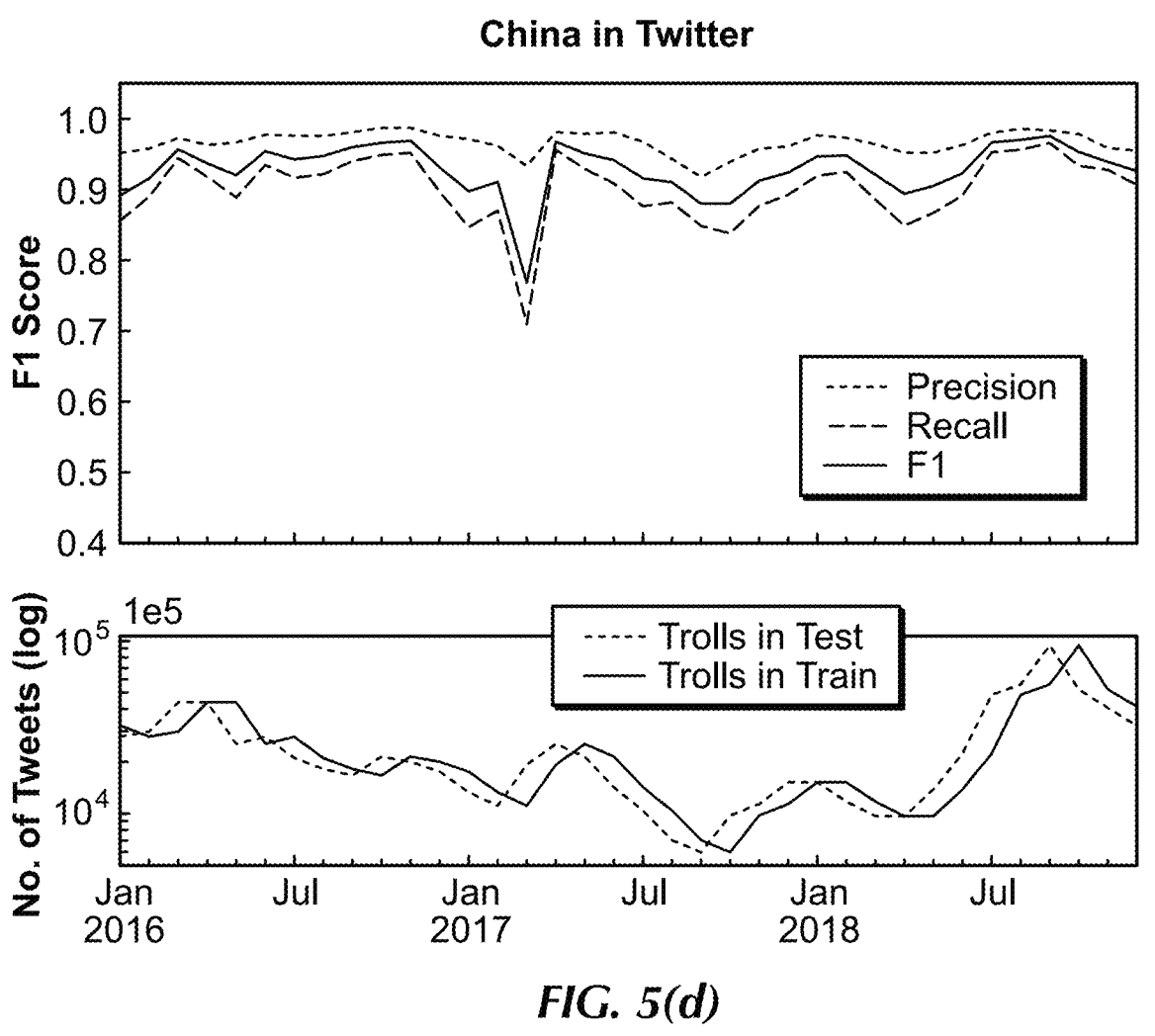

FIG. 5(d) depicts a graph of predictive performance across campaigns and platforms for a test of training on t-1 and test on all troll tweets in month t for the China Twitter dataset according to an embodiment of the present invention;

FIG. 6(c) depicts a graph of predictive performance across campaigns and platforms for a test of training on last month and testing on tweets from new users in a current month for the Venezuela Twitter dataset according to an embodiment of the present invention;

FIG. 10 depicts a table of prediction performance with various control users according to an embodiment of the present invention;

FIG. 12 depicts a table comparing estimated coefficients and standard errors between various regression models explaining F1 score of prediction according to an embodiment of the present invention;

FIG. 13 depicts a table summarizing important features across influence operations according to an embodiment of the present invention;

FIG. 14(a) depicts a first part of a table listing features extracted from each Reddit Post-URL pair according to an embodiment of the present invention;

FIG. 14(b) depicts a second part of a table listing features extracted from each Reddit Post-URL pair according to an embodiment of the present invention;

FIG. 14(c) depicts a third part of a table listing features extracted from each Reddit Post-URL pair according to an embodiment of the present invention;

FIG. 15 depicts a table of monthly mean of macro-averaged F1 scores for detection of Russian troll tweets, with varying predictor sets according to an embodiment of the present invention;

FIG. 16 depicts a table of prediction performance with varying predictor sets according to an embodiment of the present invention;

FIG. 18(a) depicts a graph of a timeline of retweets according to an embodiment of the present invention;

FIG. 21 depicts a table of features extracted from each Tweet-URL Pair according to an embodiment of the present invention;

FIG. 22 depicts a table of mean and standard deviation of monthly macro-averaged F1 scores for detecting new user content according to an embodiment of the present invention;

FIG. 23 depicts a table of mean and standard deviation of monthly macro-averaged F1 scores for detecting all user content according to an embodiment of the present invention;

FIG. 24 depicts a table of average number of queried tweets and its equivalent number of users for detecting new user content according to an embodiment of the present invention;

FIG. 25 depicts a table of average number of queried tweets and its equivalent number of users for detecting all user content according to an embodiment of the present invention;

FIG. 28 depicts a table of mean of monthly F1 scores with varying predictor sets for detection of tweets written by new Russian trolls in a test month according to an embodiment of the present invention;

FIG. 29 depicts a table of mean of monthly F1 scores with varying predictor sets for detection of tweets written by all Russian trolls in a test month according to an embodiment of the present invention;

FIG. 30 depicts a table of descriptive statistic of all experiments according to an embodiment of the present invention;

FIG. 31 depicts a table of mean and standard deviation of monthly F1 scores for detection of tweets written by all trolls in a test month according to an embodiment of the present invention;

DETAILED DESCRIPTION OF THE INVENTION

Figures 1, 2:
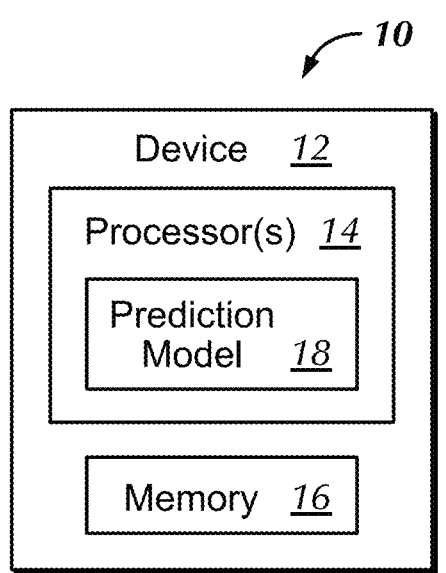
FIG. 1 depicts a block diagram of a machine learning based prediction of influence operations according to an embodiment of the present invention.
FIG. 2 depicts a table summarizing Twitter and Reddit data for troll and control accounts according to an embodiment of the present invention.
Figure 4A:
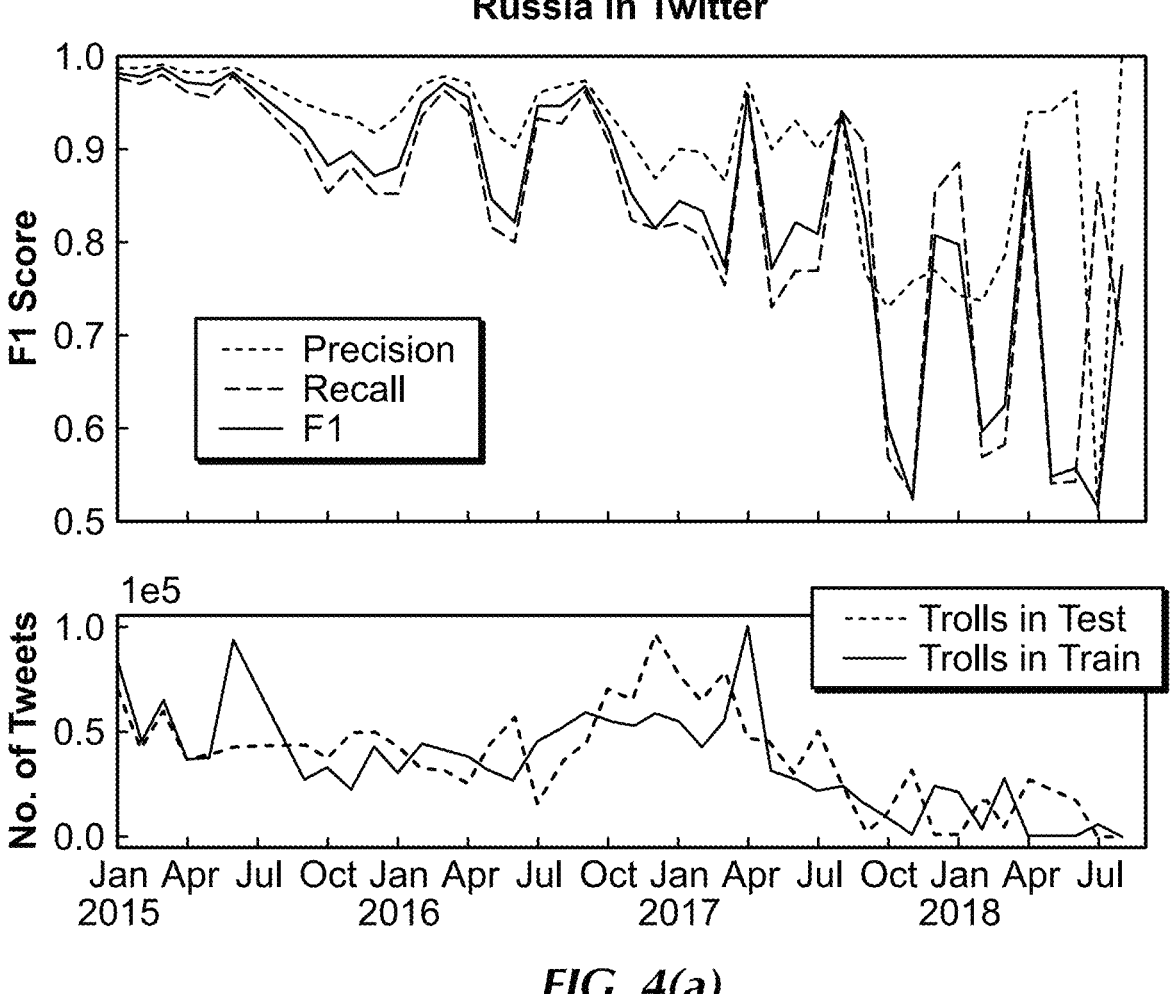
FIG. 4(a) depicts a graph of predictive performance across campaigns and platforms for a 50/50 train/test split on a current month for the IRA Twitter dataset according to an embodiment of the present invention.
Figure 4B:
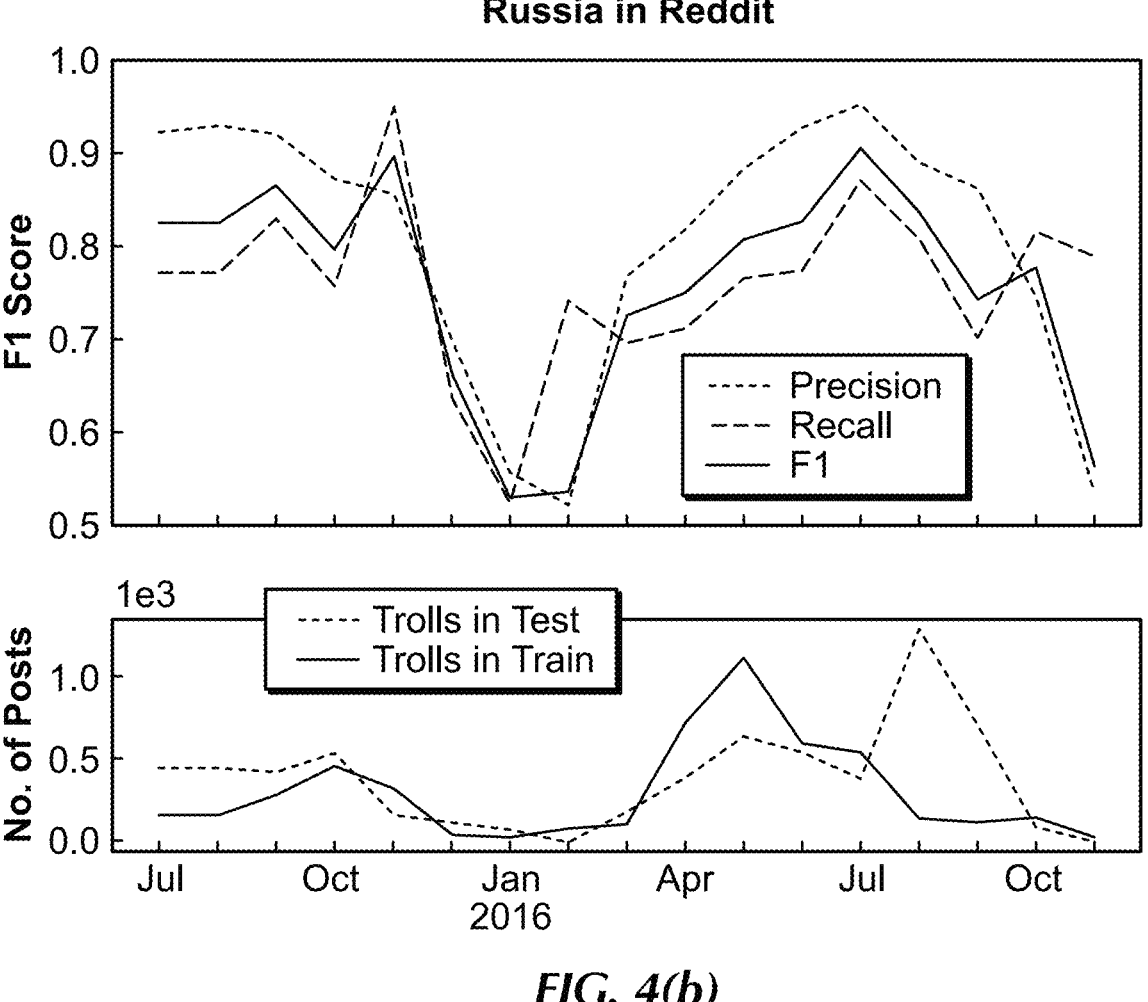
FIG. 4(b) depicts a graph of predictive performance across campaigns and platforms for a 50/50 train/test split on a current month for the IRA Reddit dataset according to an embodiment of the present invention.
Figure 5A:
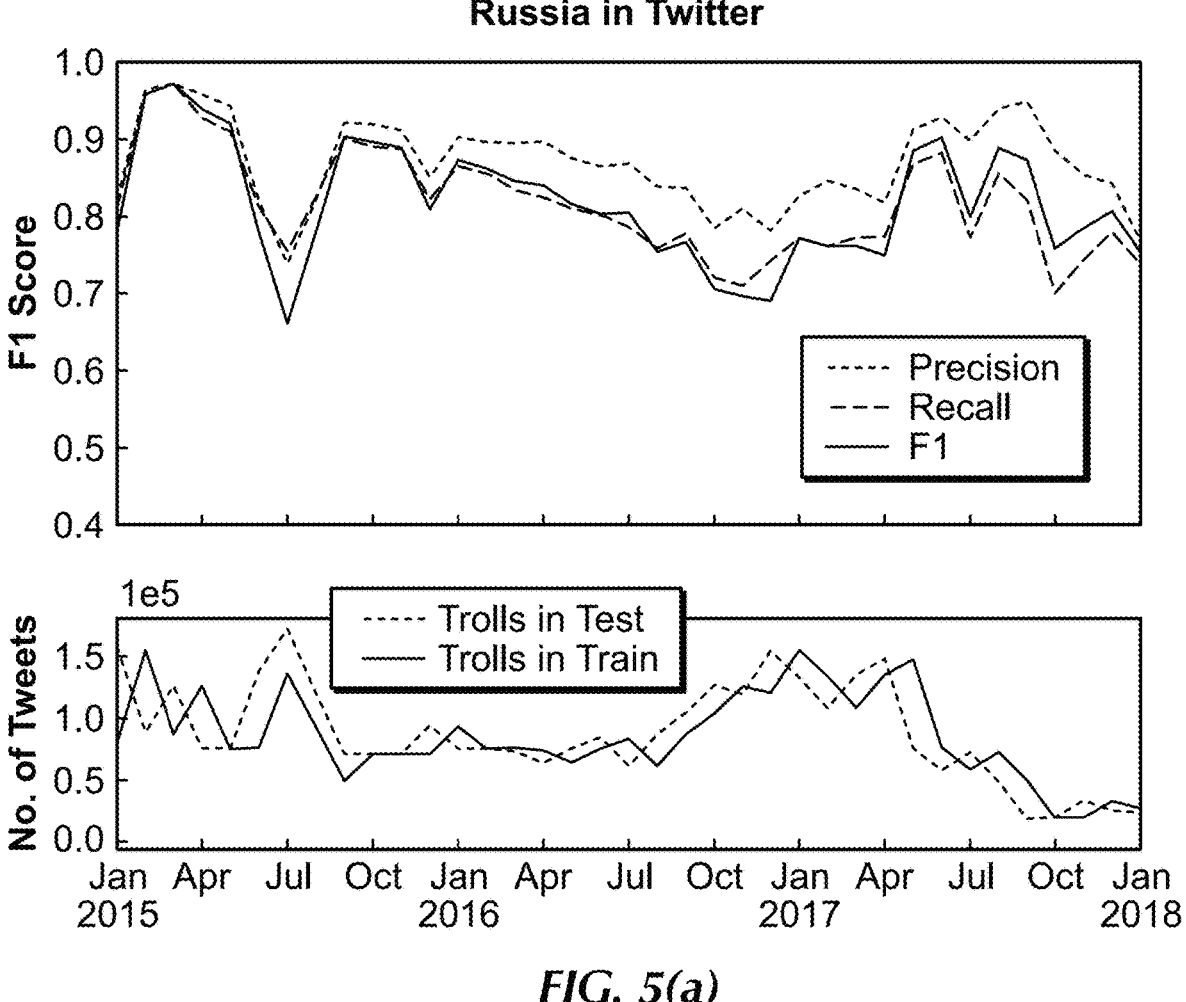
FIG. 5(a) depicts a graph of predictive performance across campaigns and platforms for a test of training on t–1 and test on all troll tweets in month t for the IRA Twitter dataset according to an embodiment of the present invention.
Figure 5B:
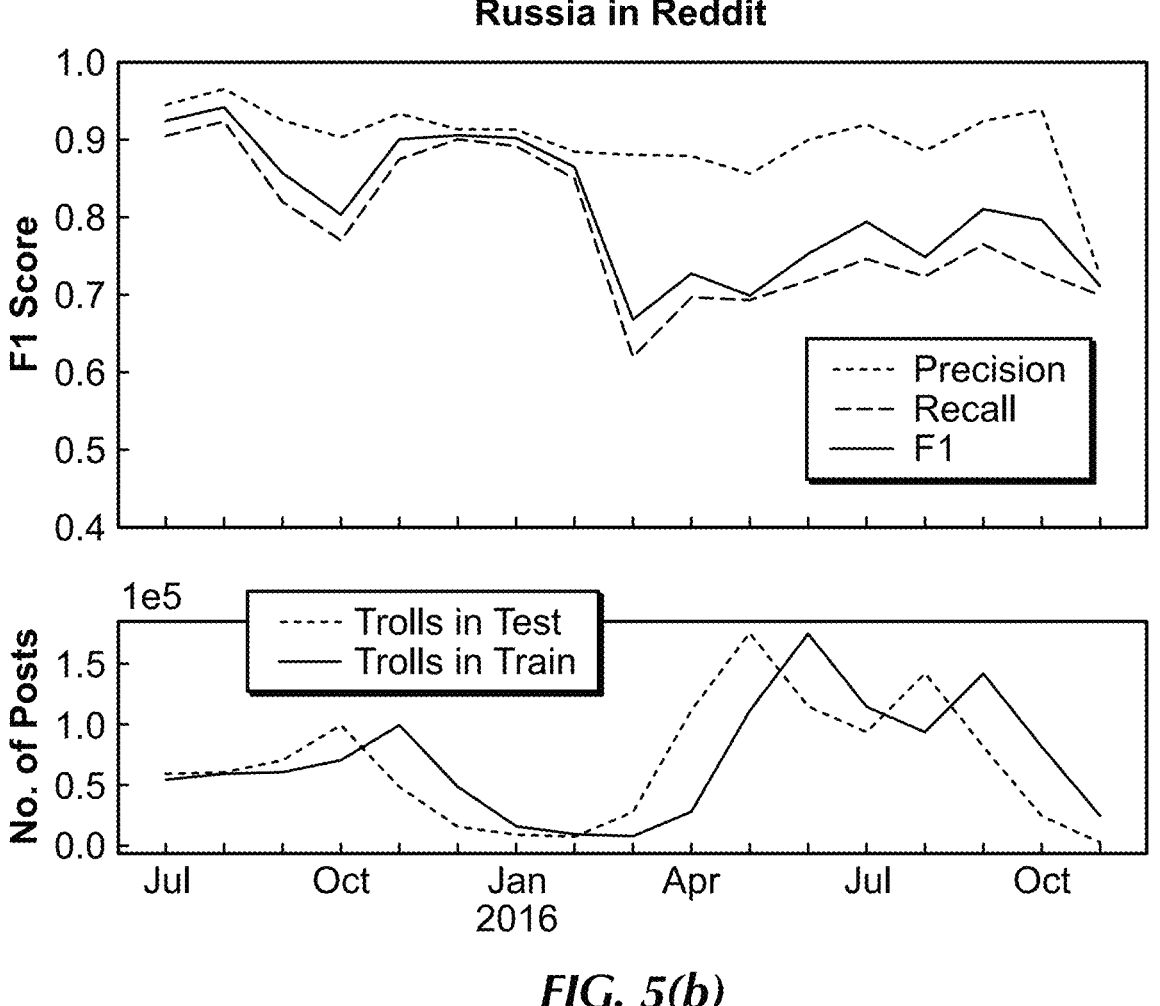
FIG. 5(b) depicts a graph of predictive performance across campaigns and platforms for a test of training on t–1 and test on all troll tweets in month t for the IRA Reddit dataset according to an embodiment of the present invention.
Figure 5C:
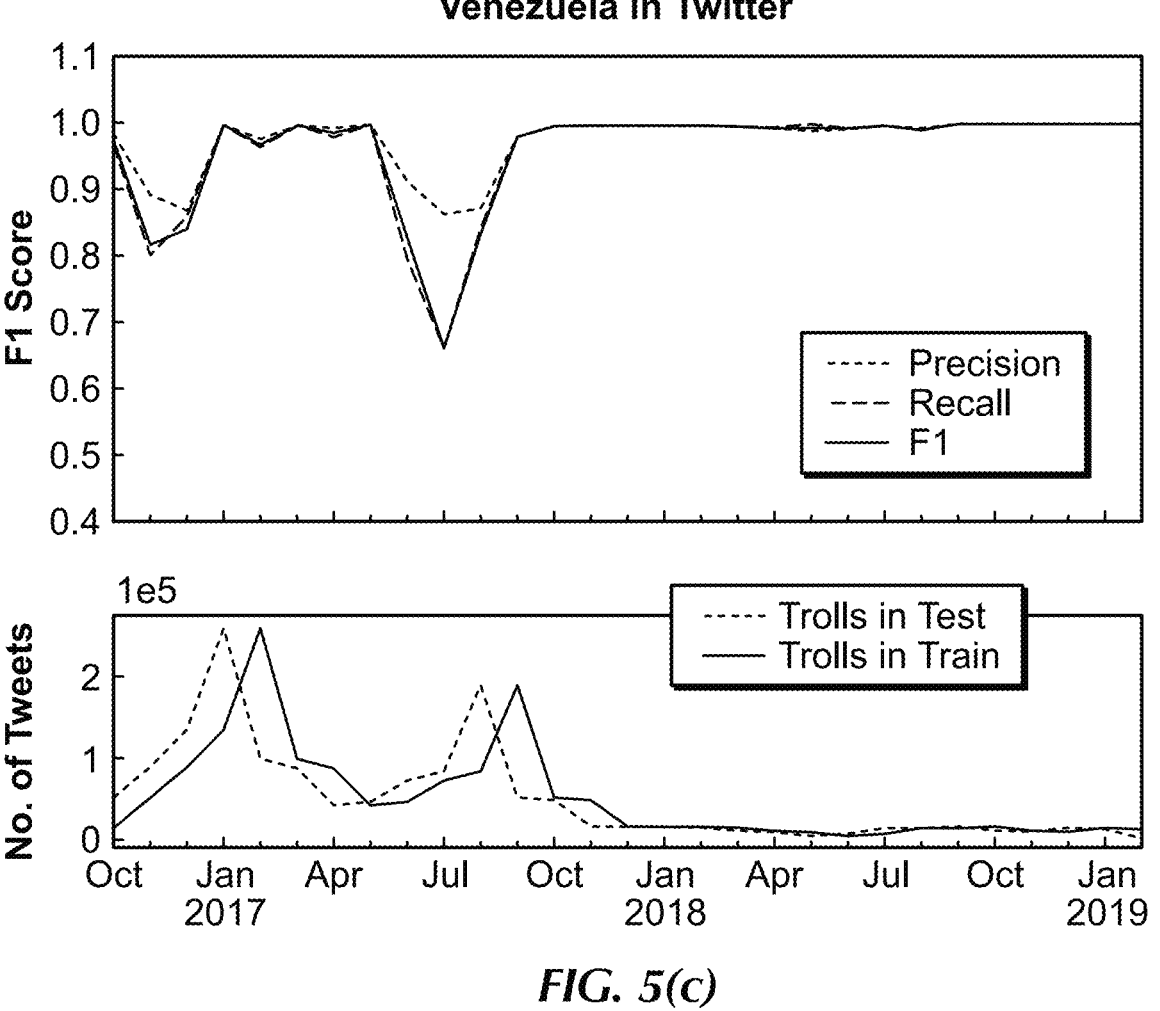
FIG. 5(c) depicts a graph of predictive performance across campaigns and platforms for a test of training on t–1 and test on all troll tweets in month t for the Venezuela Twitter dataset according to an embodiment of the present invention.

Generally disclosed herein are embodiments for a system and method to distinguish influence operations from organic social media activity with a social media platform-agnostic machine learning approach. Embodiments of the disclosed system and method use public activity to detect content that is part of coordinated influence operations based on human-interpretable features derived solely from content. Embodiments of this system and method are tested on publicly available Twitter data on Chinese, Russian, and Venezuelan troll activity targeting the United States, as well as a Reddit dataset of Russian influence efforts. To assess how well content-based features distinguish these influence operations from random samples of general and political American users, classifiers are trained and tested monthly for each campaign across five prediction tasks. Content-based features perform well across period, country, platform, and prediction task. Industrialized production of influence campaign content leaves a distinctive signal in user-generated content that allows tracking of campaigns from month to month and across different accounts.

The unit of analysis for this approach is the post-URL (universal resource locator) pair, an object that exists on almost all social media (a post can be a tweet, Reddit comment, Facebook status update, as nonlimiting examples), making the approach platform agnostic. However, it does not mean that social media posts without any URL are filtered out. If a post does not include a URL, then that is captured as a separate feature (i.e., number of URLs in a post) and zeros are input for its URL-related features. The test data include posts from coordinated influence campaigns and those by random samples of American users and random samples of politically engaged Americans.

Because user-level data are often hard for platforms to share, and because calculating features from users' friendship network (e.g., followers and friends in Twitter) are computationally intensive for large networks (and require customization depending on how the specific platform lets users communicate), the features relied upon are those that can be calculated from a given post-URL pair (e.g., a tweet containing a URL), what is termed "content-based features" herein. These include both characteristics of the post itself (e.g., timing, word count, or if the URL domain is a news website) and how material in a given post relates to other material in that period (e.g., if the URL domain is in the top 25 political domains shared by trolls in the training data), what is termed "meta content" herein. Fundamentally, it is how content within a given post-URL pair relates to other content being produced at that time. The classifier here does not use any historical or friendship network features of users when deciding on a given content (i.e., post-URL pair); however, that is not intended to be limiting and such features could be incorporated depending on the embodiment.

How well these content-based features distinguish coordinated influence activity from normal user activity was systematically assessed by varying: (i) the country responsible, by using all known English-language social media influence campaigns attributed to China, Russia, and Venezuela; (ii) the time period, by running each experiment once a month over the longest feasible period (36 months for most tests), as well as running select tests on a weekly basis over that entire period; and (iii) the difficulty of the classification challenge. Specifically, five tasks were considered for evaluation.

Task 1: Distinguish influence-effort activity in month t from normal activity using data on only a portion of troll activity in month t. This standard train/test split analysis allows assessment of the predictability of influence operations activity over time. It simulates a system in which one received data about an influence campaign (perhaps through the platforms' ex post forensics using backend signals unavailable to users) and tried to detect other posts related to that campaign in the same month.

Task 2: Identify social media posts from troll accounts in month t using data on troll activity in month t−1. This analysis tests how consistent influence campaigns are over time in terms of their public activity. Account creation date-related features are not used to avoid easy detection based on user-identifiable features.

Task 3: Find social media posts from troll accounts in month t that have not posted in month t−1 using data on troll activity in month t−1. This analysis examines how similar past content is to the content produced by new troll accounts in the current period, which is effectively an indicator of whether those operating new accounts are using the same tactics, techniques, and procedures as those operating existing accounts. This analysis also highlights the utility of content-based features for finding new users in the next month that are part of a given campaign.

Task 4: Detect activity across different data releases by platforms that were leveraging backend signals and manual investigation to find influence campaigns. Twitter released two major datasets related to Russian activity (October 2018 and January 2019) and two on Venezuelan campaigns (January and June 2019). In both cases, there were trolls identified in the second release who were active before the first release. For each country, it is analyzed whether content-based features could detect tweets from trolls in the second data release in month t using data from the first release on troll activity in month t. This analysis addresses the question of whether content-based features could have complemented the platform's detection approaches (at the time of their first release at least).

Task 5: Identify social media posts from trolls in month t on a given platform using data on troll activity in month t on another platform. Russian trolls were active on both Twitter and Reddit. It is analyzed whether classifiers trained on Twitter (Reddit) data in month t using the 859 mutual features can detect social media posts from trolls on Reddit (Twitter) in the same month. This analysis tests whether data about influence operations on one platform can help find them on another.

Running each task over multiple short time periods provides several important advances over previous work. First, it is now possible to assess how distinctive influence campaign content is over time by asking how well content-based features distinguish it from normal activity as new political issues arise, as the platforms modified their content moderation standards, and as the would-be influencers adapted their strategies. Second, it is now possible to assess how the features that distinguish coordinated influence campaigns from other activity change over time, providing insight into tactics. Third, because the volume of influence activity varies over time, these analyses also provide evidence on how much activity is needed to make which kinds of predictions.

Across 14 analyses on tasks 1 to 4 (excluding task 5), a random forest classifier applied to a rich vector of human-interpretable content-based features performs well at distinguishing influence operation activity from normal users. Average F1 scores at the monthly level vary from a high of 0.99 in the case of a 50/50 train/test split on Venezuelan operations to a low of 0.74 in the case of using last month's influence operation activity to identify activity by previously unseen accounts that are part of the Russian campaign on Reddit. As for task 5, average monthly F1 scores of 0.60 were obtained for training on Twitter and testing on Reddit and 0.38 were obtained for training on Reddit and testing on Twitter, which suggest that a considerable share of Twitter content was generated without testing on Reddit and deployed without coordination with the Reddit effort.

The features that distinguish coordinated influence operation's content are quite dynamic, suggesting that any application of machine learning to this detection challenge must involve frequent retraining.

Moving beyond the specific analyses described herein, this disclosure illustrates that content-based prediction of coordinated influence efforts has a wide range of potential uses. A system that learns from a previously identified coordinated activity could (i) enable warnings to users in near real time when they are posting content similar to that of ongoing campaigns; (ii) facilitate estimation of aggregate effort by influencers, which can further be disaggregated by issue area and target geography; and (iii) enable a retrospective assessment of how much content spread by influencers was shaping others' postings. In addition, because it will inevitably take time for platforms to release datasets of newly detected coordinated operations, content-based methods can contribute to detecting ongoing operations and potentially help inform the public about some share of ongoing efforts not yet reported. Lastly, while the social media platforms have not released their detection steps, it is expected that they most likely include an unsupervised detection phase in which they identify a set of suspicious accounts, and a forensic testing phase in which they check the specific indicators of compromise left behind by the suspicious accounts [e.g., internet protocol (IP) address and shared infrastructure such as internet service provider]. In this hypothetical scenario, the approach disclosed here can be used to complement existing detection procedures.

Further disclosed herein are embodiments for an active learning approach to detection of coordinated information operations. These active learning approaches can reduce detection systems dependence on frequent data releases and extend the duration of time for which the system will perform well. Data from three of the largest information operations are used over dozens of months to evaluate performance of five strategies on two distinct prediction tasks resulting in 30 experiments and 955 monthly classifiers. Specifically, for each month, the classifier is trained on previously available groundtruth data and tested on current month unseen data. "Groundtruth" refers to a high confidence set of labels for certain posts being part of a coordinated campaign. These can come from intelligence operations, fact checking blogs, manual investigation, or any other source. When Twitter releases data on posts it believes to be part of an influence campaign, that is "groundtruth". Then, using the result of the classifier on test data, four active learning strategies are utilized and compared with a baseline strategy of no active learning: (1) Least confident sampling: querying the true label of posts which the classifier is highly uncertain about them; (2) Entropy sampling: querying the true label of posts with highest entropy; (3) Certainty sampling: select posts that the classifier is highly certain about them; and (4) Hybrid sampling: combination of (1) and (2). Uncertainty sampling strategies including the least confident and entropy-based sampling always produce higher prediction performance compared to other strategies and baseline, and hybrid sampling decrease F1 scores on average. Overall, the results suggest that a content-based machine learning tool could track all three major campaigns through time with no or little human intervention. Moreover, only the Russian information operation was so dynamic that it was hard to follow through time without some human intervention.

System Overview

FIG. 1 illustrates a system 10 configured to implement the machine learning based prediction of influence operations described herein. The system 10 includes a device 12, which may be implemented in a variety of configurations including general computing devices such as but not limited to desktop computers, laptop computers, and network appliances or mobile devices such as but not limited to mobile phones, smart phones, smart watches, and tablet computers. The variety of configurations may include a central processing unit (CPU), a graphics processing unit (GPU), or an application-specific integrated circuit (ASIC), as nonlimiting examples. The device 12 includes one or more processors 14 for performing specific functions and memory 16 for storing those functions. The processors 14 include a prediction module 18 for implementing the disclosed prediction of influence operations generally described above and to be more specifically described below. The framework for the prediction module 18 will be described in greater detail below. It is also to be noted the training process for the prediction module 18 may be implemented in a variety of configurations (having a central processing unit (CPU), graphics processing unit (GPU), or application-specific integrated circuit (ASIC), as nonlimiting examples), such as but not limited to desktop computers, laptop computers, tablet computers, and servers.

Materials and Methodology for Prediction Module 18

Figure 32:
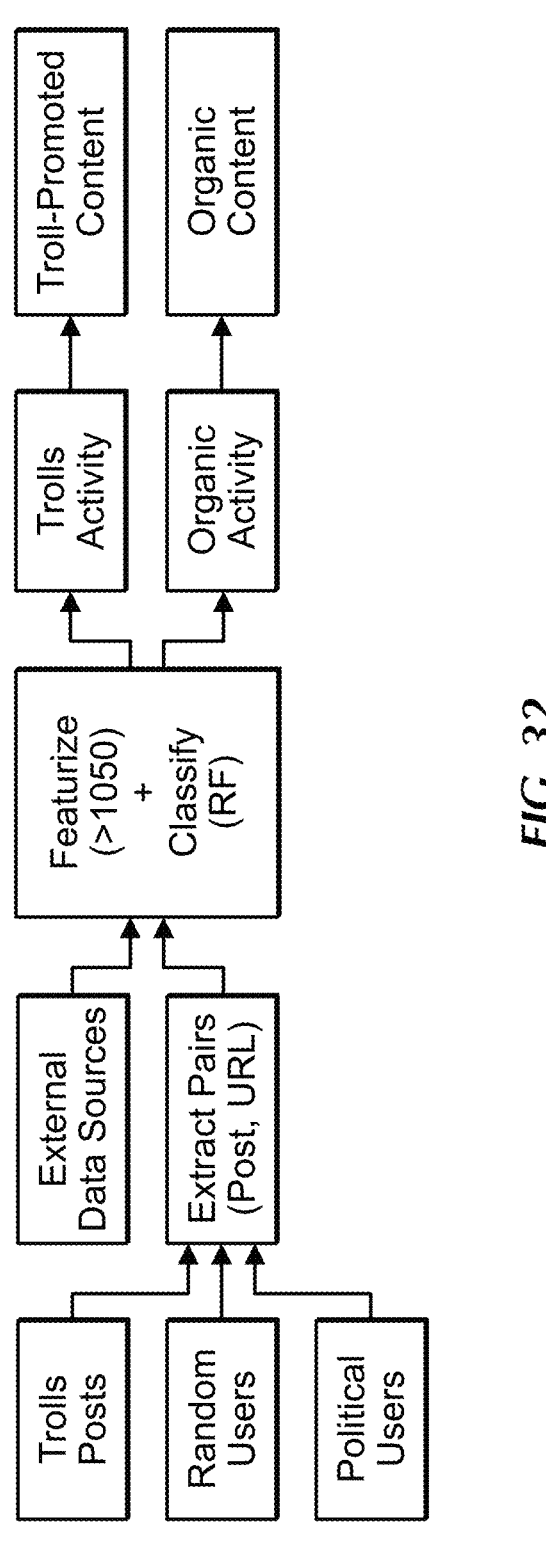
FIG. 32 depicts a flow chart of methodology for the prediction module according to an embodiment of the present invention.

Described herein are embodiments for a methodology for using classifiers trained on human-interpretable features to assess whether posts on a given social media platform are part of a previously observed coordinated influence operation. A flow chart for the methodology is shown in FIG. 32. The unit of analysis is the post-URL pair, making the disclosed approach platform agnostic. This, however, does not mean that platform-specific attributes such as retweets for Twitter or subreddit topics for Reddit are ignored. Rather, it means that the disclosed approach is generalizable to any platform with post-URL format.

First, posts identified as being part of the designated foreign influence campaign, hereafter "troll posts", through other means (through intelligence reports, expert investigation, or unsupervised clustering as non-limiting examples) are combined with posts from a random sample of normal users (and optionally political users), hereafter "organic activity", over a given period to form the training data. While the classifiers reported on herein were trained monthly and weekly, that is not intended to be limiting and the classifiers could alternatively be trained daily or based on 6, 8, or 12 weeks of past activity as other nonlimiting examples. Second, a broad range of attributes, hereafter "features", are extracted from each post-URL pair (including word count, emotional tone, whether they mention another account, and if they link to a local news URL as non-limiting examples). The features include human-interpretable ones (such as number of sentences) and are specifically crafted to capture the "coordinated" nature of influence operations. The features include those based only on the content of a post-URL pair, those based on the URL(s) referenced in the post, those which rely on external data (e.g. whether the mentioned person is a prominent politician as a non-limiting example) and those derived from the relationship of content in the post and other content (e.g. whether a post contains an URL that is among the top-10 URLs reference in troll posts), hereafter "meta-content". Third, a machine-learning classifier is trained to distinguish troll post-URL pairs from organic ones using the features. Fourth, the model is applied to new, previously unseen data to detect activity which is part of the coordinated influence campaign. Fifth, a classification threshold is applied to label posts in the new data as being part of the influence campaign or not. The performance of the classifier has been examined on five different out-of-sample prediction tasks monthly from 2015-2018 on coordinated influence campaigns on Twitter and Reddit.

Test Data

The classifier requires data on two kinds of social media activity: (i) posts by the accounts of a given coordinated influence operation (i.e., positive class) and (ii) a principled sample of organic user's activity (i.e., negative class).

Twitter and Reddit Data of Coordinated Influence Operations

Post-URL pairs are identified from influence campaigns attributed to China, Russia, and Venezuela using data that the company released in 2018 and 2019. The datasets include information from 2660 Chinese, 3722 Russian, and 594 Venezuelan accounts, who have at least one tweet posted in English, many of which targeted U.S. politics, as shown in the table in FIG. 2. Because of the importance of the 2016 U.S. presidential election and its aftermath, the time period from 1 Dec. 2015 to 1 Dec. 2018 is the focus here. While Twitter has released datasets related to other countries, those that contain mostly non-English content focused mainly on non-U.S. audiences. English-language activity is focused on here because applying the disclosed machine learning framework to those data would require both properly collected control data from those languages and countries, which do not currently exist. Moreover, some of the content- and URL-based features used in the model are not available for other languages and countries, e.g., classification of press sources according to political slant and typical content. However, that does not mean embodiments of the disclosed framework are limited to English content or U.S. based influence campaigns.

Following Facebook and Twitter's efforts to take down IRA-related accounts, Reddit also found 944 accounts on the platform with ties to the IRA and released the entire list of accounts on April 2018. While 70% of these accounts had zero karma, 6% of them had 1000 to 9999 karmas, and only 1% of them (13 accounts) had a karma score greater than 10,000. The IRA trolls were active on various types of subreddits, including alternative media, humor, angering, lifestyle, cute, and news. Although the IRA accounts were active from early 2014 to mid-2018, the volume of their activity was too low for almost half of this period. Therefore, the period between July 2015 and December 2016 is the focus here.

Control Data

For a Twitter comparison group, two sources are combined: (i) 5000 random U.S. accounts, sampled by generating random numeric user IDs, validating their existence, and checking the location to be in the United States, and (ii) 5000 politically engaged Twitter users, defined as those who follow at least five American politicians, generated through a similar approach. All tweets published by these 10,000 users are collected between 1 Dec. 2015 and 1 Dec. 2018. Last, for each month, the size of IRA troll tweets are randomly sampled in that month from both random and political users' tweets to create our negative class in the training set (i.e., the ratio of troll to non-troll posts in training is 1 to 2). For the test set, half of tweets by random and politically engaged users in each month are randomly sampled. This results in varying class imbalance in the test set, with an average ratio of 1 to 5 between positive and negative class. The data contain a variety of American users by including those users who have not declared their location, but whose location can be estimated through a network of their friends and followers of their friends.

For a Reddit comparison group, the following are combined: (i) all posts on 174 political subreddits (29) and (ii) all posts on the top 30 subreddits in which the IRA trolls were most active (out of a total of 934 subreddits). For these subreddits, first, the list of users who posted at least one post between 1 Dec. 2015 and 31 Dec. 2017 are obtained (no IRA activity on Reddit has been officially reported after this period). Then, 10% of users are uniformly sampled at random. Then all of their Reddit posts published between 1 Jun. 2015 and 31 Dec. 2017 are collected, as shown in the table in FIG. 2. For both samples, only non-IRA users are drawn on. Last, for each month, the size of IRA troll posts are randomly sampled in that month from both top 30 and political subreddits samples to create the negative class in training set. For the test set, half of Reddit posts by non-troll users are randomly sampled in each month, which results in average class imbalance of 1 to 25 between positive and negative classes. All Reddit control data are provided by pushshift.io.

Political Events

Major political events in month t could negatively affect classifier performance. If influence campaign activity pivots to discuss the event, then the shifts in word choice and linked to URLs could lead to poor predictive performance. To account for the potential role of political events in shaping classifier performance, a dataset of all major political events in the United States from January 2015 to 2018 was developed. The list of major political events was sourced from the annual lists of major political events occurring in and related to the United States from ABC News, CBS News, CNBC, and the Council on Foreign Relations. Specific details of each event were collected by following internal links and citations provided by these sources, including mentioned personae, location, event description, and date.

Events that fit certain categories were then down-selected: political news (related to electoral and domestic politics); foreign relations that affect the United States (such as international accords and nuclear weapon tests); mass shootings; protests; important legislation passed; political scandals (such as sexual harassment/assault allegations against politicians and lawmakers); Donald Trump's political or judicial nominations, hirings, and firings; and candidate or President Trump's notable statements. Some events, such as natural disasters, death of famous individuals, sports-related news, and entertainment news, unless it had political valence, such as the Camp Fire, were dropped.

The resulting data included 105 total events. Of these, 25 events occurred in 2015, 34 events in 2016, 26 events in 2017, and 20 events in 2018. Each event was then coded independently. Of 105 identified events, 36 were judged to be major, 18 were judged to not be major, and the remainder were evenly spread in determining whether the event was major.

Feature Engineering

Text preprocessing steps are applied on the text data and shortened URLs are expanded. Preprocessing steps include but are not limited to removing HTML, tags, removing extra whitespaces, removing special characters, converting all text to lowercase, removing numbers, removing stop-words, lemmatization, and tokenization (splitting strings of text into smaller pieces, or "tokens"). Text preprocessing may generally include but is not limited to tokenization, normalization, and noise removal. Then, five types of human-interpretable features are calculated for each post-URL pair: (i) content: e.g., word count of a post and URL, topic of a post, sentiment, and Linguistic Inquiry and Word Count (LIWC) scores; (ii) meta-content: e.g., ratio of top 25 words or bigrams used by trolls in a post to all words or bigrams; (iii) URL domain: e.g., whether a URL domain is a news, political, commercial, or sport website; (iv) meta URL domain: e.g., whether a URL domain is in the top 25 political, left, right, national, or local domains shared by trolls; and (v) timing: e.g., day of the week or hour of day on which a post is posted. In total, each tweet-URL and Reddit title-URL pairs are represented as a vector of 1300 and 986 features, respectively.

It should be noted that, except for account age-related features, user-level features (e.g., number of followers, friends, and posts) or any post popularity or engagement features such as number of favorites, retweets, and mentions are not being used. These design choices enable fuller anonymization of potential input data (important, e.g., if one wanted to extend the approach to Facebook data) and minimize compute requirements.

It should also be noted that, the features described herein are exemplary and not intended to be limiting. For instance, content based and meta-content based imagery features may also be incorporated. Such content based imagery features include but are not limited to size of image, edge shape, whether or not the image contains a politician, whether or not the image is about a protest, whether or not the image includes violent content, whether EXIF data are present (and if so the camera model and date the image was taken), aspect ratio of the image, and whether compression has been applied. Such meta-content based imagery features include but are not limited to whether or not an image is among the top 10 photos of politicians posted by trolls on a given social media platform.

Modeling and Evaluation

The primary goal here is to test whether a simple classification model can help to detect the content of coordinated influence operations on social media. Hence, any model comparison or grid search on hyperparameters are avoided. Instead, a random forest classifier is simply trained using the scikit-learn machine learning software for Python. For all classifiers, the number of trees in the forest are set at 1000 (i.e., n_estimators=1000) and the number of features to consider when looking for the best split are set as the square root of the number of potential features (i.e., max_features="sqrt"). Scikit-learn version 0.23.2 default setting for the random forest classifier are used for the rest of hyperparameters, though that is not intended to be limiting. Macro-weighted precision, recall, and F1 scores are reported using the default classification threshold of 0.5. The main evaluation metric of interest is the F1 score.

It should be noted that while a random forest classifier is described herein, that classifier is not intended to be limiting and other classifiers such as but not limited to decision tree, neural networks, Bayesian neural networks, gradient boosting, and logistic regression can be used in alternative embodiments.

Hyper-Parameter Tuning

Any model comparison or grid/random search on hyperparameters is avoided here. This ensures the same parameters are used for all classifiers, making the tests performed herein apples-to-apples and oranges-to-oranges comparisons. The results, therefore, represent a lower-bound on the performance of active learning with content-based classifiers and the lack of hyperparameter tuning is not intended to be limiting. For incorporating hyperparameter tuning, hyperparameters and a classification threshold should be used that optimizes stratified k-fold cross-validation performance in the training data, where strata are "known troll". "random user", and "politically-engaged user". The k should be chosen based on data size (higher k with more observations in the training data). Hyperparameter selection should be by grid search over key hyperparameters (e.g. number of trees, max tree depth, and max features for random forest) or gradient descent for computations were that is possible (e.g. logistic regression).

Results and Performance

The disclosed content-based classifier is analyzed for its performance over time at distinguishing coordinated influence activity from that of normal users on different out-of-sample tasks across data on Chinese, Russian, and Venezuelan troll activity targeting the United States on two platforms. This approach differs from previous studies, which have mostly focused on training one classifier on the entire dataset. By training multiple classifiers on a monthly basis and testing on unseen, out-of-sample data, as described above in tasks 1 to 5, the disclosed approach illustrates how well content-based approaches work, how their performance varies over time as the political issue environment changes and tactics of influencers shift, and how stable or dynamic the information that differentiates them from normal activity is.

It is to be noted the machine learning stage of the disclosed approach is not optimized for the assessments of how well content-based features predict social media influence operations over time and across campaigns. This is to ensure that the same parameters are used for all classifiers, making the analyses apples-to-apples and oranges-to-oranges comparisons. Instead, a random forest algorithm is used, only on 1 month of training data is learned, the default classification threshold of 0.5 is used, and hyperparameter tuning is not performed. The results in this section therefore represent a lower bound on the performance of content-based classifiers. Further, these results and the lack of optimization here are not intended to be limiting.

Performance results and important features across influence campaigns over time for each of the tasks are first presented. Then, it is described what drives variance in classifier performance, the proxy for how easy it is to distinguish influence operation content from normal activity. The focus is then on the Russian IRA operation on Twitter more deeply, focusing on what changes in feature importance over time can illustrate about shifts in their tactics, techniques, and procedures.

Performance of content-based approaches is generally good, although it varies across campaigns and over tests, as shown in the table in FIG. 3, which reports mean F1 scores for monthly classifiers by experiment. F1 is the harmonic mean of precision and recall. It is a standard metric for binary classification tasks. Precision is the fraction of true positives over the sum of true positives and false positives. Recall is the fraction of true positives over the sum of true positives and false negatives. The * indicates training data are all tweets from a 50% random sample of troll users combined with independent random samples from each of our two control groups. Test data use all tweets by the other 50% of troll users and a stratified random sample of 50% of tweets by non-troll users. The † indicates because this test includes the same troll accounts in both train and test sets, features related to account creation date are excluded. The ‡ indicates mean and SD are calculated in F1 over months in which there are at least 1000 troll tweets or 500 troll Reddit posts in the test month. The § indicates a box is not applicable. There was only one official data release for the Chinese campaign on Twitter and the Russian campaign on Reddit as of 1 Dec. 2019. The | indicates a box is not applicable as well. Cross-platform data are only available for Russian campaign.

Task 1: Cross-Section Train and Test on Month t

This task assesses how useful a sample of troll content at one point in time is at finding other such content, essentially a measure of whether their activity is systematically different from that of normal users in terms of content alone. Troll activity is quite distinct; the average monthly F1 score is 0.85 for the Russian Twitter campaign from 1 Dec. 2015 to 1 Sep. 2018 (FIG. 3). Precision is almost always greater than recall, i.e., while most of the tweets labeled as troll activity by the classifier belong to trolls, the approach always misses a portion of troll tweets. Performance for Russian operation on Reddit from July 2015 to November 2016 is a bit lower (average monthly F1 score of 0.82 in test 1). Similar to the Russian campaign on Twitter, precision is almost always equal or greater than recall. For a more detailed view of performance, the monthly precision, recall, and F1 scores of tasks 1 to 5 are plotted, along with the monthly number of positive (i.e., trolls) cases in train and test sets for all campaigns in FIGS. 4(a)-8(b).

Chinese troll activity is easier to distinguish than Russian, with an average monthly F1 score of 0.89 on task 1 for the 47 months between January 2015 and December 2018. Once again, precision is greater than recall in most of the months. The consistency between Chinese and Russian efforts in terms of performance on these metrics suggests that content-based classifiers will generally be very selective. The Venezuelan English-language influence operation on Twitter is easy to detect with content-based features. This is because of their excessive use of distinct and fake websites, focus only on political issues, and simple organization of users, as is discussed at length in a later section. From October 2016 to February 2019, the classifier yields average monthly F1 score of 0.99 for task 1.

Task 2: Train on t−1, Test on all Users in t

This task effectively assesses how consistent troll content is over time by seeing whether troll activity in the previous month distinguishes such activity in the current month. Unlike other tasks analyzed herein, the same troll accounts can be present in both training and test data. Therefore, only the user-level information that was used in feature engineering, account creation date, and features related to the account creation date is removed (e.g., days since creation, creation date before 2013, and creation date less than 90 days). Overall, stable prediction performance was obtained across campaigns and months, as shown in FIGS. 5(a)-(d), with a minimum average monthly F1 score of 0.81 for Russian operations on Reddit and a maximum of 0.99 for Venezuelan operation on Twitter, also shown in the table in FIG. 3. Troll activity appears to be predictable overall month to month.

Task 3: Train on t−1, Test on New Users in t

Probably the hardest test for a supervised classifier in this space is identifying activity by previously unseen accounts that are part of a previously observed effort. This challenge was simulated by training classifiers on all available troll social media posts in month t−1 and testing on social media posts in month t by trolls who were not active in t−1, as shown in FIGS. 6(a)-(d). The duration of analyses in these tests is shorter than for task 1 or 2 because of the low number of new users in some periods. In reporting average results, analysis is restricted to months with at least 1000 troll tweets, or 500 Reddit posts, in the test set (which drops 1 month from the Russian Twitter campaign and reduces the sample to 11 months for the Venezuelan one).

Figure 6A:
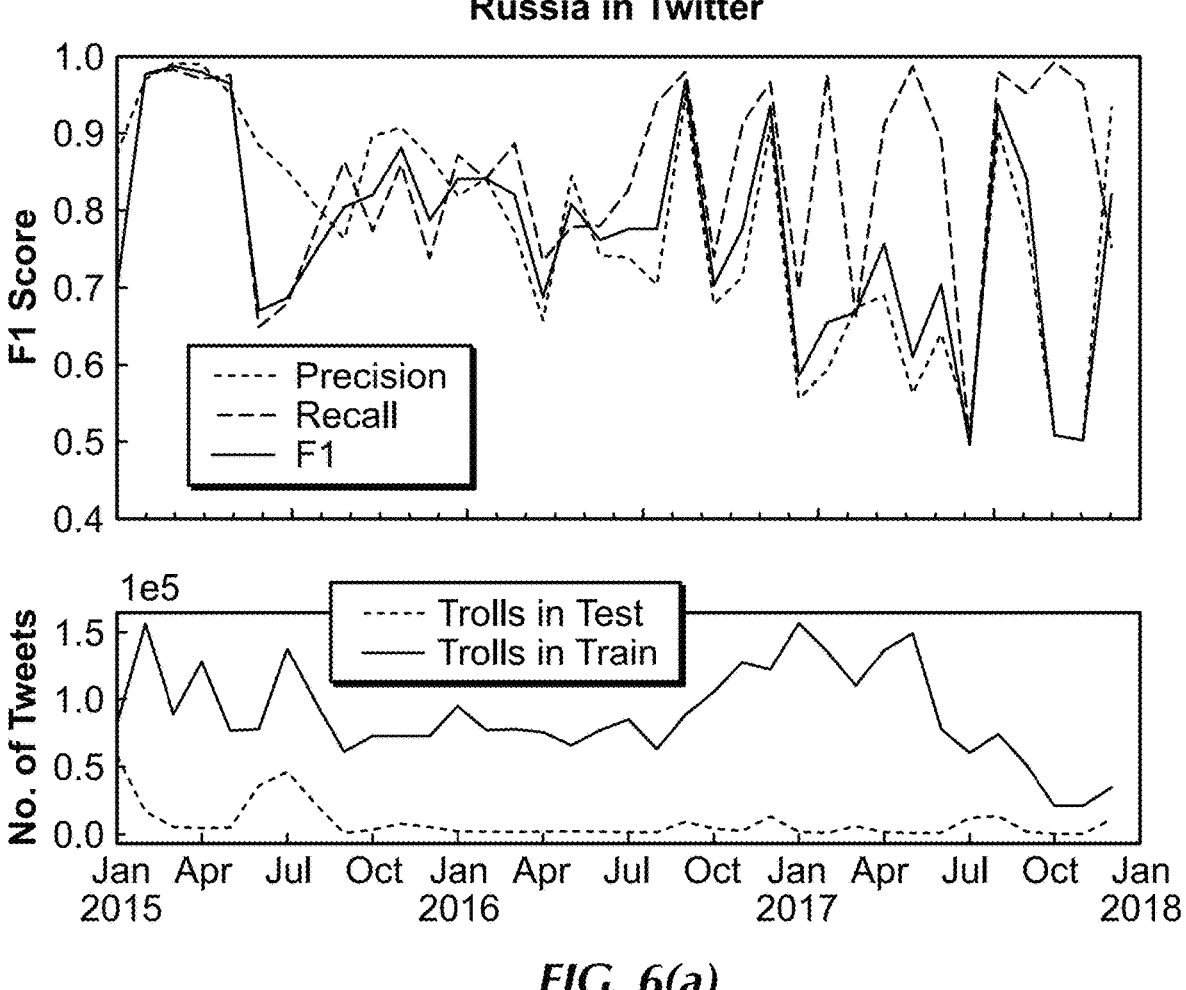
FIG. 6(a) depicts a graph of predictive performance across campaigns and platforms for a test of training on last month and testing on tweets from new users in a current month for the IRA Twitter dataset according to an embodiment of the present invention.
Figure 6B:
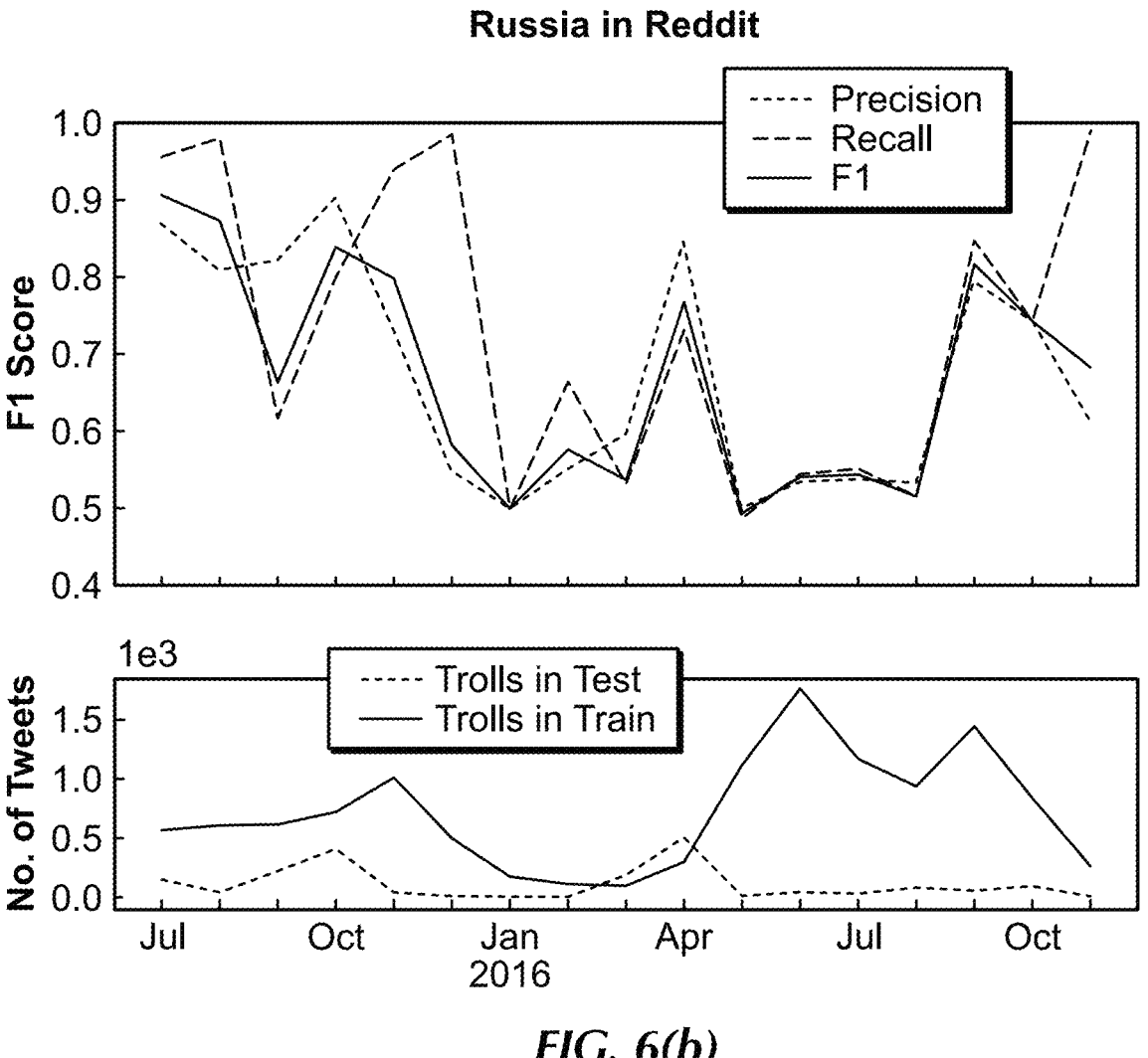
FIG. 6(b) depicts a graph of predictive performance across campaigns and platforms for a test of training on last month and testing on tweets from new users in a current month for the IRA Reddit dataset according to an embodiment of the present invention.

For the 36-month period from January 2015 to January 2018, an average monthly F1 score of 0.81 for Russian IRA operation on Twitter was obtained, as shown in FIG. 6(a). Recall is higher than precision in almost all months with less than 500 troll tweets in the test set. The classifier is still detecting most troll tweets in these months, but it is misclassifying a relatively large set of non-trolls as trolls. Content-based features provide an average F1 score of 0.74 for finding new IRA activity on Reddit from July 2015 to November 2016, as shown in FIG. 6(b).

Figure 6C:
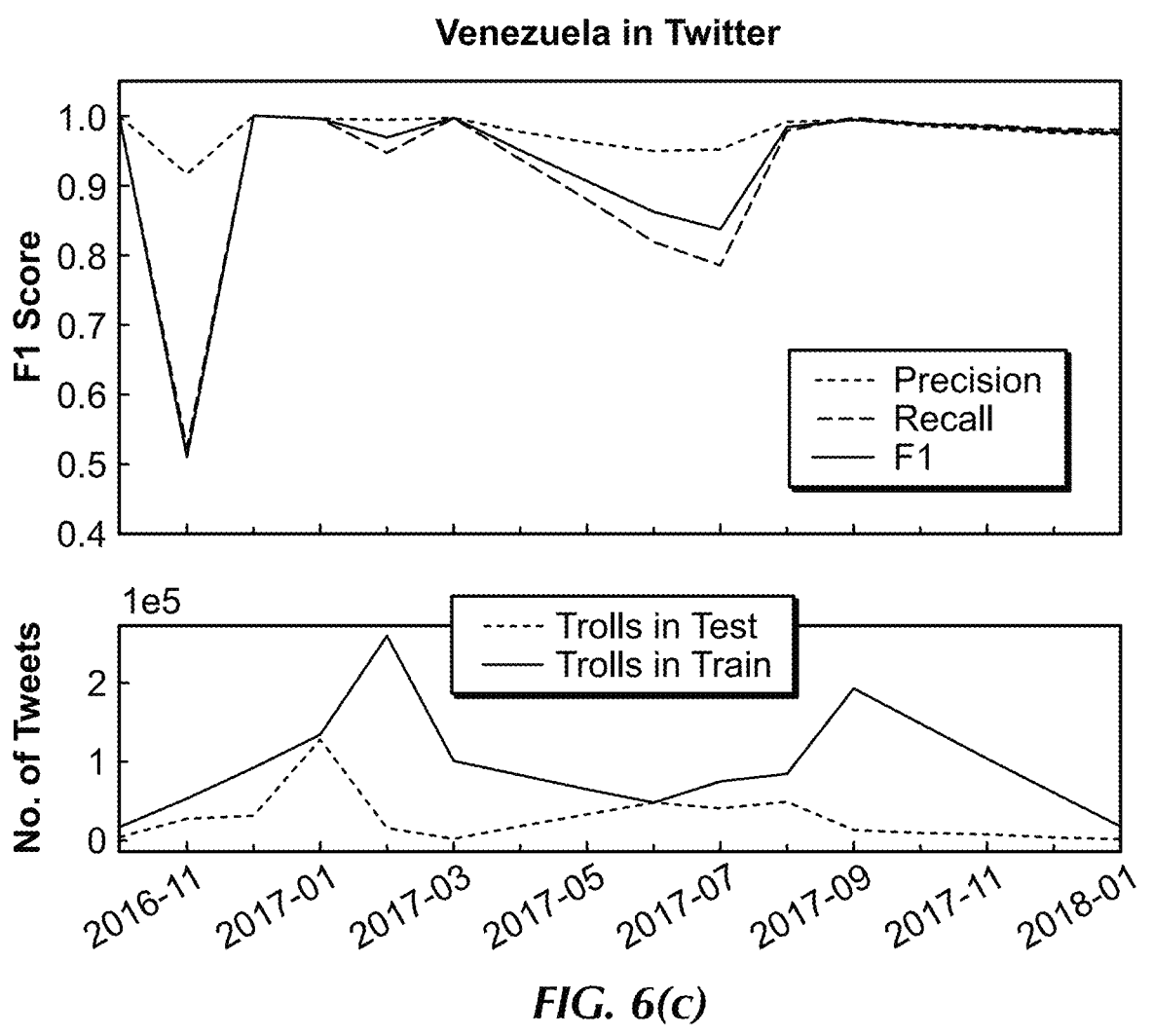

Even in this test, detecting Venezuelan troll activity by the classifier is relatively easy. The disclosed approach produces an average monthly F1 score of 0.92 for the 10-month period between October 2016 and January 2018, with new users in this campaign, as shown in FIG. 6(c). The performance drop in October 2016 is due to a sudden increase in the number of newly created accounts. Similarly, the drop in July 2017 is a function in part of the addition of 190 new accounts in that month. When a large number of new accounts become active, that likely represents a shift into topically new content, making the classification task harder than if a small number of new accounts are being activated to comment on previously discussed topics.

Figure 6D:
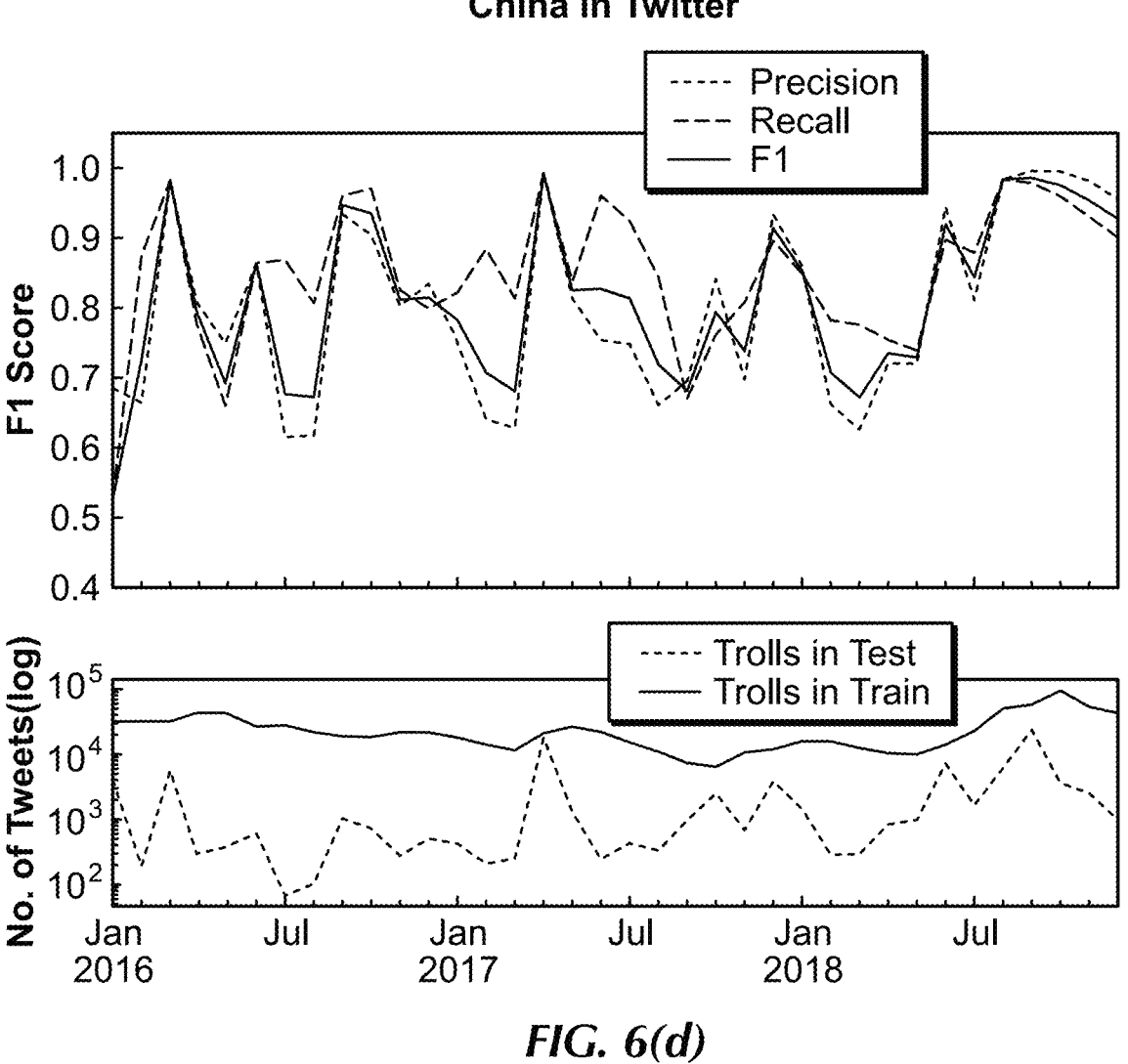
FIG. 6(d) depicts a graph of predictive performance across campaigns and platforms for a test of training on last month and testing on tweets from new users in a current month for the China Twitter dataset according to an embodiment of the present invention.

Turning to Chinese operations, content-based features provide an average monthly F1 score of 0.89 for identifying activity by new Chinese trolls over the 36-month period from January 2016 to December 2018, as shown in FIG. 6(d). The predictive performance of the classifiers shows cycles of gradually decreasing over 6-month intervals to approximately 0.7 and then increasing to greater than 0.9. This pattern matches the regular cycles of new account creation in the Chinese influence operations evident in the lower panel of FIG. 6(d).

Overall, influence operation content appears to be quite standardized month to month. New accounts introduced in any given month are producing posts that look a great deal like those of existing accounts, especially for Chinese and Venezuelan activity.

Task 4: Train on First Data Release, Test on Second Data Release

Twitter released two major datasets related to Russian IRA on October 2018 and January 2019 (the third release on June 2019 only includes four IRA accounts), as discussed in greater detail in a later section. It also released two datasets related to Venezuela, in January and June 2019. In both cases, many of the trolls identified in the second release were active at the same time as trolls identified in the first release. This implies that Twitter's detection either failed to identify the accounts in the second set before the first set was released or failed to do so with sufficient certainty. Either way, assessing how well a classifier trained on the first release would perform in detecting tweets from users in the second release provides evidence about whether content-based features provide information not found in the account-level features that Twitter initially relied on. Publicly available information suggests that Twitter relied primarily on account-level features in their first release to attribute a coordinated behavior to a country or organization, such as whether the user logged in from any Russian IP address more than once.

Figure 7A:
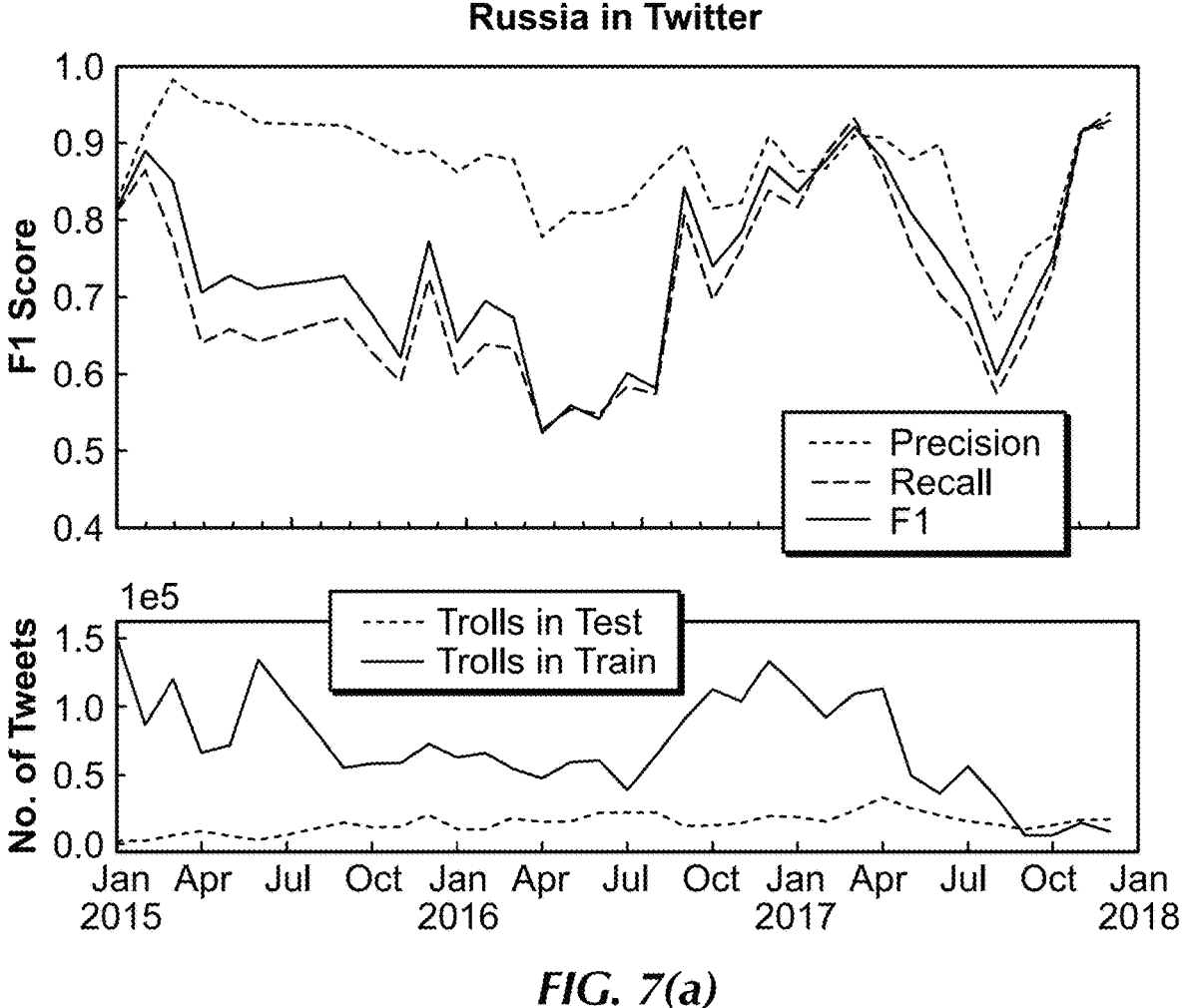
FIG. 7(a) depicts a graph of predictive performance for a test of training on month t of the $1^{st}$ data release and testing on month t of the $2^{nd}$ data release for the IRA Twitter dataset according to an embodiment of the present invention.
Figure 7B:
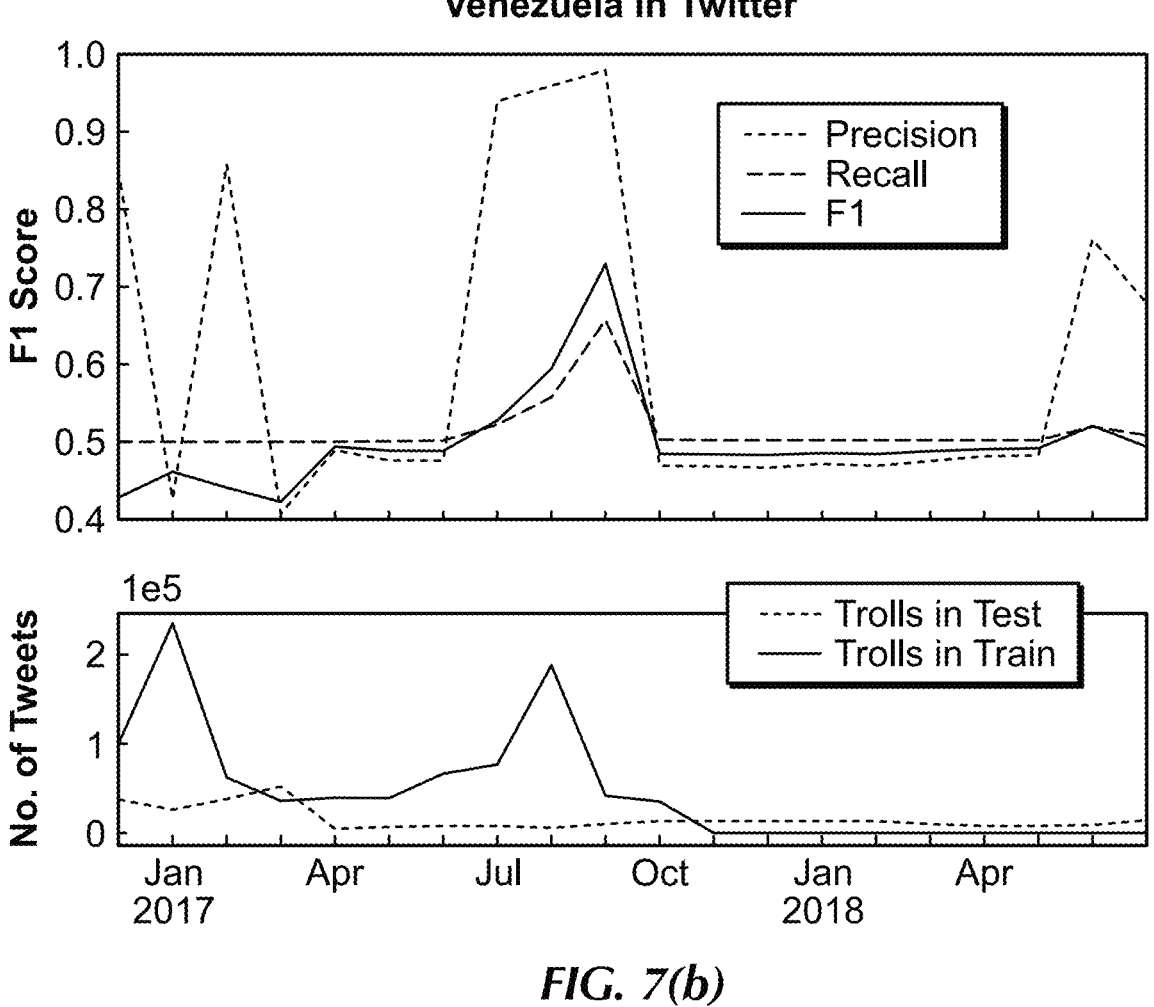
FIG. 7(b) depicts a graph of predictive performance for a test of training on month t of the $1^{st}$ data release and testing on month t of the $2^{nd}$ data release for the Venezuela Twitter dataset according to an embodiment of the present invention.

Content-based approaches provide average recall of 0.71 and precision of 0.87 for the IRA campaign for the 36-month period between January 2015 and January 2018, as shown in FIG. 7(a). The large gap between precision and recall in most months implies that the classifier trained only on the first release is selective: Tweets missed by Twitter's first release that the classifier identifies as belonging to trolls do so 87% of the time. But the classifier only identifies 71% of the missed troll activity. One interpretation is that while the majority of activity identified in Twitter's second data release was being done by accounts operating with the same goals as those in the first release, roughly 30% of accounts were focused on new issues or were operating with a different set of guidelines.

Cross-release classification performance on Venezuelan Twitter activity is the weakest of all the tests conducted, with a mean precision of 0.60 and a mean recall of 0.51. This is because the content being promoted by accounts in each Twitter release was fundamentally different. Accounts in the first release were focused tightly on U.S. politics. In the second release, the accounts worked to affect English-language users' views on a wide range of political issues.

Content-based features perform poorly across those two substantively distinct political campaigns.

Task 5: Cross-Platform Train and Test on Month t

This test explores the extent to which the disclosed classifiers trained on Twitter can detect an ongoing coordinated influence operation from the same country/organization on Reddit and vice versa. Both Twitter and Reddit released data on influence operations attributed to IRA. Assessing how well the classifier trained on either of these in a given month would perform in detecting the content of the other in the same month provides evidence about whether their simultaneous operations across different campaigns shares similar content-based characteristics.

Figure 8A:
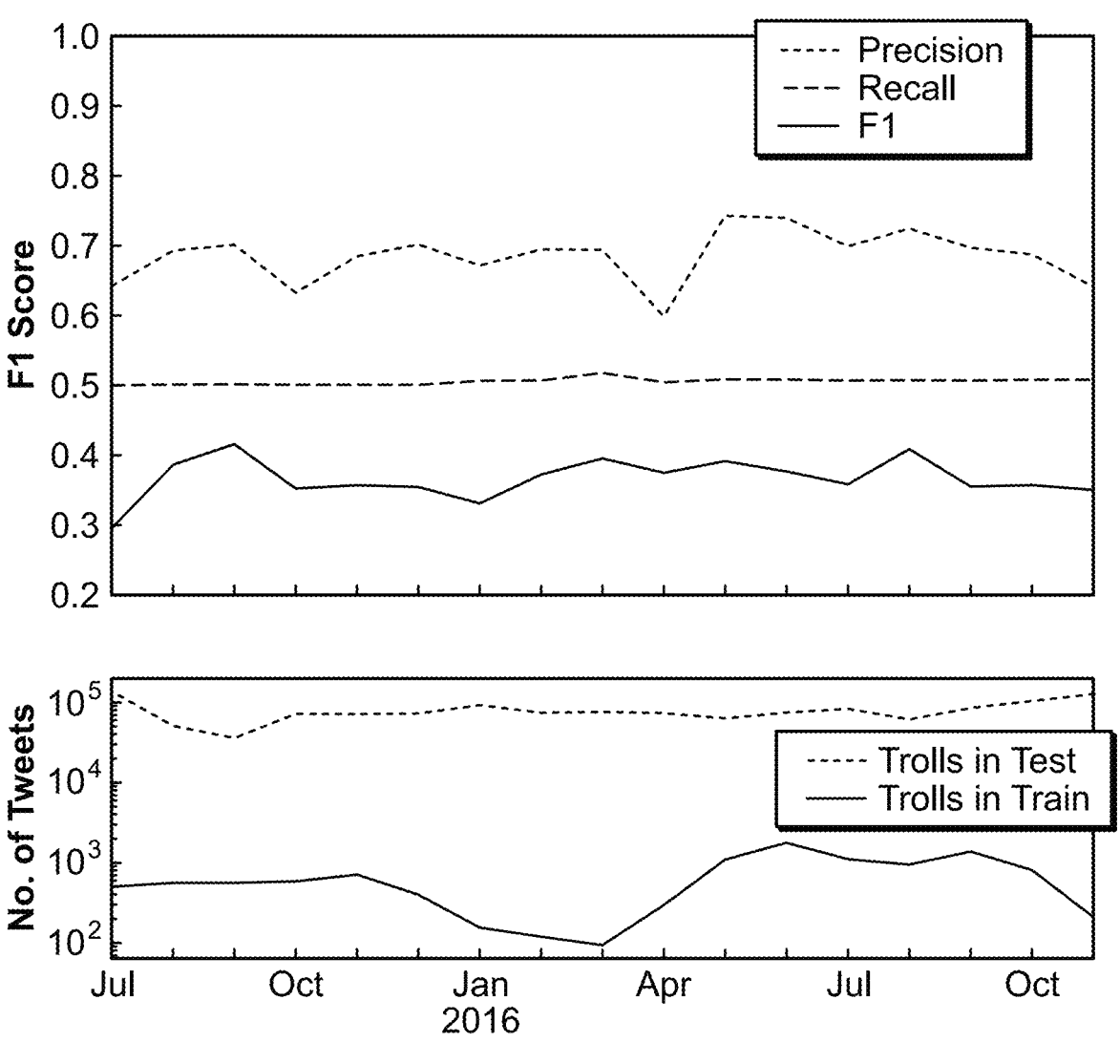
FIG. 8(a) depicts a graph of predictive performance for cross-platform train and test in month t for training on Reddit posts in month t and testing on tweets in month t according to an embodiment of the present invention.
Figure 8B:
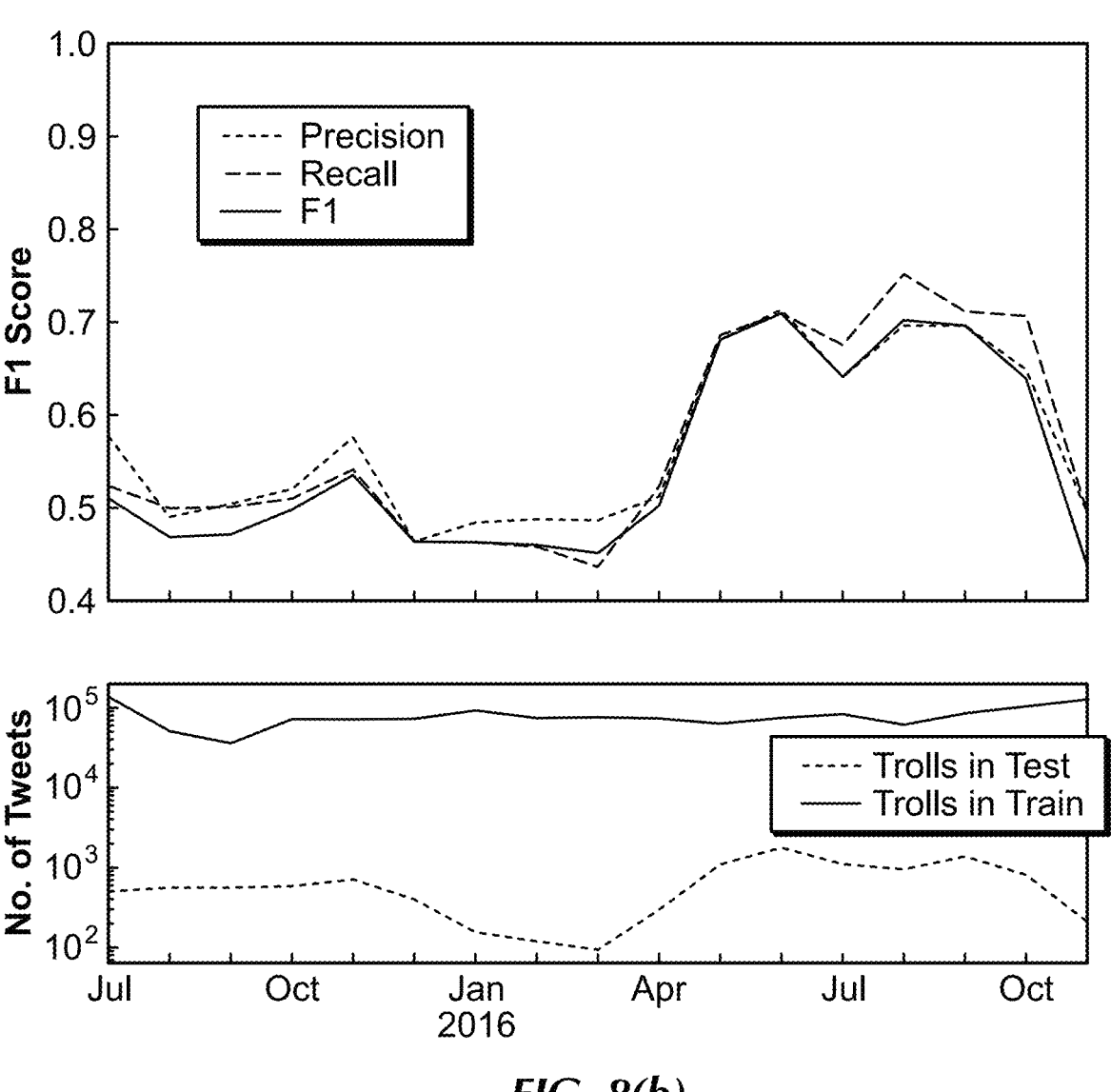
FIG. 8(b) depicts a graph of predictive performance for cross-platform train and test in month t for training on tweets in month t and testing on Reddit posts in month t according to an embodiment of the present invention.

For the 17-month period between July 2015 and November 2016, average monthly F1 scores of 0.60 for training on Twitter and testing on Reddit, and 0.38 for training on Reddit and testing on Twitter were obtained. Classifiers trained on Reddit and tested on Twitter always perform poorly, as shown in FIG. 8(a). This may be due to having too few positive cases in the training data compared to the test data (and thus an inability of the classifier to capture the diversity present in the test data) or to the fact that Reddit post titles are much shorter and therefore less informative than tweets. However, classifiers trained on Twitter and tested on Reddit do yield reasonable F1 scores of approximately 0.70 between May and October 2016, as shown in FIG. 8(b). Looking at the timeline and characteristics of troll activities on Reddit helps makes sense of this second pattern.

Russian trolls activity on Reddit had three phases: (i) karma farming: between July and November 2015, trolls posted in popular culture subreddits such as "cute" and "humor" subreddit categories as a cheap way of earning karma; (ii) inactivity: between December 2015 and March 2016, the troll activity decreased substantially to few dozen posts per month; and (iii) political engagement: between April and October 2016, trolls increased their activity again, this time posting mostly political content in subreddit categories such as "politics," "alt-right," "conspiracy," and "angering." It is suspected that classifiers trained on Twitter worked poorly on Reddit in phases 1 and 2 because of topical differences between the mission of the trolls in each platform. However, once Reddit trolls began engaging in political conversations, as they were on Twitter, it became possible to detect them using classifiers trained on Twitter data.

The finding of poor cross-platform prediction performance and the previous finding that the volume of IRA Reddit activity causes IRA Twitter activity are both consistent with qualitative work, suggesting that a portion of the ideas used on Twitter were tested on Reddit. But they suggest further that a large share of Twitter content was generated without testing on Reddit and deployed without coordination with the Reddit effort.

Effect of Training and Test Periods

For prediction tasks 2 and 3 (train on month t−1 and test on t), an important question is how dynamic the difference between troll and normal user activity is. If the language used by one or both parties varies tremendously week to week in response to events and news, then (i) reducing the test period to weekly should improve performance and (ii) extending the training period back should lower performance. With weekly models, the shorter testing period would allow the classifiers to catch up with most recent trends in troll activity more often than monthly classifiers. Extending the training period back in time would mean learning the differences between troll and normal users in a period very different than the test period.

Figure 9A:
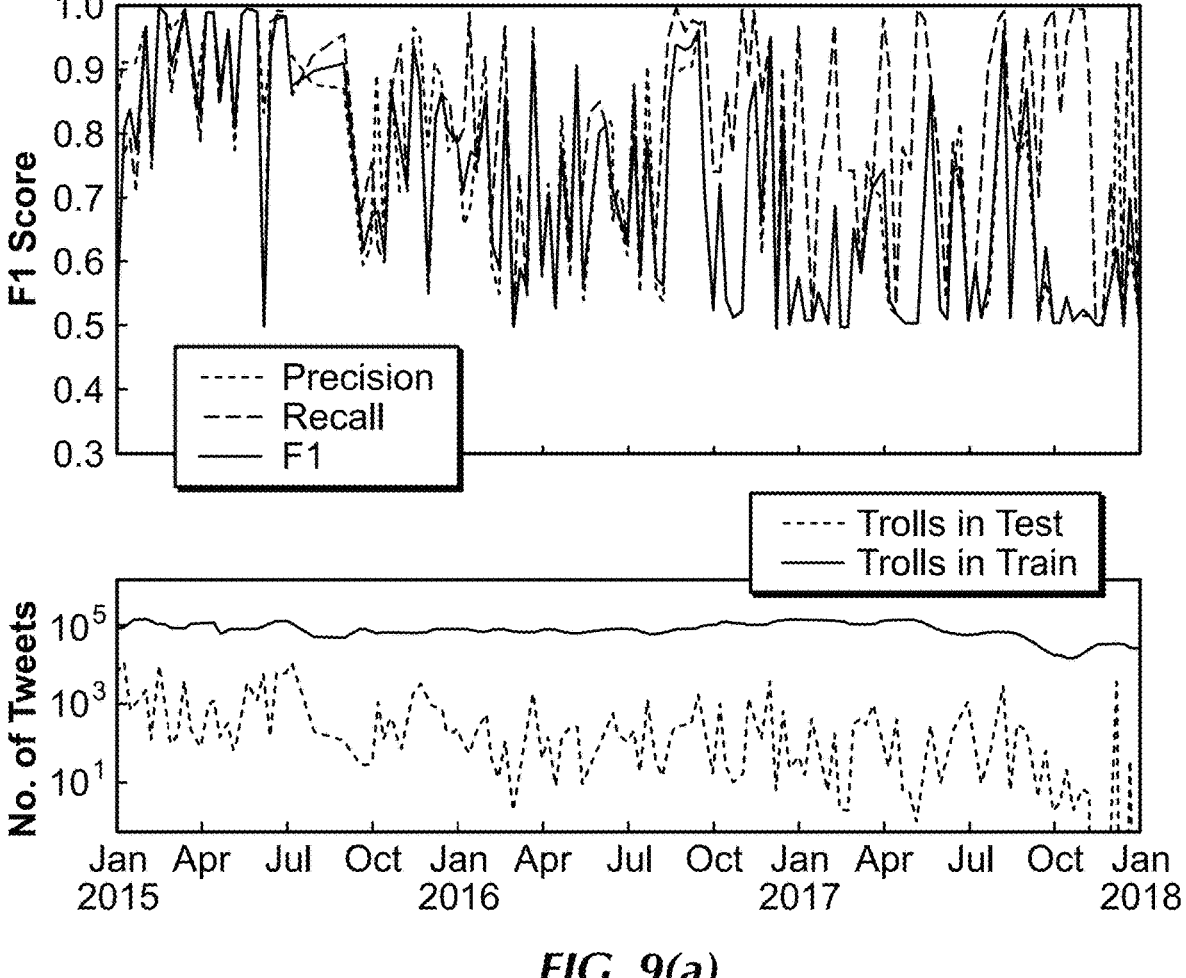
FIG. 9(a) depicts a graph of prediction performance when varying train/test periods according to an embodiment of the present invention.
Figure 9B:
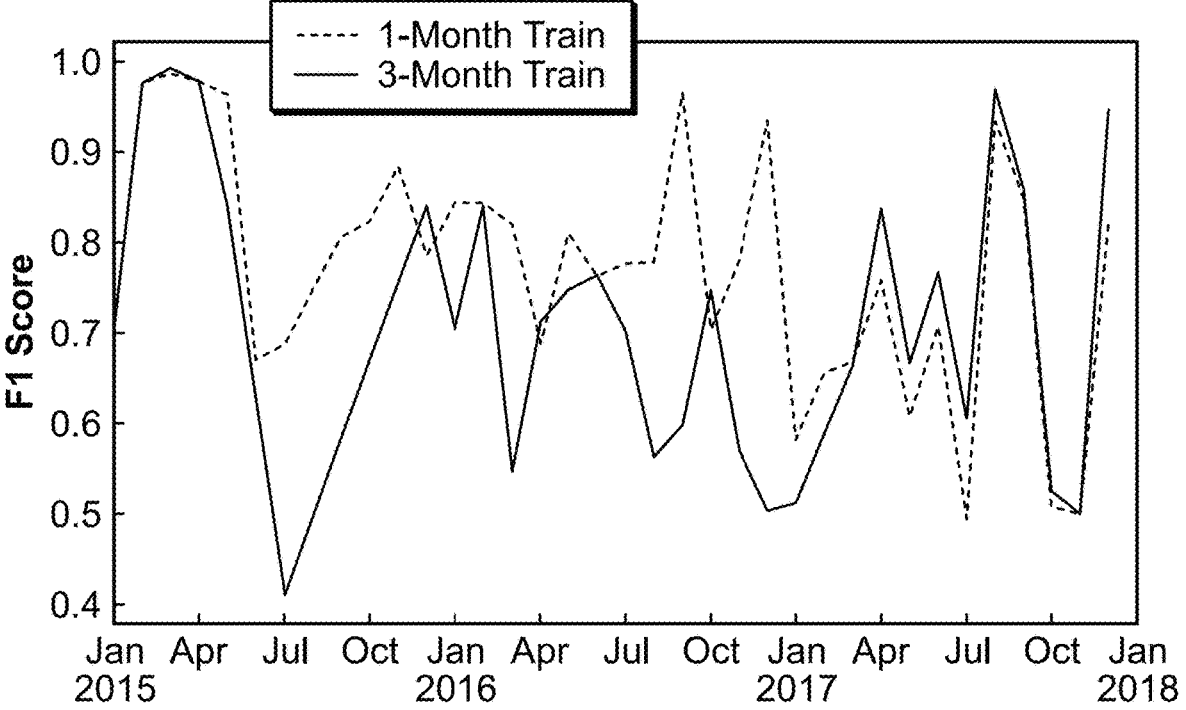
FIG. 9(b) depicts a graph comparing training on previous three months and previous one month and testing on the current month according to an embodiment of the present invention.

To check (i), a weekly version of task 3 is estimated on the Russian Twitter activity, as shown in FIG. 9(a). The weekly F1 score is 0.85 for weeks, with 1000 or more troll tweets in the test period, approximately 4 percentage points greater than the corresponding monthly performance reported in the table in FIG. 3. To check (ii), whether training on longer periods reduces prediction performance, the Russian Twitter data is used and the training period for task 3 is increased to 3 months. FIG. 9(b) compares the F1 scores with the longer training period to the baseline reported above. While training on a 3-month period improves performance in few months, it leads to 9 percentage point reduction in average monthly F1 scores over the full period.

Although the differences between normal users and trolls are quite dynamic, the focus is on monthly results for several reasons. First, the tasks are about setting a lower bound on content-based detection. Second, there are relatively few weeks (of 175 weeks, only 27 had more than 1000 and 38 had more than 500 troll tweets in the test set) with enough posts by new troll accounts to make task 3 meaningful. Third, in practice, weekly retraining would require weekly deliveries of annotated troll data from the platforms or other sources, which is unrealistic given the investigative process.

Effect of Different Control Users

The main tasks combine samples of random and politically engaged American Twitter users as the control users (i.e., negative class). To measure how distinctive the activity of trolls is from each of these samples, the performance of classifiers trained and tested against only random and politically engaged users, respectively, are compared. Distinguishing between tweets from trolls and tweets written by politically engaged users is almost always harder than those written by random users, as shown in the table in FIG. 10, which reports average monthly F1 scores for tasks 1 to 5 on Chinese and Russian Twitter trolls (the exception is tasks 1 and 2 for the Chinese influence operation). Venezuelan trolls were left out because the prediction performance is close to 1 for them and shows no difference between training and testing against random or politically engaged users.

Across prediction tasks 1 to 5, classifiers trained and tested against random perform an average of 7 percentage points higher in terms of F1 scores than those trained and tested against politically engaged users. In the case of Chinese activity, performance is similar across samples, with tasks 1 and 2 showing slightly better average F1 scores on politically engaged users and task 3 yielding higher scores for random users. In practical terms, this means that Russian trolls produced content that looked more like that of politically engaged American users than of random American users. Chinese troll content was similarly distinctive from both random and politically engaged users' content.

Explaining Performance Over Time and Across Experiments

Measuring the sources of variations in classifiers' prediction performance over time gives allows for assessing which features explain the variation in performance and how much variation they explain. To assess the sources of performance, monthly precision, recall, and F1 scores are regressed on campaign, prediction task, temporal trends, communication type of troll content, data characteristics (size of minority class in train and test and severity of class imbalance), and number and significance of political events in the United States in a given month. Comparing coefficients from this exercise also allows for comparing how much harder certain tasks or campaigns are to distinguish from organic activity relative to other ones.

Specifically, the following is estimated where i indexes experiments (i.e., campaign/task pairs) and t indexes months:

$$y_{i,t} = \alpha C_i + \beta T_i + \gamma X_{i,t} + \tau \Theta_t + \epsilon_{i,t} \tag{1}$$

$y_{i,t}$ is the outcome (recall, precision, or F1), $C_i$ are indicator variables for which campaign i is in, $T_i$ are indicator variables for the prediction task, $X_{i,t}$ are time-varying controls, $\Theta_t$ is a set of controls for temporal trends, and $\epsilon_{i,t}$ is an error term. Heteroscedasticity-consistent SEs are reported (clustering at the experiment level changes little).

Figure 11:
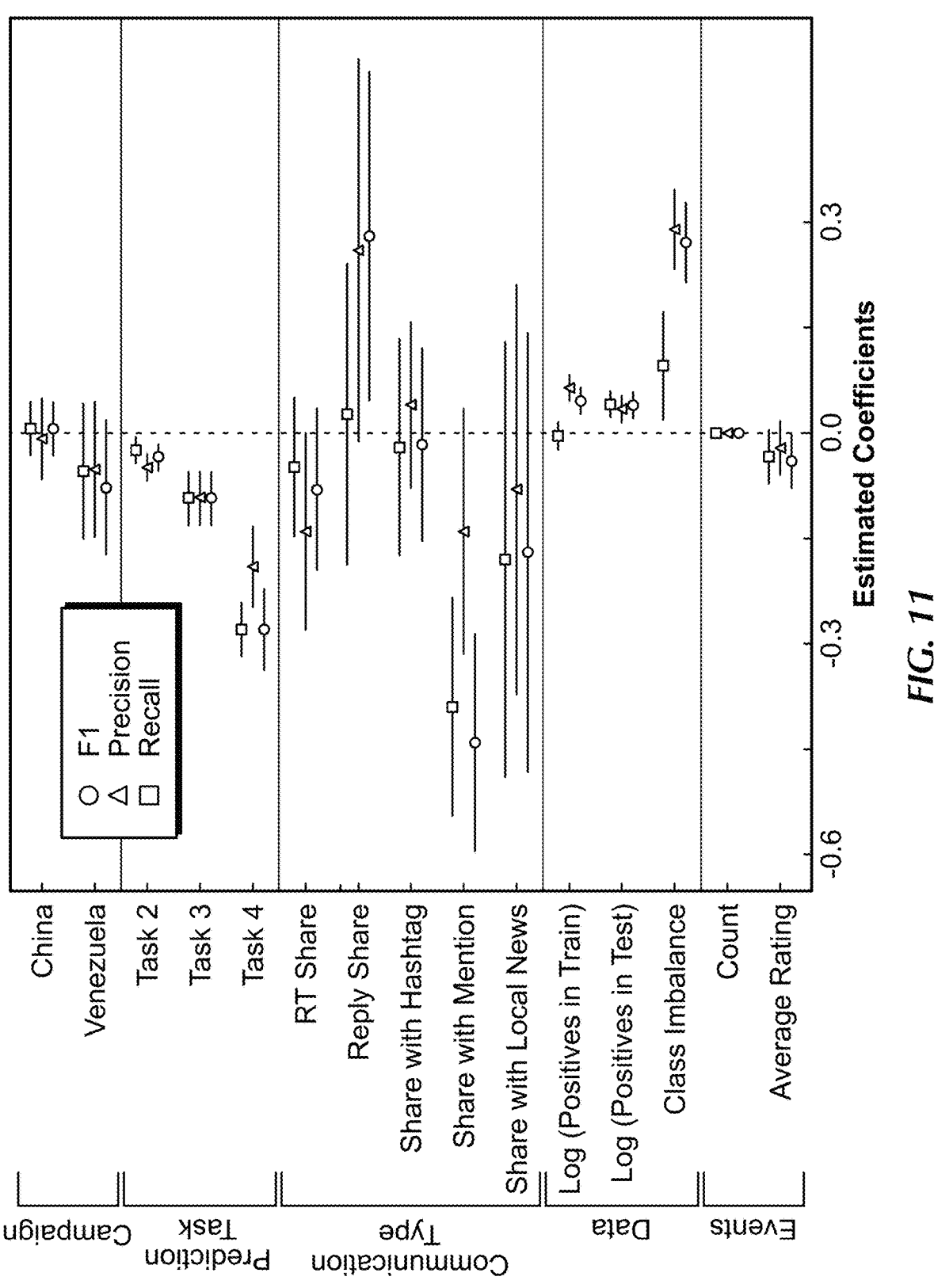
FIG. 11 depicts a graph of ordinary least squares regression coefficients for variables explaining the predictive performance of classifiers across campaigns and tests according to an embodiment of the present invention.

$X_{i,t}$ and the estimation sample is varied in six different regressions: (i) controlling for different operations by country and platform (baseline); (ii) controlling for quarter fixed-effects and a quintic polynomial in time; (iii) excluding the Reddit data because they have fewer observations than the three Twitter operations (and thus should not be included when controlling) for data characteristics; (iv) communication type of trolls, including share of troll posts in a given month that contain retweets, replies, hashtags, mentions, and links to local news URLs; (v) controlling for the log number of positive cases in train and test sets as well as class imbalance in a test set; and (vi) controlling for the number of major political events happened at each month and their average severity. Coefficient estimates and SEs for model (vi) are plotted in FIG. 11, and the full results are placed in the table in FIG. 12.

Five facts stand out from this analysis, in which the baseline task is cross-sectional prediction (task 1) and the baseline campaign is Russia's efforts on Twitter. First, Chinese and Venezuelan activities on Twitter are substantially more distinctive than Russian: F1 for them is approximately 5.7 and 9.5% greater than on Russian activity controlling for temporal trends (see column 3 in FIG. 12; mean F1 for Russian Twitter activity is 0.79). Most of that effect, however, is due to the communication type features of their activity. Once those are accounted for, Chinese activity is no more predictable than Russian and Venezuelan is actually less predictable (see column 6 in FIG. 12). Venezuelan operations are easy to find because they use retweets, replies, hashtags, mentions, and URLs in an unusual way. Second, conditional on timing and other factors, predicting forward in time (task 2) is challenging (F1 is 2.7% lower than for task 1), separating activity by previously unseen accounts that are part of an influence campaign from organic activity is harder still (F1 is 10% lower than for task 1), and finding missed accounts across data releases is hardest of all (F1 is 31% lower). Third, the communication type of troll content in any given month is very informative; adding variables that capture that communication type increases the share of variance in F1 explained by almost 20% (r2 goes from 0.41 to 0.49). Fourth, data characteristics matter (adding them to the model increase r2 by 20%), but in the intuitive manner. The number of positive cases (i.e., troll activity) in train and test sets is important; a 1% increase in the number of positive cases in the test set predicts a 7% increase in precision, and a 1% increase in the number in the training set predicts a 5% increase in recall. But class imbalance in the test set matters in the opposite of the intuitive direction. It is suspected that this is because in months where there are very few troll posts (and thus considerable class imbalance), the trolls tend to be posting highly unusual content, which is therefore easy to find. Fifth, performance is lower for months with higher average event significance, but the substantive magnitude of that relationship is small compared to other factors.

Important Predictors

A key scientific question is how the content of coordinated influence campaigns is different from that of other users. The experiments above provide valuable evidence on what distinguishes this activity because random forest classification methodology provides the importance of each feature in terms of a real number. These variable importance measures allows for assessing the importance of different features for detection of social media influence operations. Here, the key features across campaigns are reviewed for task 3 and the top 10 features that most often have monthly variable importance of 0.1 or greater are disclosed, as shown in the table in FIG. 13.

Important features can vary by month, operation, and platform. For Twitter campaigns, features related to the age of accounts, users mentioned or replied to by trolls, top hashtags and words used by trolls, and combinations of mentioned users and URL domain types are frequently among the most important features, as the table in FIG. 13 illustrates. Days since creation and whether or not an account was created before 2013 are among the 10 most important features for all but the Russian campaign on Reddit. It is suspected that this is because most troll accounts detected to date were created during a short time frame. Most IRA Twitter accounts, for example, were created between mid-2013 and early 2015.

Meta-Content Helps

To formally examine the relative importance of various types of features, we the features are categorized into five groups: content, meta-content, content-level timing, account-level timing, and network. The table in FIGS. 14(*a*)-(*c*) includes the full list of features in each group. The model trained on content features alone is considered as a baseline and the prediction performances are compared by adding each group of features across all combinations of platform, country, and test, as in the table in FIG. 3.

Only the results for the Russian Twitter campaign is demonstrated in this section and shown in the table in FIG. 15. The rest is reported in the table in FIG. 16. Task 5 is also excluded because it is based on a reduced set of features and therefore not comparable to others tasks. Compared to baseline, adding meta-content features on average increases the F1 score by 6.5 percentage points across our four tests. Content-level timing features are not effective and add little to the performance (after accounting for other aspects of the content they produced, the fact that many IRA trolls worked St. Petersburg hours in 2016 does not appear to be important). Account-level timing, however, increases the F1 score by 4.3 percentage points, on average, across various tests. Similar patterns can be observed in results from the other campaigns as illustrated in FIG. 16. Last, including network features (e.g., various attributes of the co-shared and co-occurring hashtags network) has mixed effects on the prediction performance. In some cases, it leads to better performance, but in most of the cases, it has zero or negative effects; hence, their exclusion from the results above.

Feature Importance Trends Reveal Tactical Changes

Analyzing the dynamics of feature importance over time can provide insight into a troll's tactics. Doing so requires care as it is ambiguous whether changes in feature importance comes from control users or trolls. However, by checking trends in both groups to see which one moved on a given feature at a particular time, it is possible to sort out that ambiguity. Doing so provides insights into how Russian trolls built their audience and tried to evade detection.

On Twitter, one can deploy various audience-building or campaigning tactics by using a combination of hashtags, retweets, replies, mentioning other users, posting at specific times, and sharing URLs. To illustrate how their relative importance can help understand tactical changes, FIGS. 17(*a*)-(*c*) plot importance trends on Russian activity for task 3 (train on t–1 and test on new users in t) for nine key features divided as features whose importance was higher (i) before the November 2016 U.S. elections (top row), (ii) after November 2016 (middle row), and (iii) outside of election times (bottom row).

Figure 19A:
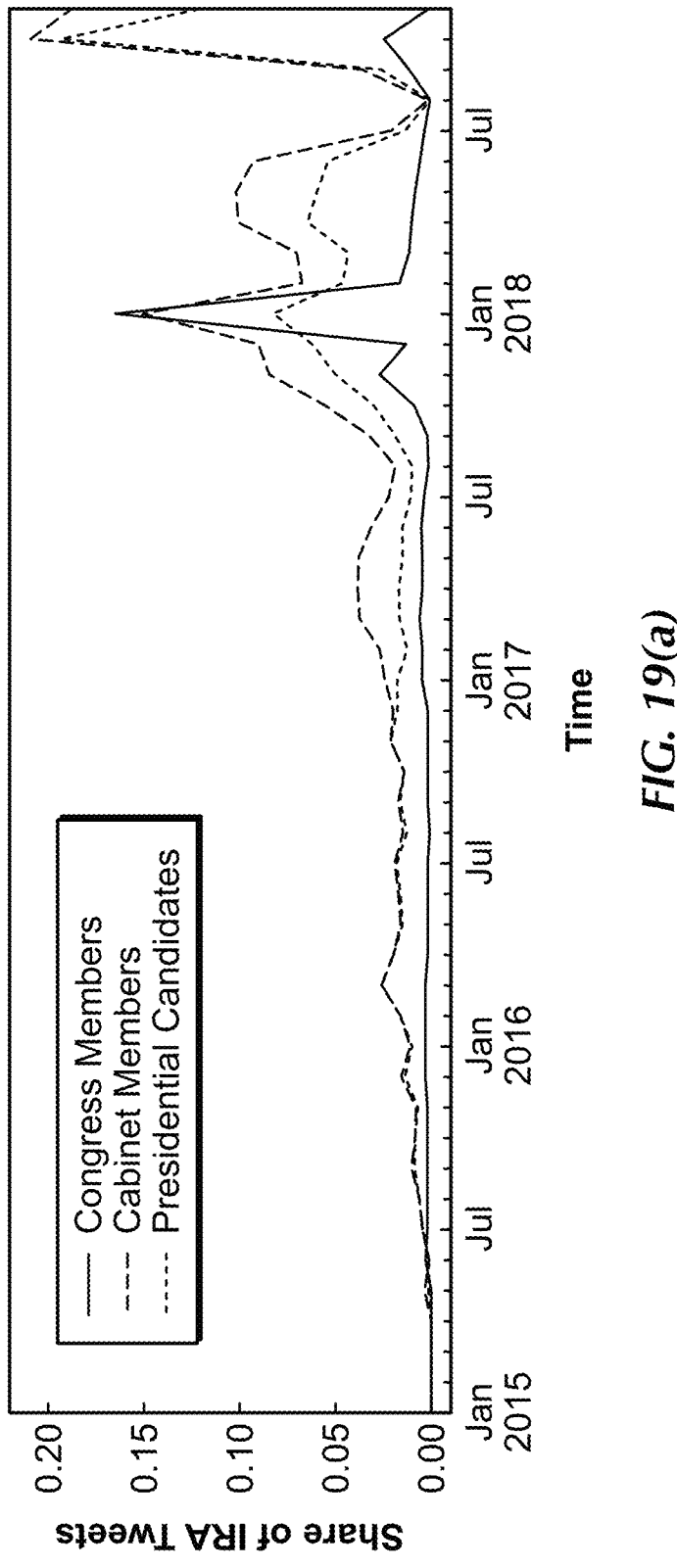
FIG. 19(a) depicts a graph of a share of tweets mentioning members of the congress and cabinet and US 2016 presidential candidates according to an embodiment of the present invention.
Figure 19B:
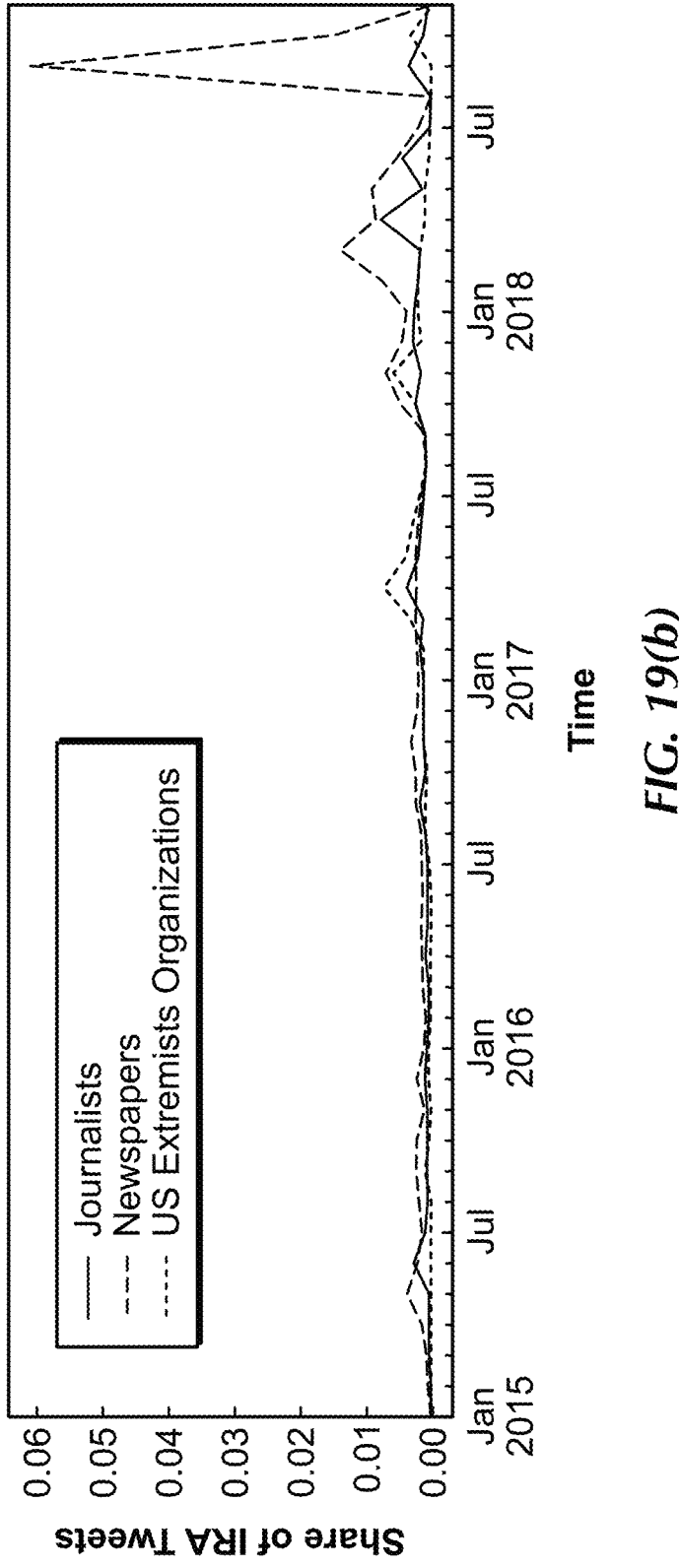
FIG. 19(b) depicts a graph of a share of tweets mentioning US political journalists, US newspapers, and US extremist organizations and individuals according to an embodiment of the present invention.

Before 2016, features relate to mentioned users or a combination of mentioned users and shared URLs. The increase in the importance of top users mentioned by IRA trolls through 2015 correlates with an increase in the share of troll tweets with at least one mentioned user, as shown in FIG. 18(*c*). However, the subsequent importance decrease cannot be explained by changes in the volume or type of mentioned users. FIGS. 19(*a*)-(*b*) show a timeline of six types of users mentioned by IRA trolls. This pattern suggests that IRA trolls began behaving like organic American users in their user mentioning behavior through 2016 and into 2017.

Features combining mentioned users and the types of URLs being shared also reveal tactical shifts. In 2015, trolls stood out for the users they mentioned in posts with links to local news sites, while in 2016, the users they mentioned in posts with links to far-right websites were more distinctive. Both features became important again in 2018. The combination of mentioned users with specific types of co-occurring URLs is distinctive, and its explanatory power cannot be explained by changes in the share of local/far-right URLs or by the share of mentions. FIG. 18(*f*) shows the share of tweets with a link to local news websites.

During election months in 2016, the way IRA trolls were retweeting, replying to others, and mentioning users became more distinctive, as shown in the second row of FIG. 5. To better characterize these changes, the monthly share of retweets, replies, and mentions in troll's tweets are plotted in FIGS. 18(*a*)-(*f*). Both mention and retweet shares were higher in November 2016 than at any point before and decreased after the election, but the share of replies does not show any related surge or decline, as shown in FIG. 18(*b*). The increase in the importance of being a reply on and around the election month is suggestive of changes in control user's behavior, and not a change in troll tactics.

Figure 17A:
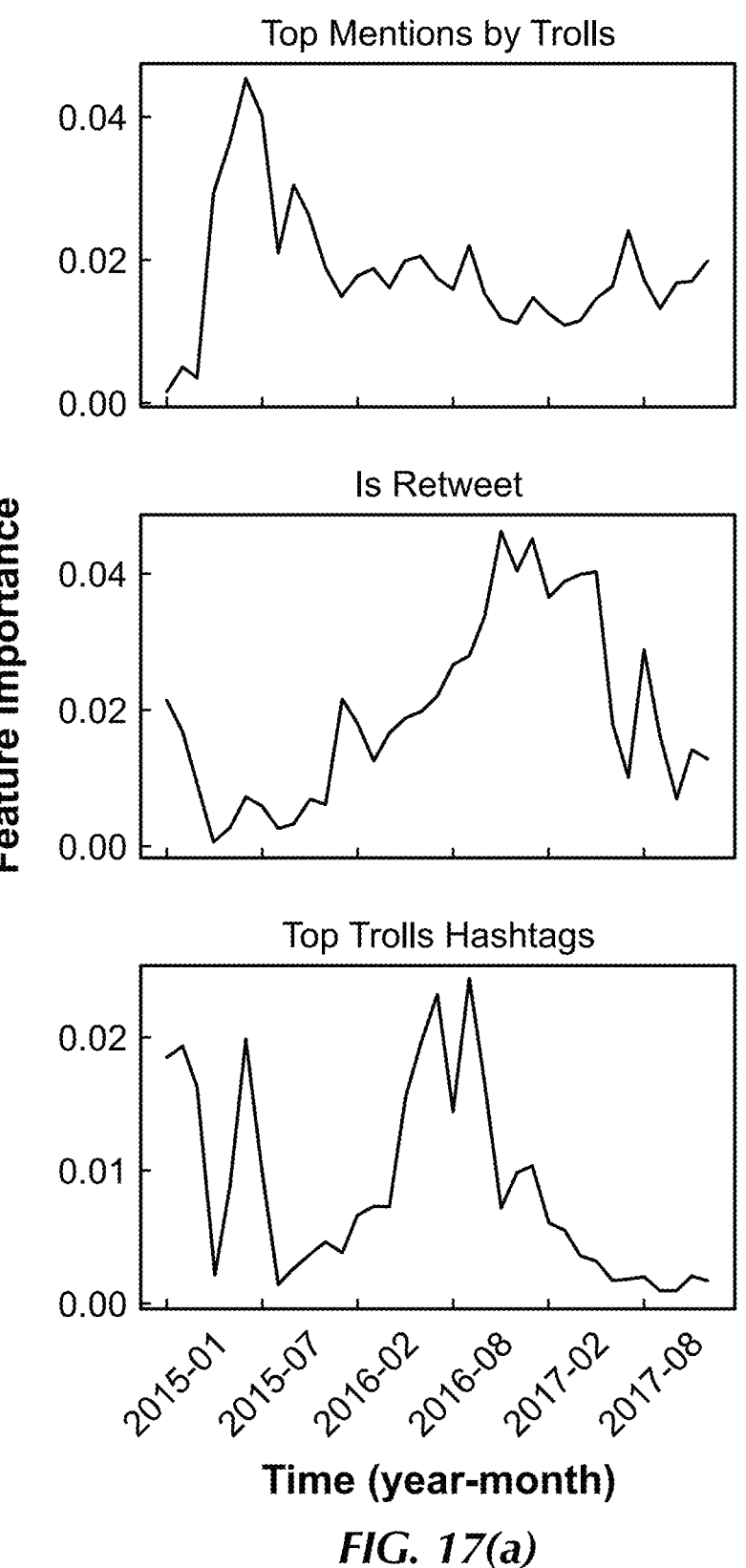
FIGS. 17(a)-(c) depict graphs of feature importance trends of a set of selected predictors according to an embodiment of the present invention.
Figure 17B:
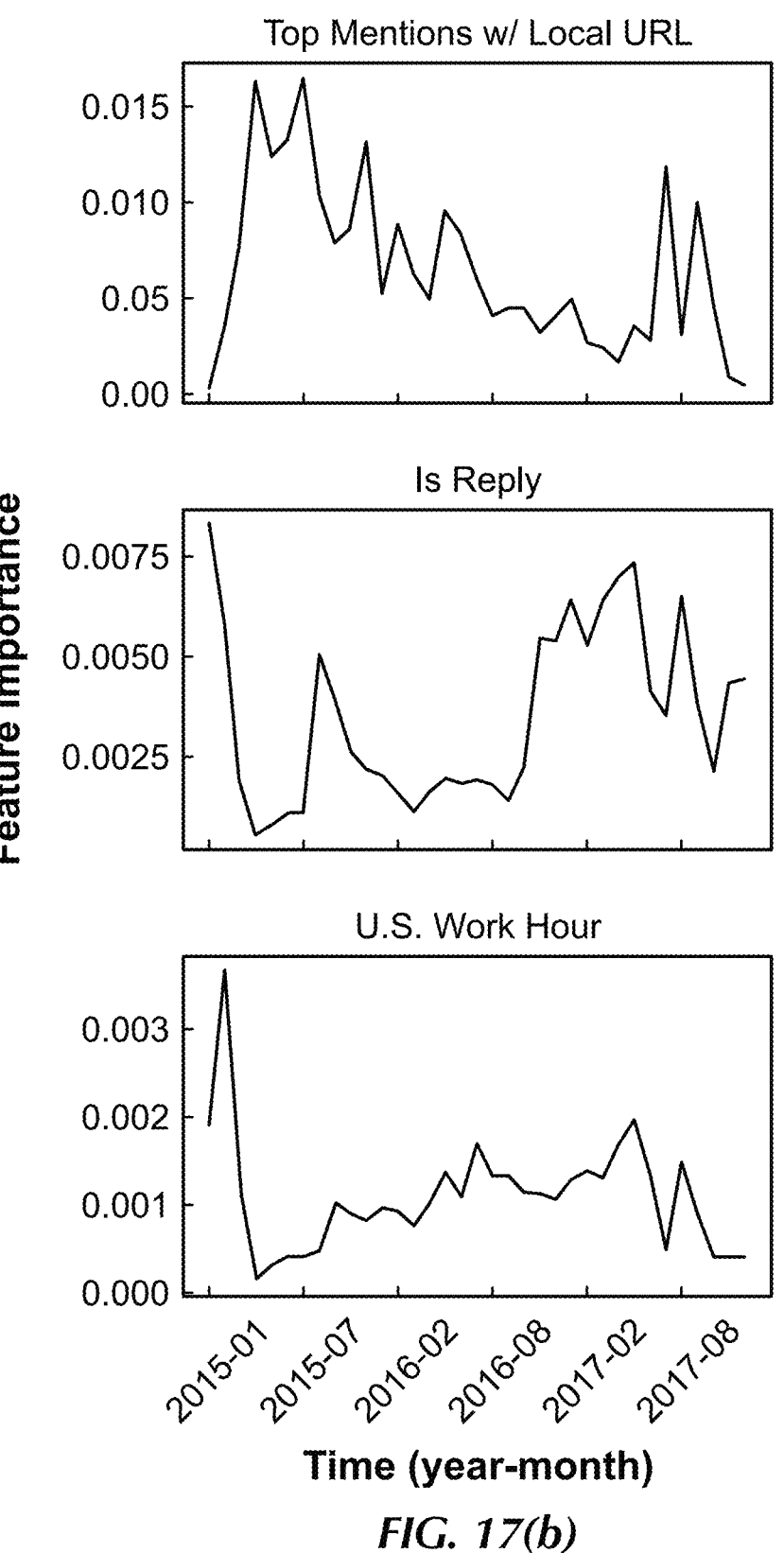
Figure 17C:
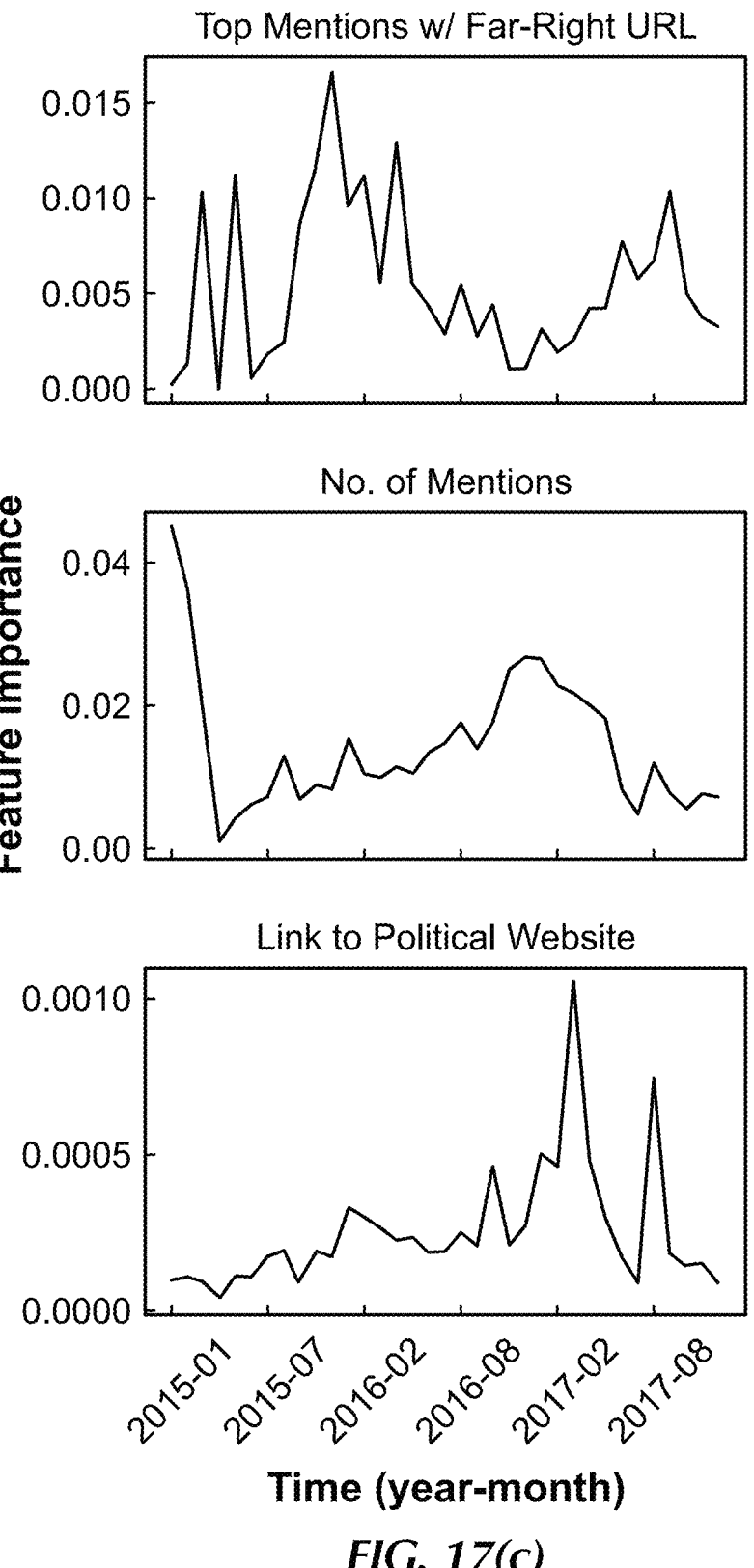
Figure 18A:
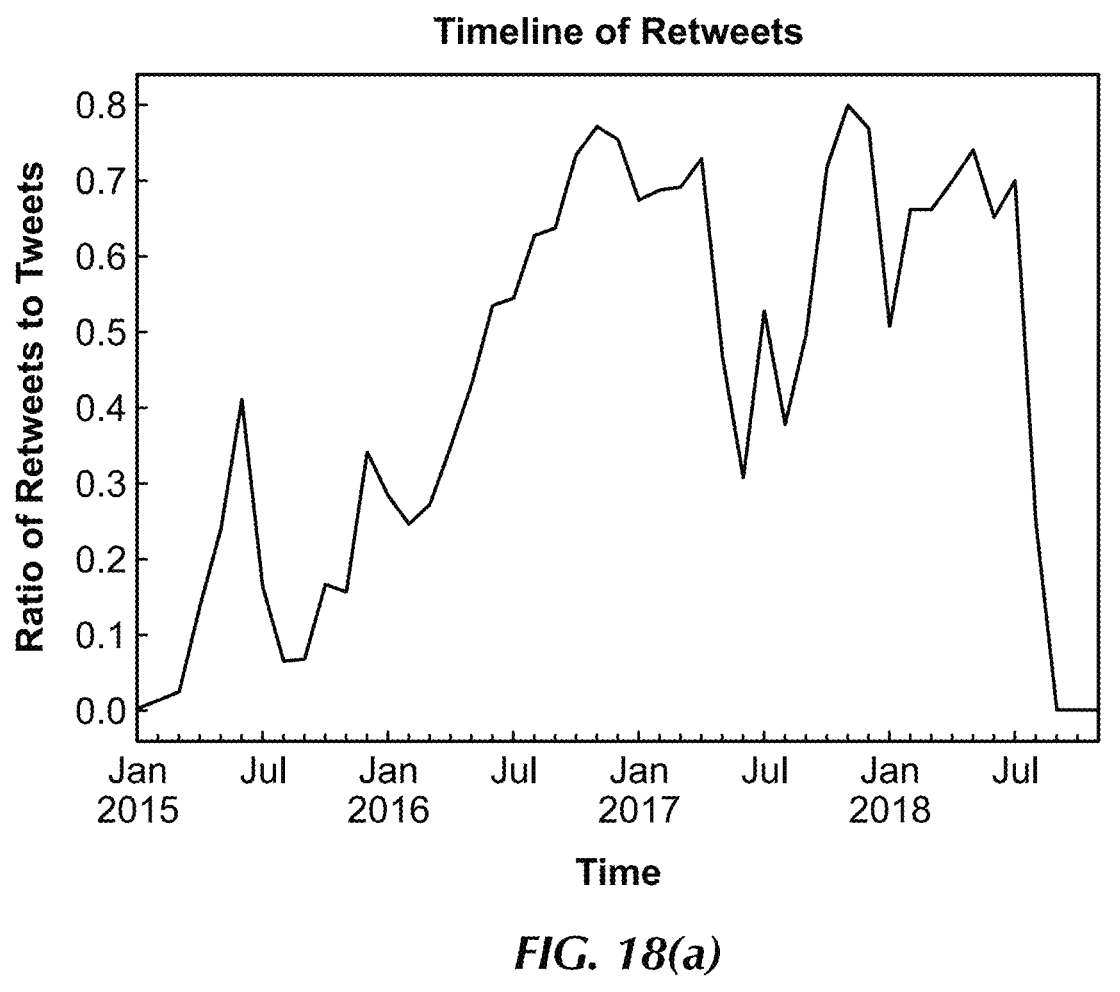
Figure 18B:
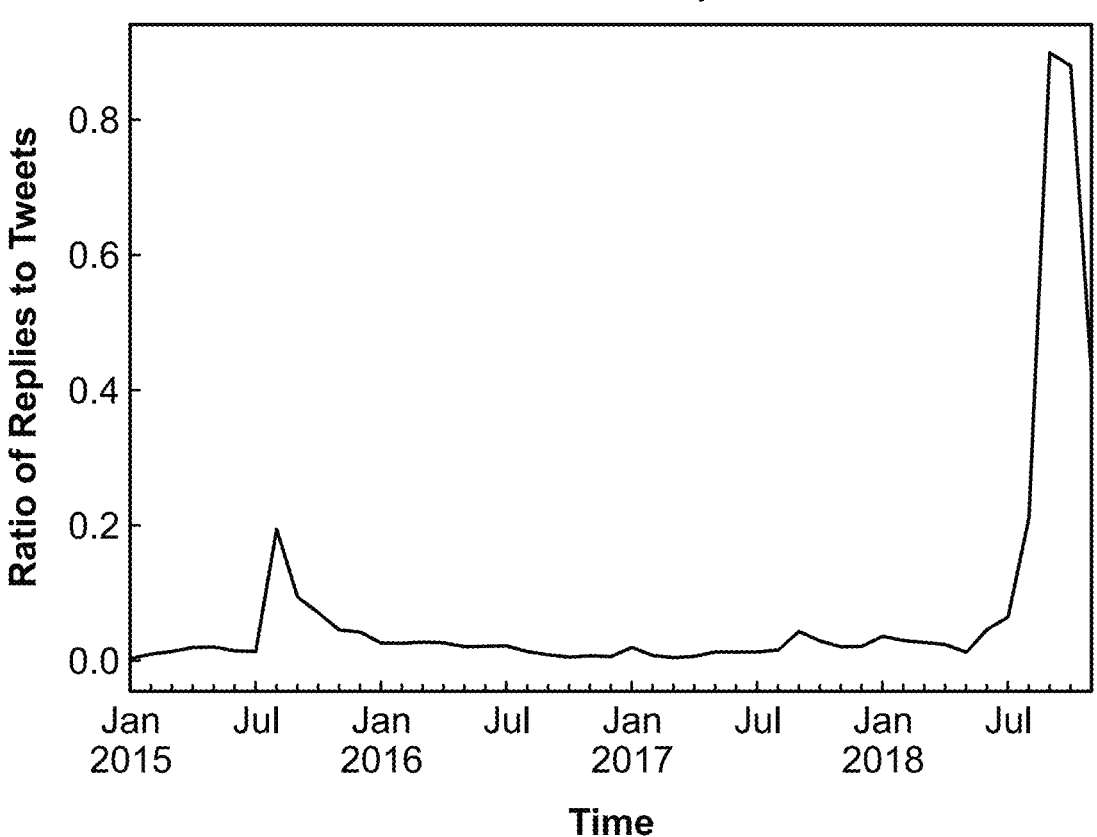
FIG. 18(b) depicts a graph of a timeline of replies according to an embodiment of the present invention.
Figure 18C:
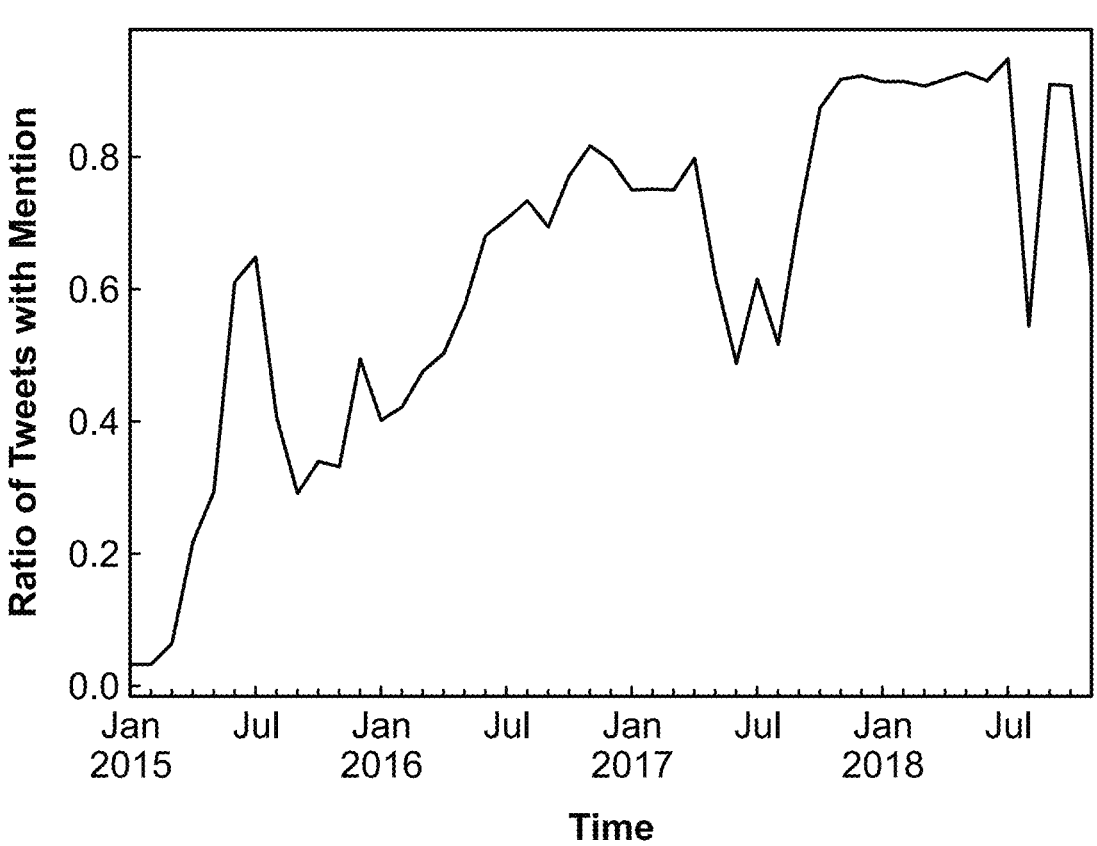
FIG. 18(c) depicts a graph of a timeline of tweets with mention according to an embodiment of the present invention.
Figure 18D:
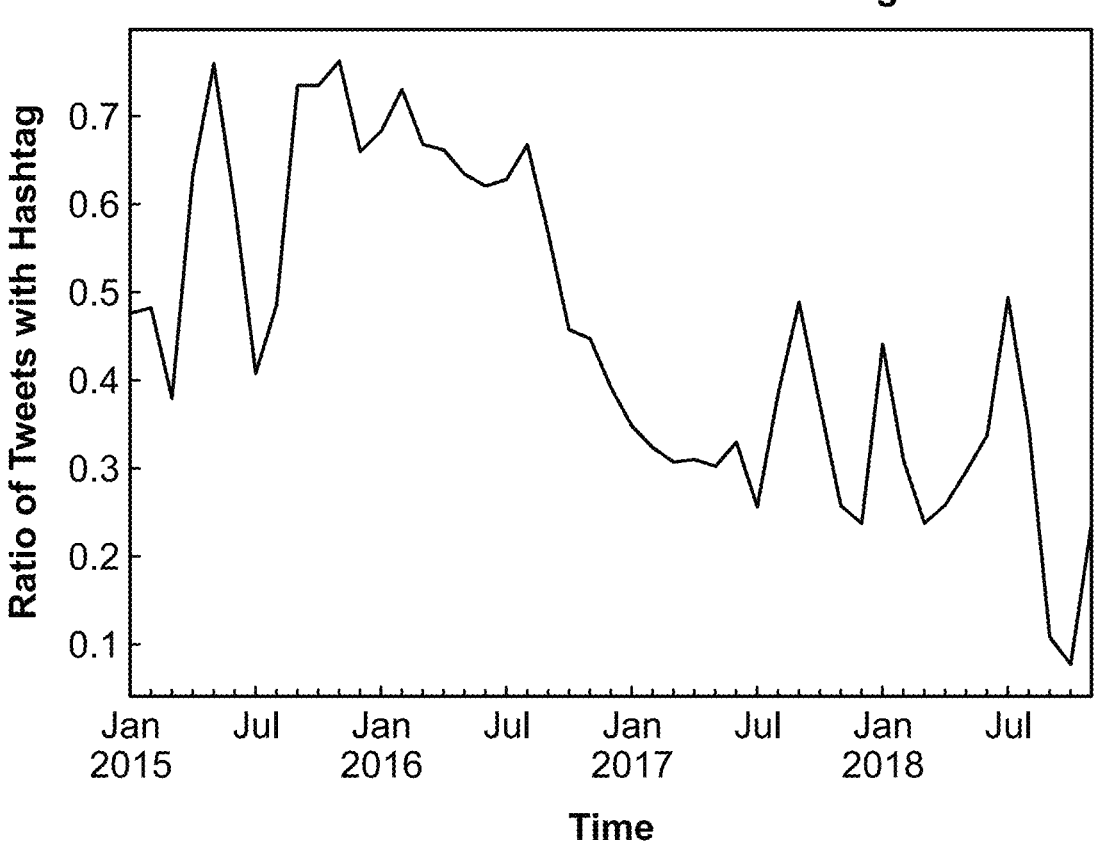
FIG. 18(d) depicts a graph of a timeline of tweets with hashtag according to an embodiment of the present invention.
Figure 18E:
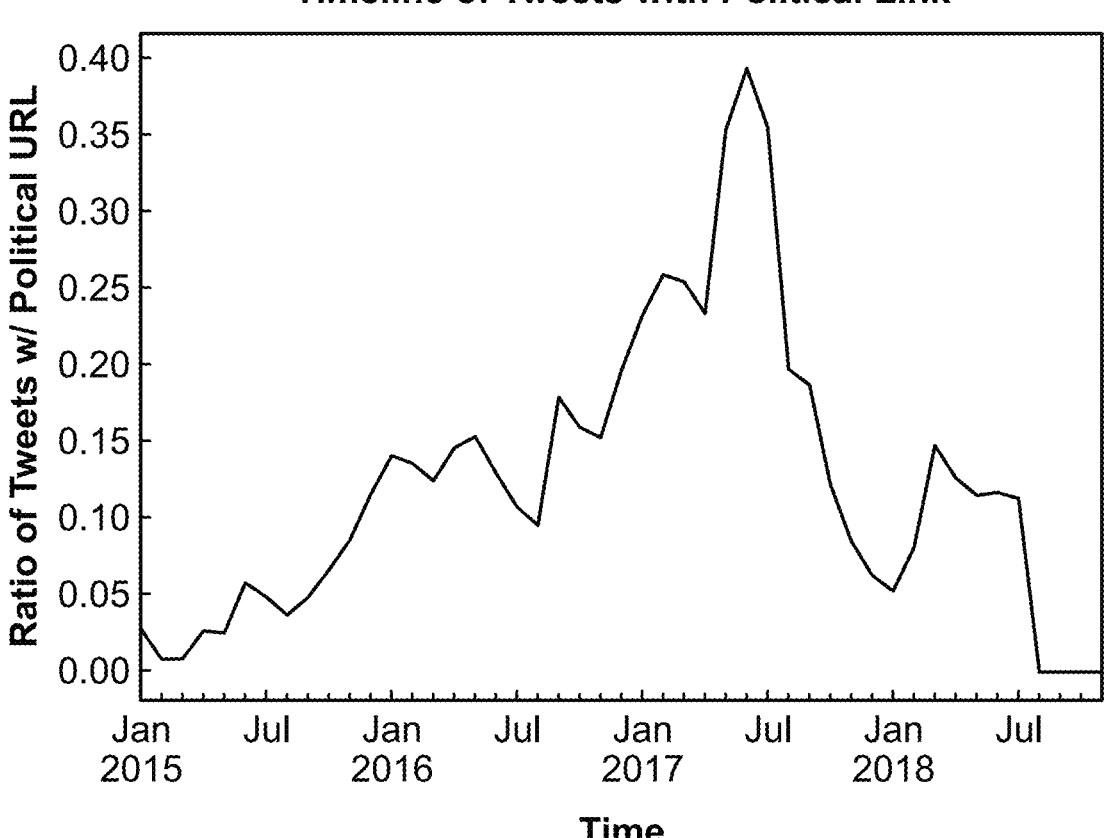
FIG. 18(e) depicts a graph of a timeline of tweets with political link according to an embodiment of the present invention.
Figure 18F:
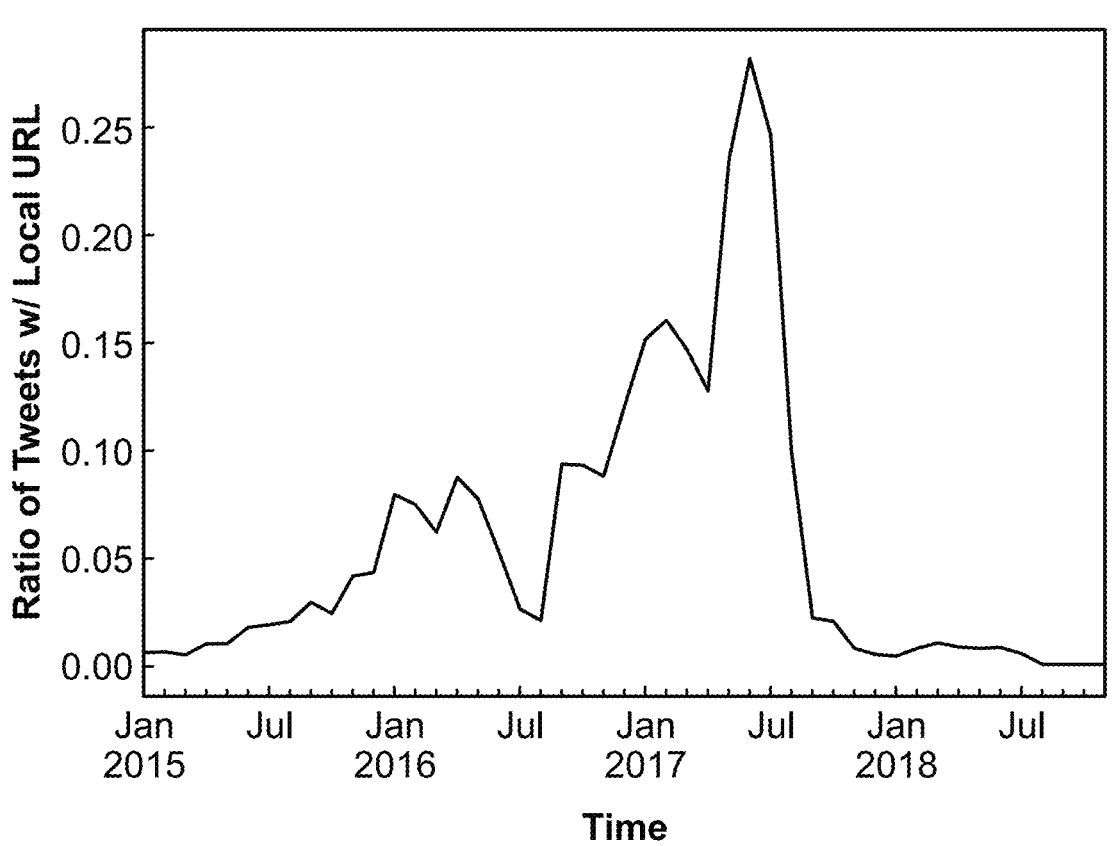
FIG. 18(f) depicts a graph of a timeline of tweets with a local URL according to an embodiment of the present invention.

Last, clear evidence of tactical adaptation is shown in the bottom row of FIGS. 17(*a*)-(*c*). While top hashtags used by trolls were highly important during the spring and fall of 2016, their importance declined considerably in November 2016 and continues to decrease over 2017 and 2018. This is suggestive of tactic change in the usage of hashtags by IRA trolls. That interpretation is consistent with the fact that the monthly share of IRA tweets with at least one hashtag peaked in late 2015 and early 2016, but then continuously decreased until 2017, as shown in FIG. 18(*d*). It is suspected that this change was due to IRA operators realizing that hashtags are a powerful clue to identify their activities, as analysts and platforms can simply query distinctive hashtags to detect coordinated communities.

What Makes Venezuelan Campaigns Easy to Detect?

Content-based features provide near-perfect prediction performance for the Venezuelan influence operation on Twitter in most of the months for the first three tests in in the table in FIG. 3. The disclosed analysis suggests that three factors can explain the large differences between the Venezuelan campaign and the others.

First, for much of their activity, the Venezuelan accounts barely used hashtags and rarely retweeted or replied to others. In addition, except for a few months, they always shared at least one URL in their tweets. This agrees with the finding in the "Explaining performance over time and across experiments" section that most of the differences between Venezuelan prediction performance and others are due to their distinct types of communication features. Once those are accounted for, the Venezuelan campaign is actually less predictable than others, as shown in column 6 of the table in FIG. 12.

Second, when they began to retweet other accounts in mid-2018, the Venezuelan trolls mostly retweeted only one account. Ninety-five percent of their retweets were from @TrumpNewsz, which is one of their own accounts. Third, the Venezuelan trolls were sharing a lot of distinct fake websites, such as trumpnewss.com and trumpservativenews-.club. They also used two nonmainstream URL shorteners: viid.me and zpr.io. Together, these three tactical choices made Venezuelan activity easily recognizable.

Figure 20:
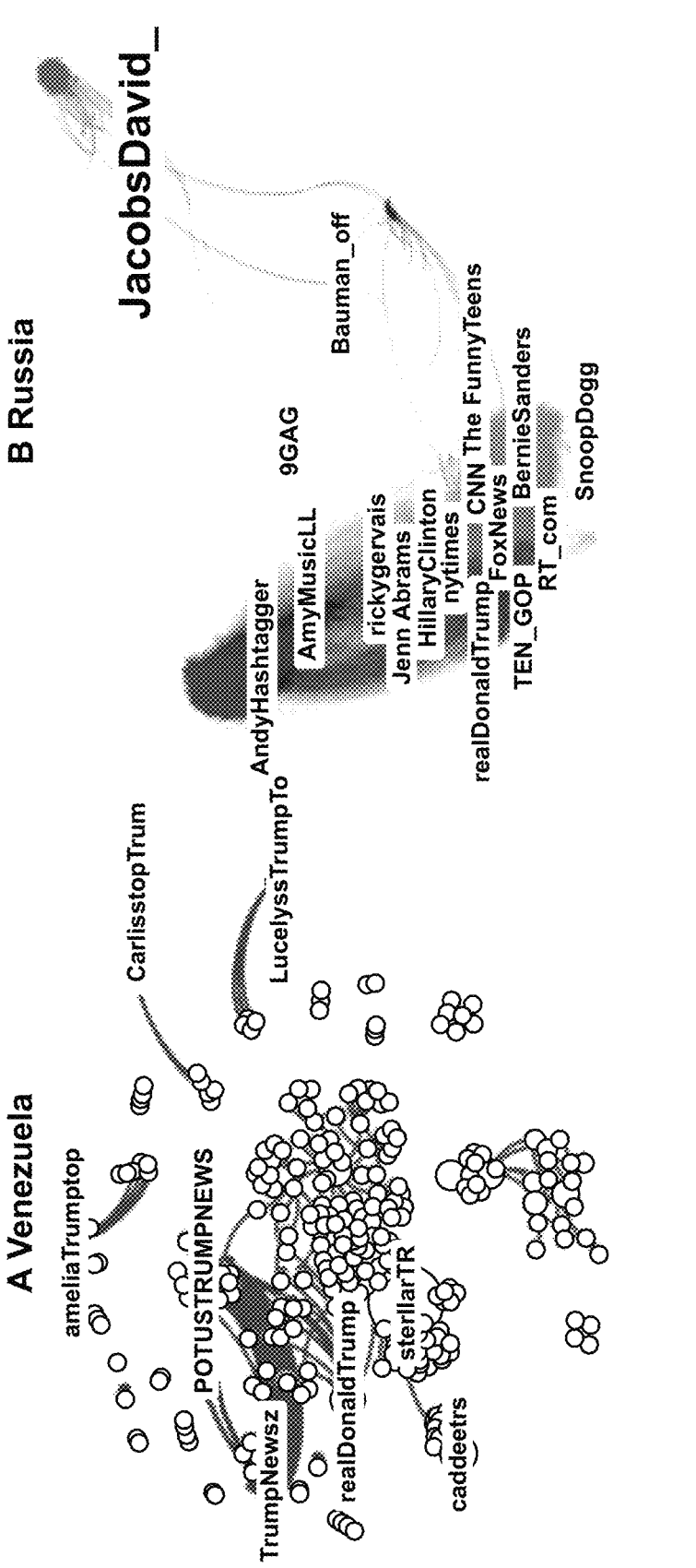
FIG. 20 depicts a graph characterizing retweet networks of Venezuelan and Russian influence campaigns according to an embodiment of the present invention.

Lastly, the organization and division of labor within the Venezuelan operation were simple. Constructing the retweet network of the accounts in the Venezuela's Twitter campaign, as shown in the left side of FIG. 20, few central accounts and many side accounts (most likely bots) are shown around each, which is the simplest form of running a campaign on Twitter. In comparison, half a dozen distinct communities are shown within the retweet network of the IRA trolls, as shown in the right side of FIG. 20, which reflects a clear division of labor among them. For example, while accounts in the one community of the IRA trolls were mostly engaging in hashtag gaming or sharing commercial and diet links, users in other communities were in charge of targeting Republican and Democrat supporters, respectively. However, the central accounts in Venezuela's campaign were all related to Trump and Trump-related issues.

Activate Learning Materials and Methodology for Prediction Module 18

Figure 33:
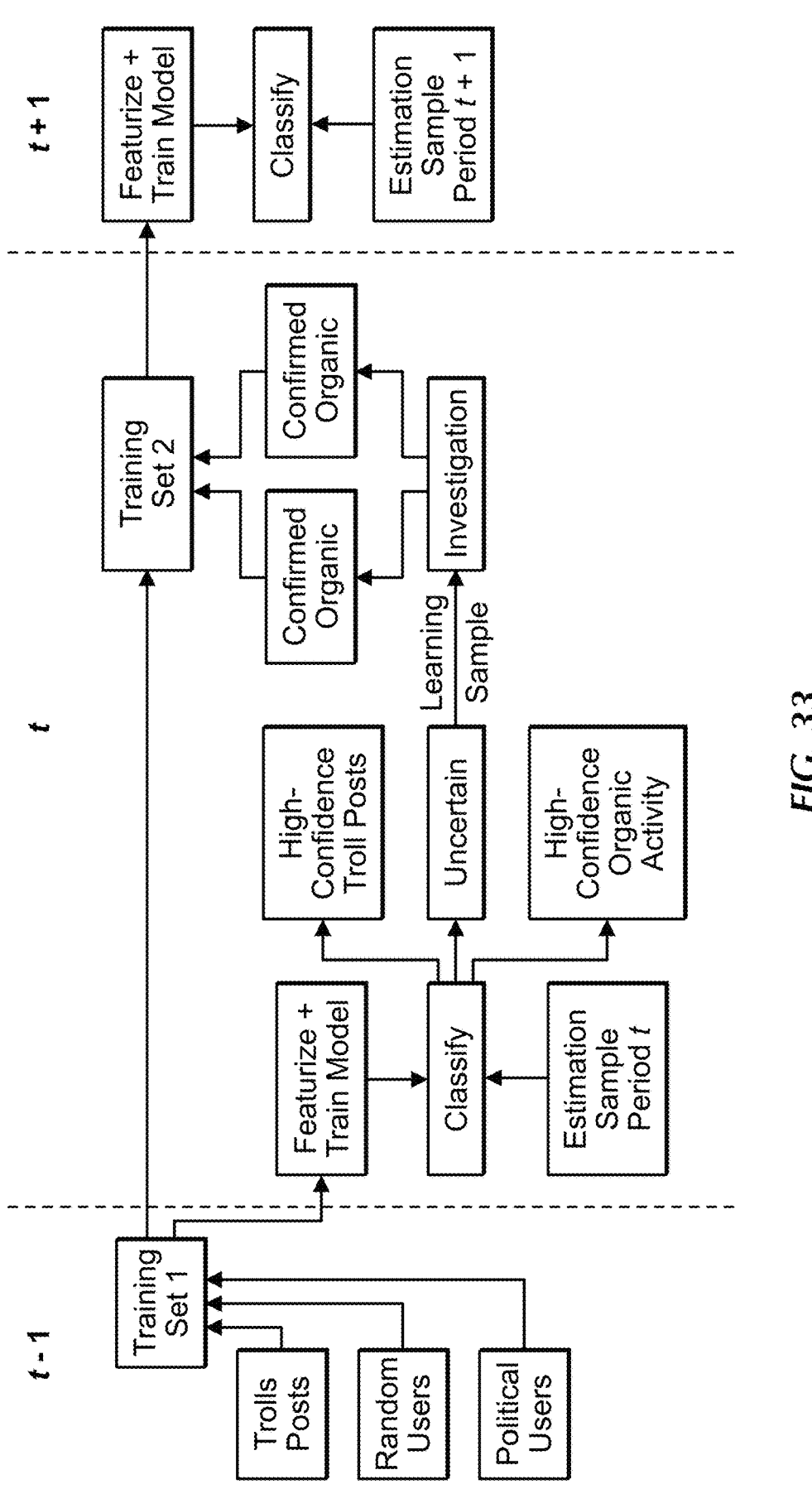
FIG. 33 depicts a flow chart of methodology for the prediction module incorporating active learning according to an embodiment of the present invention.

Described herein are embodiments for a methodology incorporating active learning for using classifiers trained on human-interpretable features to assess whether posts on a given social media platform are part of a previously observed coordinated influence operation. A flow chart for this methodology is shown in FIG. 33.

Data

The classifier requires data on two kinds of social media activity: (i) posts by the accounts of a given coordinated influence operation (i.e., positive class) and (ii) a principled sample of organic user's activity (i.e., negative class). It should be noted the data used for the activate learning approach is the same as the data used in the baseline approach described above. However, this is not intended to be limiting.

Active Learning

Active learning is a subfield of machine learning in which a system interactively queries an 'oracle' (e.g. human annotator or other source of high-reliability classification) to label new data points. The key idea behind active learning is that in situations where data labeling is expensive, better results can be obtained if the system can choose what new datapoints should be labeled. Four active learning scenarios are considered to simulate various real-world situations in which one received data about an influence operation (e.g. through platforms' investigations) and is then able to manually investigate a subset of post-URL pairs on a monthly basis. These provide a lower-bound on the performance of the classifiers where investigations by platforms are limited. These four active learning scenarios are compared to a baseline model in which no further investigations are performed but there is some information revelation over time.

It should be noted these four active learning scenarios are exemplary and not intended to be limiting. For instance, it is also possible to incorporate stratified sampling of new cases at different point in the score distribution in alternative embodiments.

(1) Baseline: For each month t, a classifier is trained on all previous months labeled data (i.e. t–1, t–2, . . . ) and tested on current month t. Then 2.5% of the size of test data is randomly selected from predicted troll and non-troll content and is added to the pool of labeled data. This equates to a situation in which one received a one-time data about an influence operation through platforms and wants to detect future content without relying on new data from platforms and without using an active learning approach on how to use the output of the model on the current month for the next month.

(2) Least Confident Sampling: A basic uncertainty sampling strategy is to query those data points whose predicted output is the least confident. For each month t, a classifier is trained on all previous months labeled data (i.e. t–1, t–2, . . . ) and tested on current month t. Then, using the result of the classifier on test data, highly uncertain tweet-URL pairs (e.g. p(troll)∈[0.3, 0.7]) are queried and added to the pool of labeled data with their true labels. This equates to a situation in which one received a one-time data about an influence operation through platforms and can query a limited number of data points from them on a monthly basis.

(3) Entropy Sampling: This uncertainty sampling strategy uses Entropy as the uncertainty measure. For each month t, a classifier is trained on all previous months labeled data (i.e. t–1, t–2, . . . ) and tested on current month t. Then the entropy of class probabilities is measured for all data points and the top decile value data is queried and added to the pool of labeled data.

(4) Certainty Sampling: For each month t, a classifier is trained on all previous months labeled data (i.e. t–1, t–2, . . . ) and tested on current month t. Then highly certain tweet-URL pairs (e.g. p(troll)>0.8) are selected and added to the pool of labeled data with their model-assigned label (i.e. not true label). This equates to a situation in which one received a one-time data about an influence operation through platforms and wants to detect future content without relying on new data from platforms.

(5) Hybrid Sampling: For each month t, a classifier is trained on all previous months labeled data (i.e. t–1, t–2, . . . ) and tested on current month t. Least confident tweet-URL pairs are queried to obtain their true labels, highly certain tweet-URL pairs are selected and their model-assigned labels are used, half of each are randomly selected, and those halves are both added to the pool of labeled data.

Only three months of groundtruth data are considered and the simulation is started at 2015/4 for Russian, 2016/04 for Chinese, and 2016/12 for Venezuelan campaigns. A serial simulation is conducted in which the output of a model on a given month will be fed to the above five strategies and the results will be added to the groundtruth data for training a model for the next month. Each of the above strategies are applied on two out-of-sample prediction tasks: (1) only post-URL content of month t from users who were not active in the training period, which simulates situation in which the already identified accounts were shut down by platforms and have not been replaced by new troll accounts; (2) considering all Post-URLs of month t but randomly shuffling the accounts' creation dates for those users who were active in the training period. Here, the assumption is that previously identified accounts were shut down by platforms, but they have been randomly replaced by a pool of new unused troll accounts who were created on the same dates as identified accounts. This mutation is imposed to make sure that the classifiers does not simply identify the accounts based on their account creation date.

Overall, this results in 30 country×prediction-test×active-learning-strategy combinations and 955 monthly classifiers. Each classifier takes almost a day to run on a Dell Linux cluster (computing device) with a 2.4 GHz Broadwell processor and 192 GB of memory. Since this is a serial simulation in which the output of a model on a given month will be used for training in the next month, each country× prediction-test×active-learning-strategy task takes between 15 to 40 days to accomplish depending on the data size.

Feature Engineering

Five categories of human-interpretable features are computed for each tweet-URL pair: content, meta-content, tweet-timing, account-timing, and network. It should be noted the feature categories are the same as the categories used in the baseline approach described earlier. However, this is not intended to be limiting. Overall, up to 1,067 features were crafted for each tweet-URL pair at each month. The table in FIG. 21 illustrates a complete list.

Modeling and Evaluation

Random forest classifiers are trained using the scikit-learn library for Python. It should be noted the training parameters are the same as the parameters used in the baseline approach described earlier. However, this is not intended to be limiting.

Hyper Parameter Tuning

Any model comparison or grid/random search on hyper-parameters is avoided here. This ensures the same parameters are used for all classifiers, making the tests performed herein apples-to-apples and oranges-to-oranges comparisons. The results, therefore, represent a lower-bound on the performance of active learning with content-based classifiers and the lack hyperparameter tuning is not intended to be limiting.

Performance and Results

Performance

The tables in FIGS. 22-33 report mean and standard deviation of F1 scores for monthly classifiers for detection of tweets written by new and all users, respectively. Four points stand out: (1) uncertainty sampling (i.e. least confident and entropy) is the best strategy; (2) hybrid sampling always decreases performance (compared to least confident strategy); (3) certainty sampling performs better than the baseline when detecting tweets written by new trolls; however, the baseline model slightly outperform certainty sampling when detecting all users' content; and (4) certainty sampling, in which model output is fully relied upon and platforms are never queried from, usually perform well enough. Each is discussed in the details below.

If it is possible to query highly uncertain data points from platforms, uncertainty sampling is always the best strategy across both new users and all users. In case of detecting only new users in a given test month, overall stable prediction performance were obtained across countries (FIG. 22), with minimum average monthly F1 score of 0.80 for the Russian operation and maximum of 0.99 for the Venezuelan operation. In the case of considering all users in the test month and randomly shuffling the account creation dates of those who were active before, stable and usually better performance was achieved compared to detecting only news users' tweets across countries (FIG. 23).

When querying from platforms is accessible, pooling platform-labeled tweets with model-labeled tweets (i.e. hybrid strategy) always decreases prediction performance for Chinese and Russian influence campaigns. Five and three percentage point reductions are seen in average monthly F1 scores of detecting new users content in hybrid sampling compared to uncertainty sampling for Chinese and Russian operations respectively (FIG. 22). As for detecting all users content in test months, eight and eighteen percentage point reductions are seen in average monthly F1 scores when pooling platform-labeled tweets with model-labeled tweets (FIG. 23).

When querying new observations from platforms is not possible, the classifiers still show reasonable prediction performance, especially for Chinese and Venezuelan operations. For a test of detecting content from new users in test months, average monthly F1 scores of 0.80, 0.76, and 0.99 were achieved for Chinese, Russian, and Venezuelan trolls, respectively (FIG. 22). For a test of detecting content from all users in test months, average monthly F1 scores of 0.84, 0.70, and 0.97 were achieved for Chinese, Russian, and Venezuelan campaigns, respectively (FIG. 23). This shows one can obtain stable and reasonable prediction performance over time (2-3 years) just by having an initial set of platform-labeled data of information operations.

Overall, the results suggest that only the Russian information operation was so dynamic that it was hard to follow through time by a content-based machine learning tool and required human intervention to obtain new groundtruth data. Nevertheless, machines could track Chinese and Venezuelan campaigns through time without any human intervention using a simple baseline or certainty sampling strategies.

Query Size

Since the results show the superiority of uncertain sampling strategies, in which platforms are hypothetically queried on a monthly basis, over self- or no-query strategies, it is of interest to know the size of the query samples.

The tables in FIGS. 24 and 25 summarize the average number of queried tweets and its equivalent number of users for tests of identifying the content of new and all trolls respectively. Note that platforms are not being queried in the baseline and certainty approaches and thus there are zero values for them in FIGS. 24 and 25. Three observations are of interest in the results: (i) tracking the Venezuelan campaign needs querying only a handful of users each month; (ii) testing all users requires almost ten and five times more tweets and users to be queried compared to testing only news users; and (iii) compared to least confident sampling strategy, entropy sampling always needs a smaller sample to query. In other words, entropy sampling produces the same results as least confident sampling with slightly less query size.

Precision Recall Curves

One of the main challenges in bot and troll detection is the lower share of trolls and their content relative to organic users. F1 score might not appropriately help in drawing inferences about the ability of a classifiers to detect trolls content because it can mask the imbalance between precision and recall by averaging the two. To examine this possibility, Precision-Recall (PR) curves are used to evaluate the prediction performance of embodiments of the disclosed classifiers.

Figure 26A:
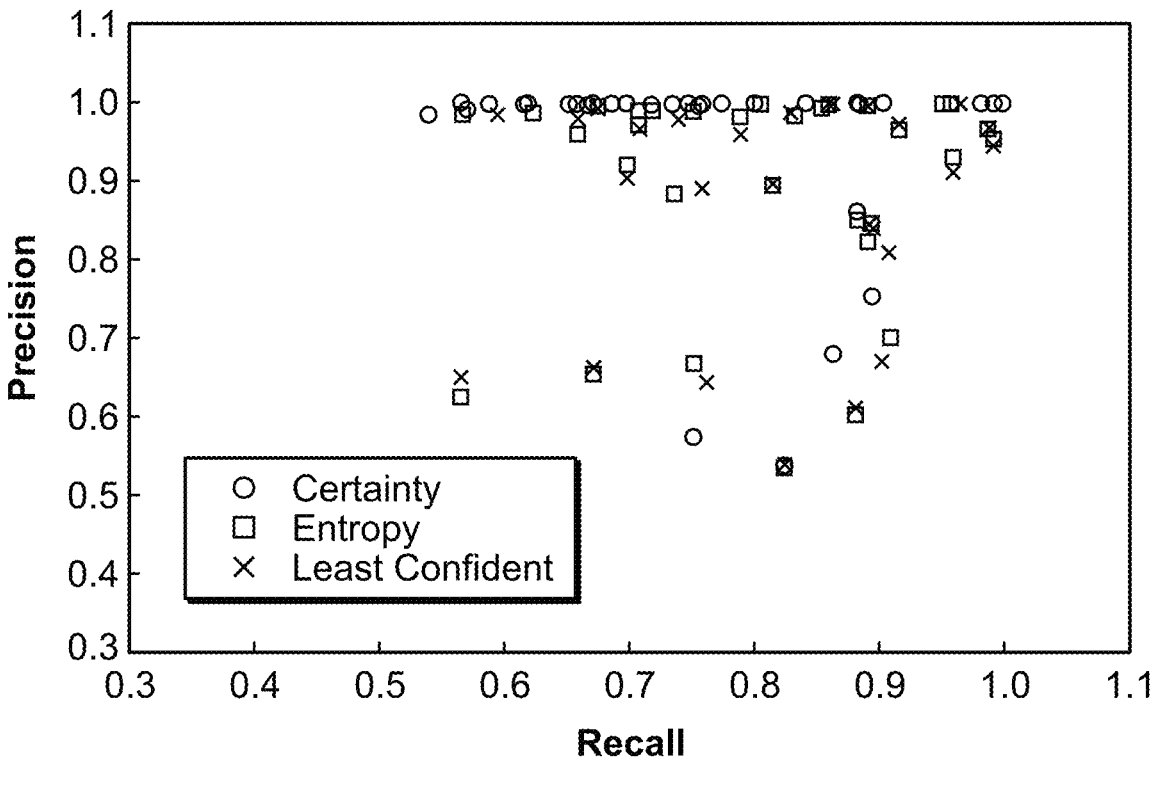
FIG. 26(a) depicts a graph of cross-strategies precision-recall plots for identifying tweets written by new trolls in a test month for the China campaign according to an embodiment of the present invention.
Figure 26B:
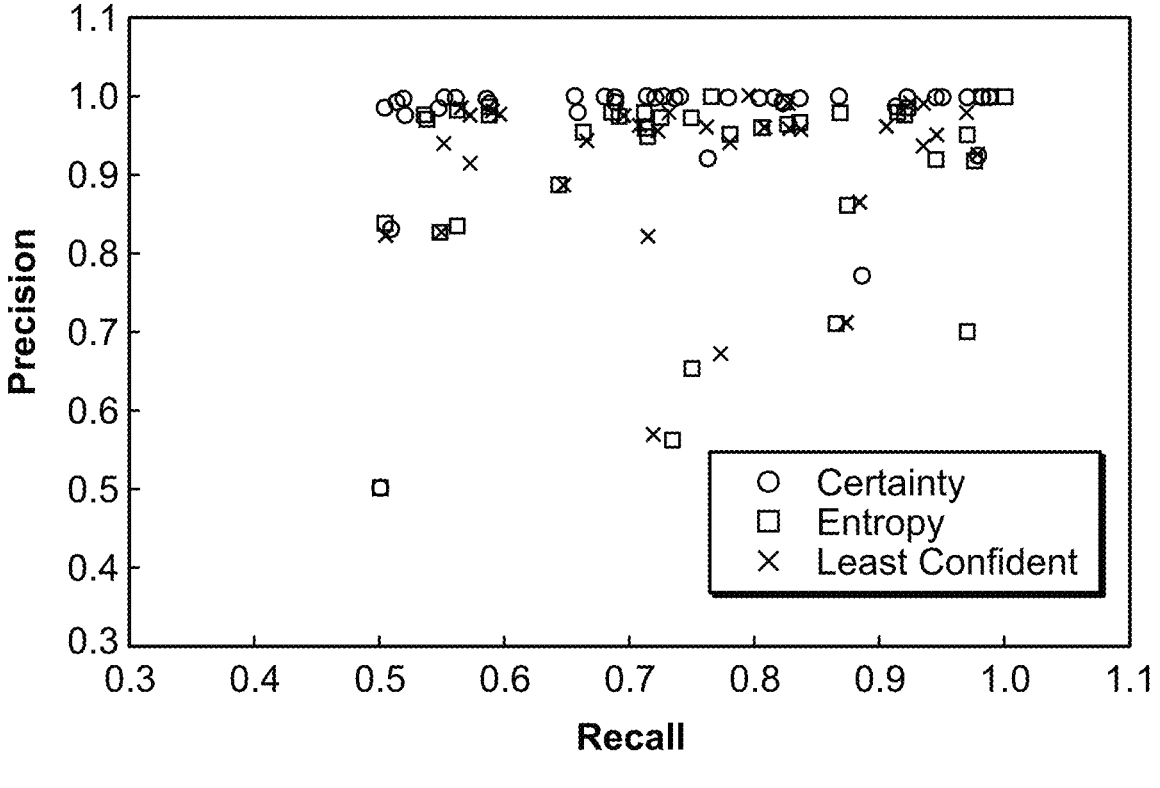
FIG. 26(b) depicts a graph of cross-strategies precision-recall plots for identifying tweets written by new trolls in a test month for the Russia campaign according to an embodiment of the present invention.
Figure 26C:
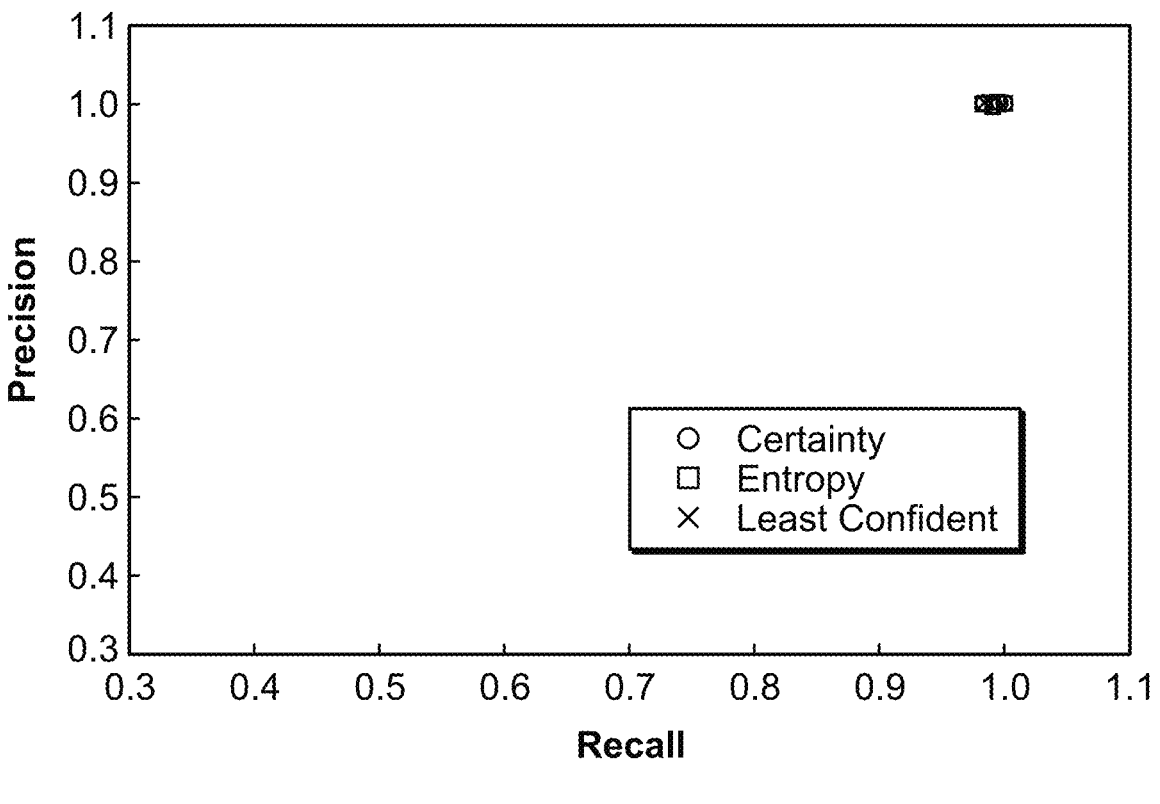
FIG. 26(c) depicts a graph of cross-strategies precision-recall plots for identifying tweets written by new trolls in a test month for the Venezuela campaign according to an embodiment of the present invention.

FIGS. 26(*a*)-(*c*) show PR curves for the test of detecting the content of new trolls in test months across various strategies and countries. The results show that in general the classifiers yield higher precision than recall. In the cases of China (FIG. 26(*a*)) and Russia (FIG. 26(*b*)), the classifiers show precision of 1 or close to 1 in most month-strategy combinations, with recall ranging from 0.5 to 1. In the case of Venezuelan trolls, both precision and recall are close to 1 in all months (FIG. 26(*c*)). Overall, these results imply that in the test of detecting the content of new trolls, usually there are low rates of false positive organic users classified as trolls; however, there may be a failure to detect up to half of the trolls tweets.

Figure 27A:
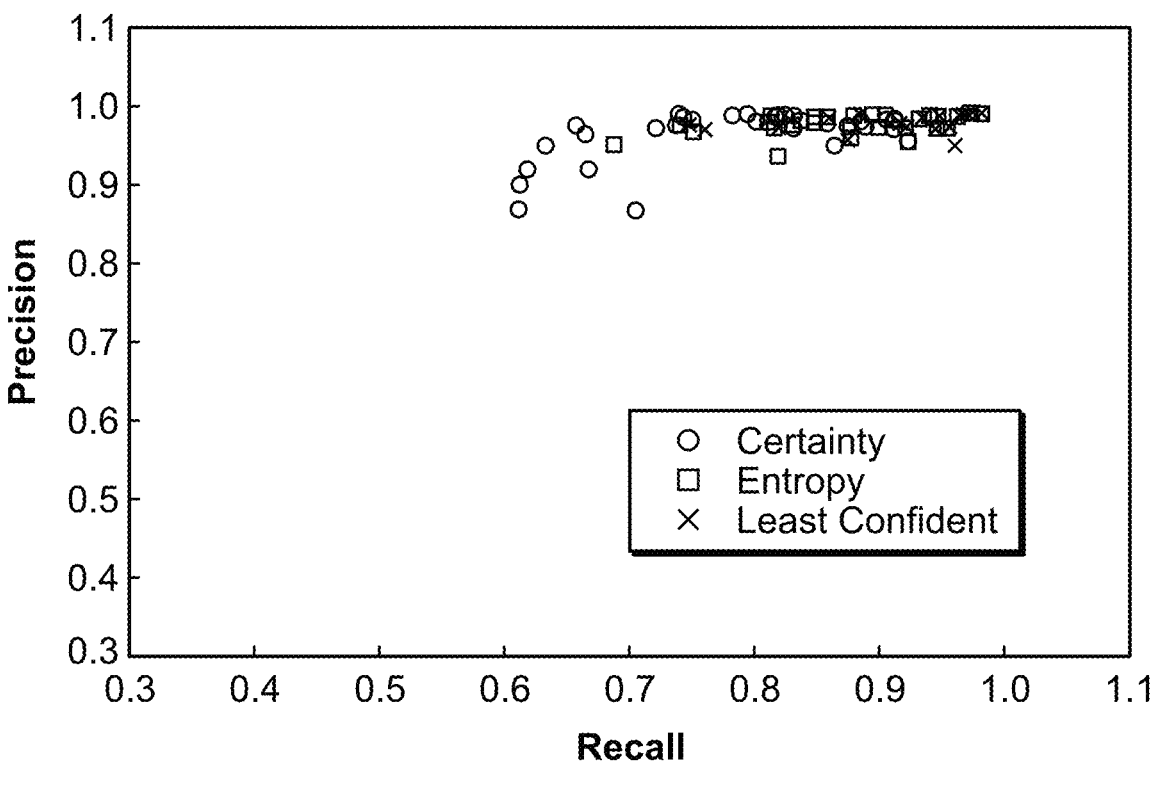
FIG. 27(a) depicts a graph of cross-strategies precision-recall plots for identifying tweets written by all trolls in a test month for the China campaign according to an embodiment of the present invention.
Figure 27B:
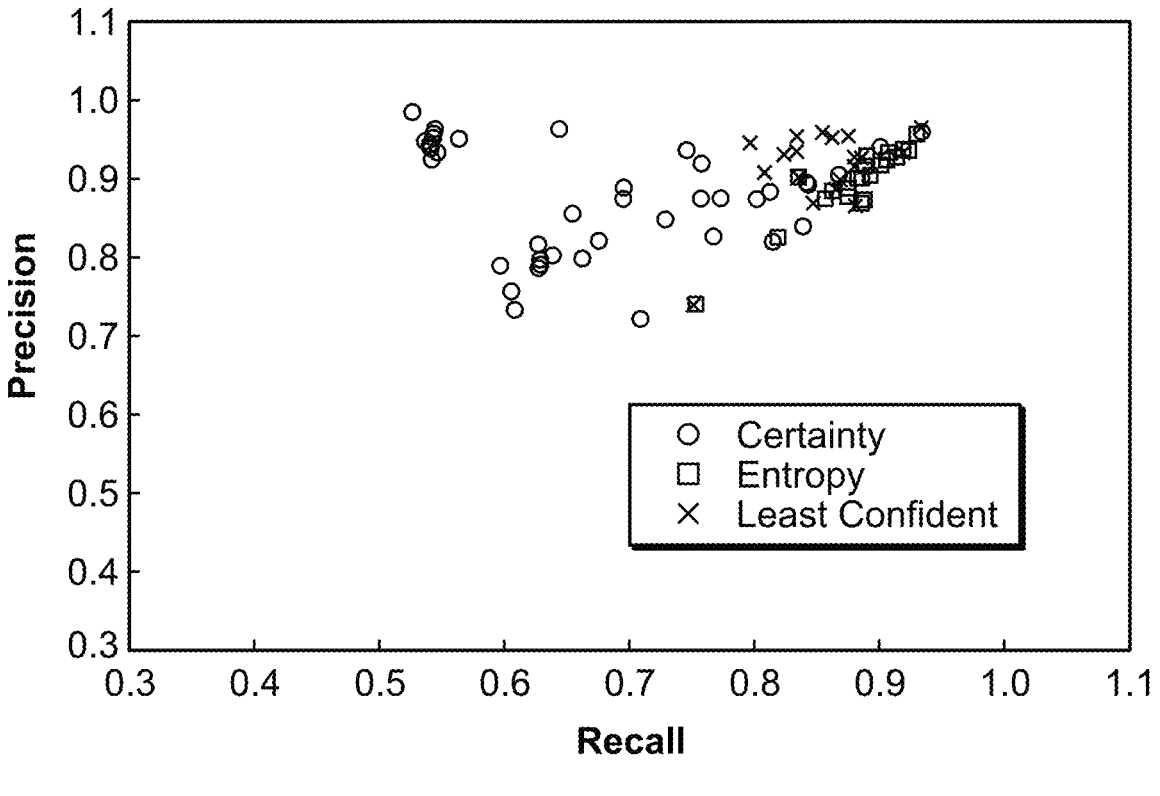
FIG. 27(b) depicts a graph of cross-strategies precision-recall plots for identifying tweets written by all trolls in a test month for the Russia campaign according to an embodiment of the present invention.
Figure 27C:
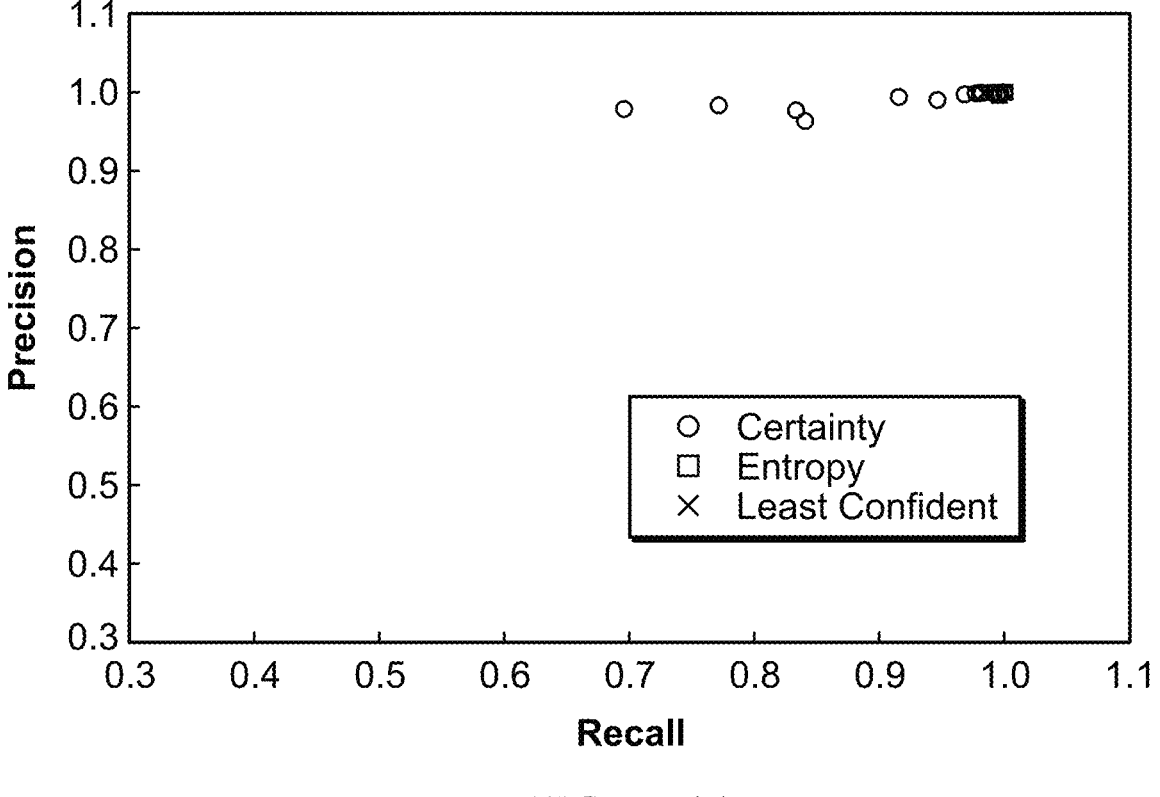
FIG. 27(c) depicts a graph of cross-strategies precision-recall plots for identifying tweets written by all trolls in a test month for the Venezuela campaign according to an embodiment of the present invention.

FIG. 27(*a*)-(*c*) show PR curves for the test of detecting the content of all trolls in test months across various strategies and countries. In the case of China (FIG. 27(*a*)), the results show a similar pattern of having higher precision than recall, but with much lower variance in precision. In the case of Russia (FIG. 27(*b*)), however, the classifiers show more balanced precision and recall scores. In fact, in most month-strategy combinations, the precision and recall are close together. This means that, not only does the classifier fail to detect some trolls tweets, it misidentifies some organic human content as trolls content. In the case of the Venezuelan trolls, both precision and recall are close to 1 in most of the months (FIG. 27(*c*)), but classifiers yield recall scores as low as 0.7 in a few months.

Taking all PR curves into account, the results are promising. Regardless of the type of trolls in test set (i.e. new or all) and active learning strategies, the classifiers consistently exhibit near to 1 precision score in most months across Chinese and Venezuelan operations. This is also true for testing new users of Russian operation. Considering the negative social and political impact of mistakenly label organic human users content as belonging to a coordinated influence operation, the disclosed classifiers exhibit low risk due to having high precision score. The only exception is testing on all users in Russian Twitter data set which produces less than 1 precision in most of the months, which in turn may need higher human moderation.

Important Features

To formally examine the relative importance of various types of features, the features were categorized into 5 groups: content, meta-content, content timing, account timing, and network. The model trained on content features alone can be considered as a baseline and prediction performances are compared by adding each group of features across two tests and four strategies.

The results for the Russian Twitter campaign are demonstrated herein (see the table in FIG. 28 for testing on new users and the table in FIG. 29 for testing on all users). Compared to the baseline, adding meta-content features on average increases the F1 score by 7.5 percentage point across our two tests and four active learning strategies. Content timing features are not effective and add little to the performance (after account for other aspects of the content they produced, the fact that many IRA trolls worked Moscow hours in 2016 does not appear to be important). Account timing features, however, increases the F1 score by 3.3 percentage point on average across various tests and strategies. Finally, including network features (e.g. various attributes of the co-shared and co-occurring hashtags network) has mixed effects on the prediction performance. In some cases, it leads to better performance, but in most of the cases it has zero or negative effects, hence their exclusion from the results above.

Explaining Performance

Measuring the sources of variations in classifiers' prediction performance over time gives a way of assessing which features explain the variation in performance, and how much variation they explain. To assess the sources of performance, monthly precision, recall, and F1 scores are regressed on country, prediction test, active learning strategy, temporal trends, communication type of troll content, data characteristics, and number and significance of political events in the US in a given month. The table in FIG. 30 summarizes descriptive statistics and the table in FIG. 31 shows the regression estimates.

Three important facts stand out. First, performance differences between campaigns are small once the characteristics of their communications (i.e. retweet share, reply share, share with mention, share with hashtag, and share with a link to a local news website) are account for. Second, with constrained investigative resources labeling those posts that the mode is the least confident about them is clearly the best active learning strategy. Third, predicting only new accounts is slightly harder in terms of recall, presumably because a small share of such accounts are engaging in completely different ways than preexisting accounts.

Conclusion

Domestic and foreign agents no longer need to physically participate in street riots or student protests to polarize the population or invest in television advertisement or movies to manipulate public opinion. Although social media platforms make advertisement cheaper and make it easier for non-incumbents to get public and media attention, they also make it easier and cheaper to conduct influence operations to shape politics at home or in a foreign state. While the research community has yet to measure the extent to which social media manipulation efforts affected voter preferences, there is a strong consensus within academic scholars and policy makers that action should be taken to address this malicious behavior.

To better understand the ability to distinguish such activity from that of normal users, disclosed herein is a platform-agnostic supervised learning approach to classifying posts as being part of a coordinated influence operation or not. To assess variation in the predictability of industrialized influence operations, performance of the system was evaluated monthly across four different influence campaigns on two platforms in four distinct tests (for a total of 16 experiments and 463 observations).

Overall, the results show that content-based features distinguish coordinated influence campaigns on social media. They also provide some key insights about what makes these campaigns distinctive. First, content-based classifiers do a pretty good job of identifying posts in most campaigns. This is likely because, to achieve impact, the campaigns need to produce a lot of content, which requires a substantial workforce using templates and standard operating procedures. Second, meta-content, how a given piece of content relates to what others are saying at that time, is an important complement to primary content. Third, as troll tactics change, the features that distinguish their activity do as well. Therefore, caution is advised about the promise of a generic unsupervised solution to the challenge of detecting coordinated political influence operations. Fourth, there is massive variation in the level of skill across campaigns.

The results disclosed herein also have practical implications. An important policy challenge in combating coordinated influence operations is to estimate the size of their operations in real time, which, in turn, requires distinguishing participating accounts or content from that of normal users. Fortunately, the research community has made a great progress in detecting accounts controlled by automated approaches (i.e., bots) through developing machine learning-based tools. This makes it easy to identify less complex influence efforts or promotion campaigns, in which there are few central human-operated accounts and lots of bots surrounding them to spread their content and amplify their visibility. But much more needs to be done. Detecting more complex influence operations composed of many human- or hybrid-operated accounts working in coordination, which sometimes include multiple teams targeting different types of audiences, is substantially harder than finding automation. Because foreign agents are active on multiple social media platforms, including but not limited to Twitter, Facebook, Instagram, and Reddit, it is important to build detection tools that are not heavily dependent on platform-specific features.

Content-based approaches can help. The disclosed machine learning approach achieves strong performance on a platform-agnostic unit of analysis (the post-URL pair), with modest amounts of labeled data, short training periods, libraries, and a limited set of human-interpretable features. Considerably higher classifier performance is surely possible through hyperparameter tuning, dynamic features selection, varying training periods, and other enhancements. The fact that the disclosed baseline works well across multiple tasks and campaigns is strong evidence that content-based approaches could (i) support public-facing dashboards alerting polities to the extent of foreign disinformation campaigns, (ii) drive recommender systems to alert users when they are seeing promoted content or inadvertently spreading it themselves, (iii) cue investigations on platforms where user data are hidden for privacy reasons (e.g., anonymous messaging apps), and (iv) help identifying the coordination pattern more quickly.

Last, there is promise in using experimental design to identify the sources of classifier performance. This analysis is rare in the applied machine learning literature, but when panel data are available on factors that could affect classifier performance, it can enable a richer assessment of the underlying data generating process.

Further described herein are the use of four basic active learning strategies to assess how well a classifier can perform in detecting influence operations content over time with low dependence on querying new data from platforms, or not querying from them at all. To assess variation in the predictability of industrialized influence operations the system's performance was evaluated on a monthly basis across three different influence campaigns on Twitter, two distinct tests, and four active learning strategies (total of 18 experiments each including at least 36 observations corresponding to each month). Overall, the results show that content-based features do indeed distinguish coordinated influence campaigns on social media. They also provide some key insights about situations in which one has limited to no platform query bandwidth.

First, being able to query a small portion of hard-to-classify new data monthly always leads to higher prediction performance. Second, using high-confidence output of the model as its input for the next month alone does a good job of identifying troll content across all three campaigns, especially on Chinese and Venezuelan influence operations. Third, apart from testing all users of Russian campaigns, in all month, strategy, and country combinations, classifiers exhibit much higher precision than recall, with near to 1 precision scores in most cases.

Having a classifier with near perfect precision for troll detection is of great policy importance. Since the social and political cost of mislabeling organic content as malicious is high, platforms rely heavily on human moderation. Though human-machine combination seems to work best, in situations which platforms have to rely heavily on their algorithms due to not having enough human raters, such as the case of social distancing during the outbreak of COVID-19, having a classifier with near-zero false-positive organic users classified as trolls would be a peace of mind, though it would miss up to half of troll content in some months.

The fact that the simple baseline works well across multiple tasks and campaigns is strong evidence that content-based approaches could: (1) support public-facing dashboards alerting polities to the extent of foreign disinformation campaigns; (2) drive recommender systems to alert users when they are seeing promoted content or inadvertently spreading it themselves; and (3) cue investigations on platforms where user data must be hidden for privacy reasons.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A machine learning based method for identifying content on social media related to one or more coordinated influence efforts, comprising:

generating one or more datasets of post-uniform resource locator (URL) pairs produced from one or more known coordinated influence efforts on one or more social media platforms;

generating one or more datasets of post-URL pairs produced from one or more random users on one or more social media platforms;

extracting a plurality of content-based features from the post-URL pairs from known coordinated influence efforts and random users; and iteratively training a classifier over a predetermined period of time to distinguish between a post-URL pair produced from a coordinated influence effort and a post-URL pair produced from a random user using the extracted plurality of content-based features.

2. The method of claim 1, wherein generating one or more datasets of post-URL pairs produced from one or more random users on one or more social media platforms comprises:

verifying whether the random user was active during a period of interest; and verifying whether the random user was located in a country of interest.

3. The method of claim 1, further comprising preprocessing the post-URL pairs from known coordinated influence efforts and random users.

4. The method of claim 3, wherein preprocessing comprises one or more of character encoding, performing tokenization, making all words lower case, removing punctuation, number, and stop words, stemming, and developing a document-term matrix.

5. The method of claim 1, further comprising extracting meta content-based, domain-based, meta domain-based, and time-based features from the post-URL pairs from known coordinated influence efforts and random users.

6. The method of claim 1, wherein the features extracted change as the classifier is iteratively trained over the predetermined period of time.

7. The method of claim 1, wherein the classifier comprises one of random forest, decision tree, neural network, Bayesian neural network, gradient boosting, and logistic regression.

8. The method of claim 1, wherein the predetermined period of time for training the classifier comprises one of daily, weekly, and monthly.

9. The method of claim 1, further comprising improving the identification of content on social media related to one or more coordinated influence efforts by:

predicting with the trained classifier a probability that a post-URL pair of a sample of post-URL pairs is produced from a coordinated influence effort;

setting a review threshold based on the probability for manual investigation of whether the post-URL pair is produced from a coordinated influence effort;

adding a resulting label from the manual investigation of the post-URL pair to one of the generated one or more datasets produced from one or more known coordinated influence efforts and the generated one or more datasets produced from one or more random users; and retraining the classifier to distinguish between a post-URL pair produced from a coordinated influence effort and a post-URL pair produced from a random user using the extracted plurality of content-based features based on the additional resulting label.

10. The method of claim 9, wherein the sample of post-URL pairs are produced after the generation of one or more datasets produced from one or more known coordinated influence efforts.

11. The method of claim 9, wherein the sample of post-URL pairs is different the generated one or more datasets produced from one or more known coordinated influence efforts and produced from one or more random users.

12. A machine learning based system for identifying content on social media related to one or more coordinated influence efforts, the system comprising one or more processors configured to:

generate one or more datasets of post-uniform resource locator (URL) pairs produced from one or more known coordinated influence efforts on one or more social media platforms;

generate one or more datasets of post-URL pairs produced from one or more random users on one or more social media platforms;

extract a plurality of content-based features from the post-URL pairs from known coordinated influence efforts and random users; and iteratively train a classifier over a predetermined period of time to distinguish between a post-URL pair produced from a coordinated influence effort and a post-URL pair produced from a random user using the extracted plurality of content-based features.

13. The system of claim 12, wherein generating one or more datasets of post-URL pairs produced from one or more random users on one or more social media platforms comprises:

verifying whether the random user was active during a period of interest; and verifying whether the random user was located in a country of interest.

14. The system of claim 12, wherein the processors are further configured to preprocess the post-URL pairs from known coordinated influence efforts and random users.

15. The system of claim 14, wherein preprocessing comprises one or more of character encoding, performing tokenization, making all words lower case, removing punctuation, number, and stop words, stemming, and developing a document-term matrix.

16. The system of claim 12, wherein the processors are further configured to extract meta content-based, domain-based, meta domain-based, and time-based features from the post-URL pairs from known coordinated influence efforts and random users.

17. The system of claim 12, wherein the features extracted change as the classifier is iteratively trained over the predetermined period of time.

18. The system of claim 12, wherein the classifier comprises one of random forest, decision tree, neural network, Bayesian neural network, gradient boosting, and logistic regression.

19. The system of claim 12, wherein the predetermined period of time for training the classifier comprises one of daily, weekly, and monthly.

20. The system of claim 12, wherein the processors are further configured to improve the identification of content on social media related to one or more coordinated influence efforts by:

predicting with the trained classifier a probability that a post-URL pair of a sample of post-URL pairs is produced from a coordinated influence effort;

setting a review threshold based on the probability for manual investigation of whether the post-URL pair is produced from a coordinated influence effort;

adding a resulting label from the manual investigation of the post-URL pair to one of the generated one or more datasets produced from one or more known coordinated influence efforts and the generated one or more datasets produced from one or more random users; and retraining the classifier to distinguish between a post-URL pair produced from a coordinated influence effort and a post-URL pair produced from a random user using the extracted plurality of content-based features based on the additional resulting label.

21. The system of claim 20, wherein the sample of post-URL pairs are produced after the generation of one or more datasets produced from one or more known coordinated influence efforts.

22. The system of claim 20, wherein the sample of post-URL pairs is different the generated one or more datasets produced from one or more known coordinated influence efforts and produced from one or more random users.

23. A non-transitory computer-readable medium having stored thereon a computer program for execution by a processor configured to perform a machine learning based method for identifying content on social media related to one or more coordinated influence efforts, the method comprising:

generating one or more datasets of post-uniform resource locator (URL) pairs produced from one or more known coordinated influence efforts on one or more social media platforms;

generating one or more datasets of post-URL pairs produced from one or more random users on one or more social media platforms;

extracting a plurality of content-based features from the post-URL pairs from known coordinated influence efforts and random users; and iteratively training a classifier over a predetermined period of time to distinguish between a post-URL pair produced from a coordinated influence effort and a post-URL pair produced from a random user using the extracted plurality of content-based features.

24. The non-transitory computer-readable medium of claim 23, wherein generating one or more datasets of post-URL pairs produced from one or more random users on one or more social media platforms comprises:

verifying whether the random user was active during a period of interest; and verifying whether the random user was located in a country of interest.

25. The non-transitory computer-readable medium of claim 23, wherein the method further comprises preprocessing the post-URL pairs from known coordinated influence efforts and random users.

26. The non-transitory computer-readable medium of claim 25, wherein preprocessing comprises one or more of character encoding, performing tokenization, making all words lower case, removing punctuation, number, and stop words, stemming, and developing a document-term matrix.

27. The non-transitory computer-readable medium of claim 23, wherein the method further comprises extracting meta content-based, domain-based, meta domain-based, and time-based features from the post-URL pairs from known coordinated influence efforts and random users.

28. The non-transitory computer-readable medium of claim 23, wherein the features extracted change as the classifier is iteratively trained over the predetermined period of time.

29. The non-transitory computer-readable medium of claim 23, wherein the classifier comprises one of random forest, decision tree, neural network, Bayesian neural network, gradient boosting, and logistic regression.

30. The non-transitory computer-readable medium of claim 23, wherein the predetermined period of time for training the classifier comprises one of daily, weekly, and monthly.

31. The non-transitory computer-readable medium of claim 23, wherein the method further comprises improving the identification of content on social media related to one or more coordinated influence efforts by:

predicting with the trained classifier a probability that a post-URL pair of a sample of post-URL pairs is produced from a coordinated influence effort;

setting a review threshold based on the probability for manual investigation of whether the post-URL pair is produced from a coordinated influence effort;

adding a resulting label from the manual investigation of the post-URL pair to one of the generated one or more datasets produced from one or more known coordinated influence efforts and the generated one or more datasets produced from one or more random users; and retraining the classifier to distinguish between a post-URL pair produced from a coordinated influence effort and a post-URL pair produced from a random user using the extracted plurality of content-based features based on the additional resulting label.

32. The non-transitory computer-readable medium of claim 31, wherein the sample of post-URL pairs are produced after the generation of one or more datasets produced from one or more known coordinated influence efforts.

33. The non-transitory computer-readable medium of claim 31, wherein the sample of post-URL pairs is different the generated one or more datasets produced from one or more known coordinated influence efforts and produced from one or more random users.

\* \* \* \* \*